US012666074B2

(12) United States Patent
Luo et al.

(10) Patent No.: US 12,666,074 B2
(45) Date of Patent: *Jun. 23, 2026

(54) SYSTEMS, APPARATUS AND METHODS FOR INTER PREDICTION REFINEMENT WITH OPTICAL FLOW

(71) Applicant: InterDigital VC Holdings, Inc., Wilmington, DE (US)

(72) Inventors: Jiancong Luo, Skillman, NJ (US); Yuwen He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,319

(22) Filed: Oct. 10, 2024

(65) Prior Publication Data

US 2025/0039435 A1 Jan. 30, 2025

Related U.S. Application Data

(63) Continuation of application No. 18/199,238, filed on May 18, 2023, now Pat. No. 12,143,626, which is a
(Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/132* (2014.11);
(Continued)

(58) Field of Classification Search
CPC .. H04N 19/105; H04N 19/117; H04N 19/132; H04N 19/139; H04N 19/167;
(Continued)

(56) References Cited

U.S. PATENT DOCUMENTS 9,237,355 B2    1/2016  Chien et al.
9,237,356 B2    1/2016  Wang et al.
(Continued)

FOREIGN PATENT DOCUMENTS

CA        3065492  A1    11/2018
CN      105580364  A     5/2016
(Continued)

OTHER PUBLICATIONS

Interdigital Communications, Inc., et al., "FS_QoE_VR: MPEG Immersive Media Metrics", 3GPP Tdoc S4-190323, 3GPP TSG-SA4 Meeting #103, Newport Beach, USA, Apr. 8-12, 2019, 6 pages.
(Continued)

*Primary Examiner* — Anner Holder

(74) *Attorney, Agent, or Firm* — Xiaoan Lu

(57)                    ABSTRACT

Method, apparatus and systems are disclosed. In one embodiment, a method of decoding includes obtaining a sub-block based motion prediction signal for a current block of the video; obtaining one or more spatial gradients of the sub-block based motion prediction signal or one or more motion vector difference values; obtaining a refinement signal for the current block based on the one or more obtained spatial gradients or the one or more obtained motion vector difference values; obtaining a refined motion prediction signal for the current block based on the sub-block based motion prediction signal and the refinement signal; and decoding the current block based on the refined motion prediction signal.

18 Claims, 29 Drawing Sheets

Related U.S. Application Data continuation of application No. 17/426,976, filed as application No. PCT/US2020/016564 on Feb. 4, 2020, now Pat. No. 11,695,950.

(60) Provisional application No. 62/833,999, filed on Apr. 15, 2019, provisional application No. 62/814,611, filed on Mar. 6, 2019, provisional application No. 62/802,428, filed on Feb. 7, 2019.

(51) Int. Cl.

| | |
|---|---|
| *H04N 19/132* | (2014.01) |
| *H04N 19/139* | (2014.01) |
| *H04N 19/167* | (2014.01) |
| *H04N 19/176* | (2014.01) |
| *H04N 19/55* | (2014.01) |

(52) U.S. Cl.
CPC ......... *H04N 19/139* (2014.11); *H04N 19/167* (2014.11); *H04N 19/176* (2014.11); *H04N 19/55* (2014.11)

(58) Field of Classification Search
CPC .... H04N 19/176; H04N 19/182; H04N 19/52; H04N 19/521; H04N 19/55; H04N 19/577
See application file for complete search history.

(56) References Cited

U.S. PATENT DOCUMENTS

| | | | |
|---|---|---|---|
| 10,368,090 | B2 | 7/2019 | Park et al. |
| 10,425,656 | B2 | 9/2019 | Wang et al. |
| 10,750,167 | B2 | 8/2020 | Son et al. |
| 10,812,803 | B2 | 10/2020 | Lee et al. |
| 11,356,697 | B2 | 6/2022 | Zhang et al. |
| 11,368,711 | B2 | 6/2022 | Zhang et al. |
| 11,523,108 | B2 | 12/2022 | Zhang et al. |
| 11,539,950 | B2 | 12/2022 | Zhang et al. |
| 11,570,462 | B2 | 1/2023 | Zhang et al. |
| 11,695,950 | B2 | 7/2023 | Luo et al. |
| 2008/0117985 | A1 | 5/2008 | Chen et al. |
| 2011/0255598 | A1 | 10/2011 | Lin et al. |
| 2013/0272372 | A1 | 10/2013 | Hannuksela et al. |
| 2013/0322526 | A1 | 12/2013 | Aoki et al. |
| 2014/0341297 | A1 | 11/2014 | Chien et al. |
| 2015/0131739 | A1 | 5/2015 | Lee et al. |
| 2015/0195562 | A1 | 7/2015 | Li et al. |
| 2016/0337661 | A1 | 11/2016 | Pang et al. |
| 2016/0373742 | A1 | 12/2016 | Zhao et al. |
| 2016/0373743 | A1 | 12/2016 | Zhao et al. |
| 2017/0006308 | A1 | 1/2017 | Kwon et al. |
| 2017/0070748 | A1 | 3/2017 | Li et al. |
| 2017/0078701 | A1 | 3/2017 | Chen et al. |
| 2017/0134749 | A1 | 5/2017 | Park et al. |
| 2017/0214932 | A1 | 7/2017 | Huang et al. |
| 2017/0310958 | A1 | 10/2017 | Huang et al. |
| 2018/0070105 | A1 | 3/2018 | Jin et al. |
| 2018/0077419 | A1 | 3/2018 | Minoo et al. |
| 2018/0098089 | A1 | 4/2018 | Chen et al. |
| 2018/0192069 | A1 | 7/2018 | Chen et al. |
| 2018/0199057 | A1 | 7/2018 | Chuang et al. |
| 2018/0220138 | A1 | 8/2018 | He et al. |
| 2018/0241998 | A1 | 8/2018 | Chen et al. |
| 2018/0249176 | A1 | 8/2018 | Lim et al. |
| 2018/0270500 | A1* | 9/2018 | Li ........................... H04N 19/52 |
| 2018/0316929 | A1 | 11/2018 | Li et al. |
| 2018/0343469 | A1 | 11/2018 | Jin et al. |
| 2018/0359483 | A1 | 12/2018 | Chen et al. |
| 2019/0028731 | A1 | 1/2019 | Chuang et al. |
| 2019/0141318 | A1 | 5/2019 | Li et al. |
| 2019/0166375 | A1 | 5/2019 | Jun et al. |
| 2019/0174136 | A1 | 6/2019 | Jun et al. |
| 2019/0182481 | A1 | 6/2019 | Lee |
| 2019/0182482 | A1 | 6/2019 | Vanam et al. |
| 2019/0191155 | A1 | 6/2019 | Ko et al. |
| 2019/0200040 | A1 | 6/2019 | Lim et al. |
| 2019/0215516 | A1 | 7/2019 | Lim et al. |
| 2019/0222837 | A1 | 7/2019 | Lee et al. |
| 2019/0273926 | A1 | 9/2019 | Heo et al. |
| 2019/0281285 | A1 | 9/2019 | Piao et al. |
| 2019/0297325 | A1 | 9/2019 | Lim et al. |
| 2019/0306513 | A1 | 10/2019 | Van et al. |
| 2019/0306536 | A1 | 10/2019 | Lim et al. |
| 2019/0335179 | A1 | 10/2019 | Sjöberg et al. |
| 2020/0007895 | A1 | 1/2020 | Van et al. |
| 2020/0021817 | A1 | 1/2020 | Van et al. |
| 2020/0036966 | A1 | 1/2020 | Na et al. |
| 2020/0145688 | A1 | 5/2020 | Zou et al. |
| 2020/0154127 | A1 | 5/2020 | Lee |
| 2020/0162728 | A1 | 5/2020 | Van et al. |
| 2020/0162737 | A1 | 5/2020 | Van et al. |
| 2020/0177877 | A1 | 6/2020 | Chen et al. |
| 2020/0195961 | A1 | 6/2020 | Toma et al. |
| 2020/0221122 | A1 | 7/2020 | Xiu et al. |
| 2020/0244956 | A1 | 7/2020 | Lee et al. |
| 2020/0275118 | A1 | 8/2020 | Wang et al. |
| 2020/0296405 | A1 | 9/2020 | Huang et al. |
| 2020/0304805 | A1* | 9/2020 | Li ........................... H04N 19/54 |
| 2020/0304832 | A1 | 9/2020 | Ramasubramonian et al. |
| 2021/0136404 | A1 | 5/2021 | Chen et al. |
| 2021/0266531 | A1 | 8/2021 | Kang et al. |
| 2021/0392367 | A1 | 12/2021 | Zhang et al. |
| 2022/0159249 | A1 | 5/2022 | Taquet et al. |
| 2022/0286688 | A1 | 9/2022 | Chen et al. |

FOREIGN PATENT DOCUMENTS

| | | | |
|---|---|---|---|
| CN | 107079165 | A | 8/2017 |
| CN | 107592972 | A | 1/2018 |
| CN | 107820080 | A | 3/2018 |
| CN | 108432250 | A | 8/2018 |
| CN | 109155855 | A | 1/2019 |
| CN | 109417631 | A | 3/2019 |
| JP | 2020052964 | A | 4/2020 |
| JP | 2020526964 | A | 8/2020 |
| RU | 2530318 | A1 | 10/2014 |
| RU | 2571410 | C2 | 12/2015 |
| RU | 2580054 | C2 | 4/2016 |
| RU | 2584501 | C1 | 5/2016 |
| RU | 2654149 | C1 | 5/2018 |
| TW | 201739252 | A | 11/2017 |
| TW | 201841505 | A | 11/2018 |
| WO | WO2017156705 | A1 | 9/2017 |
| WO | WO2017157259 | A1 | 9/2017 |
| WO | WO2017200771 | A1 | 11/2017 |
| WO | WO2018064524 | A1 | 4/2018 |
| WO | WO2018065296 | A1 | 4/2018 |
| WO | WO2018156628 | A1 | 8/2018 |
| WO | WO2019009752 | A1 | 1/2019 |
| WO | WO2019010156 | A1 | 1/2019 |
| WO | WO2019066472 | A1 | 4/2019 |
| WO | WO2019240458 | A1 | 12/2019 |
| WO | WO2020149770 | A1 | 7/2020 |
| WO | WO2020185619 | A1 | 9/2020 |
| WO | WO2020185885 | A1 | 9/2020 |
| WO | WO2020191034 | A1 | 9/2020 |

OTHER PUBLICATIONS

"HM Reference Software HM-16.9", available at <https://hevc.hhi.fraunhofer.de/svn/svn_HEVCSoftware>, Mar. 2016, 2 pages.

Chen et al., "Algorithm description for Versatile Video Coding and Test Model 3 (VTM 3)", Joint Video Experts Team (JVET) of ITU-T SG 16 WP 3 and ISO/IEC JTC1/SC29/WG11, Document: JVET-L1002-v1, 12th Meeting, Macao, China, Oct. 3, 2018, 48 pages.

Luo et al., "Prediction Refinement with Optical Flow for Affine Motion Compensation", 2019 IEEE Visual Communications and Image Processing (VCIP), IEEE, Dec. 1, 2019, 4 pages.

(56) References Cited

OTHER PUBLICATIONS

Li et al., "An Efficient Four-Parameter Affine Motion Model for Video Coding", IEEE Transactions On Circuits and Systems for Video Technology, vol. 28, No. 8., Aug. 2018, pp. 1934-1948.

Chen et al., "Algorithm description for Versatile Video Coding and Test Model 5 (VTM 5)", The Joint Video Experts Team (JVET) of ITU-T SG 16 WP 3 and ISO/IEC JTC 1/SC 29/WG 11, Document: JVET-N1002-v2, 14th Meeting, Geneva, Switzerland, Mar. 19, 2019, 76 pages.

Hendry et al, "AHG12: Signalling for tile and brick partitioning", Document JVET-N0857-v1, Joint Video Experts Team (JVET) of ITU-T SG 16 WP 3 and ISO/IEC JTC 1/SC 29/WG 11, 14th Meeting: Geneva, CH, Mar. 19-27, 2019, 4 pages.

Sobel filter, https://en.wikipedia.org/wiki/Sobel_operator, 7 pages.

Xiu et al, "CE9-related: Complexity reduction and bit-width control for bi-directional optical flow (BIO)", Joint Video Experts Team (JVET) of ITU-T SG 16 WP 3 and ISO/IEC JTC 1/SC 29/WG 11, JVET-L0256_v2, 12th Meeting: Macao, CN Oct. 3-12, 2018, 15 pages.

ITU-T Recommendation H.264, "Series H: Audiovisual and Multimedia Systems Infrastructure of audiovisual services—Coding of moving video, Advanced video coding for generic audiovisual services", Telecommunication Standardization Sector of ITU, Nov. 2007, 564 pages.

SMPTE 421M, "VC-1 Compressed Video Bitstream Format and Decoding Process", SMPTE Standard, Approved Feb. 24, 2006, 493 pages.

Ghaznavi-Youvalari et al., "CE2: Merge Mode with Regression-based Motion Vector Field (Test 2.3.3)", Document JVET-M0302 , Joint Video Experts Team (JVET) of ITU-T SG 16 WP 3 and ISO/IEC JTC 1/SC 29/WG 11, 13th Meeting: Marrakech, MA, Jan. 9-18, 2019, 5 pages.

"VTM-2.0.1 reference software", available at https://vcgit.hhi.fraunhofer.de/jvet/VVCSoftware_VTM/tags/VTM-2.0.1.

"JEM-7.0 Reference Software", Available at <https://jvet.hhi.fraunhofer.de/svn/svn_HMJEMSoftware/tags/HM-16.6-JEM-7.0>, 1 page.

Suhring et al., "H.264/14496-10 AVC Reference Software Manual (Revised for JM 19.0)", Document JVT-AE010 revised, Joint Video Team (JVT) of ISO/IEC MPEG & ITU-T VCEG (ISO/IEC JTC1/SC29/WG11 and ITU-T SG16 Q.6), 31st Meeting, London, UK, Jun. 28-Jul. 3, 2009, 98 pages.

Bross et al., "Versatile Video Coding (Draft 2)", JVET-K1001-V1, Joint Video Experts Team (JVET) of ITU-T SG 16 WP3 and ISO/IEC JTC1/SC29/WG11, 11th Meeting: Ljubljana, SI, Jul. 10-18, 2018, 42 pages.

He et. al., "CE4-Related: Affine Motion Estimation Improvements", InterDigital Communications, Inc., Joint Video Experts Team (JVET) of ITU-T SG 16 WP 3 and ISO/IEC JTC 1/SC 29/WG 11, JVET-L0260-r2, Power Pointn0504 Presentation, Oct. 3-12, 2018, 4 pages.

Bross et al., "Versatile Video Coding (Draft 4)", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M1001, Mar. 9, 2019, 275 pages.

Huang et al., "CE2-related: Simplified prediction refinement for affine motion compensation", Document JVET-N0504, Joint Video Experts Team (JVET)of ITU-T SG 16 WP 3 and ISO/IEC JTC 1/SC 29/WG 11, 14th Meeting: Geneva, CH, Mar. 19-27, 2019, 3 pages.

Luo et al., "CE2-Related: Prediction Refinement With Optical Flow For Affine Mode", Document JVET-N0236-r1, Joint Video Exploration Team (JVET) of ITU-T SG 16 WP 3 and ISO/IEC JTC1/SC29/WG11, 14th Meeting: Geneva, CH, Mar. 19-27, 2019, 7 pages.

"BMS—2.0 Reference Software", available at <https://vcgit.hhi.fraunhofer.de/jvet/VVCSoftware_BMS/tags/BMS-2.1rc1>, 1 page.

Luo et al., "CE2-related: Prediction refinement with optical flow for affine mode", Document JVET-N0236-r5; Joint Video Experts Team (JVET) of ITU-T SG 16 WP 3 and ISO/IEC JTC 1/SC 29/WG 11; 14th Meeting: Geneva, CH, Mar. 19-27, 2019, 8 pages.

Bross, Benjamin, et. al., "Versatile Video Coding (Draft 2)", Joint Video Experts Team (JVET) of ITU-T SG 16 WP 3 and ISO/IEC JTC 1/SC 29/WG 11, JVET-K1001-v6, Jul. 2018, 140 pages.

Segall et al., "Joint Call for Proposals on Video Compression with Capability beyond HEVC", Joint Video Exploration Team (JVET) of ITU-T SG 16 WP 3 and ISO/IEC JTC 1/SC 29/WG 11, Doc. JVET-H1002 (v6), 8th Meeting: Macao, CN, Oct. 18-24, 2017, 27 pages.

Zhang et al., "Non-CE2: Interweaved Prediction for Affine Motion Compensation", Document JVET-M0268, Joint Video Experts Team (JVET) of ITU-T SG 16 WP 3 and ISO/IEC JTC 1/SC 29/WG 11, 13th Meeting: Marrakech, MA, Jan. 9-18, 2019, 4 pages.

Bross et al., "High Efficiency Video Coding (HEVC) text specification draft 10 (For FDIS & Consent)", Joint Collaborative Team on Video Coding (JCT-VC) of ITU-T SG 16 WP 3 and ISO/IEC JTC 1/SC 29/WG 11, Document: JCTVC-L1003_v1, 12th Meeting: Geneva, CH, Jan. 14-23, 2013, 321 pages.

Chen et. al., "Enhanced Motion Vector Difference Coding", Joint Video Exploration Team (JVET) ISO/IEC JTC1/SC29/WG11 and ITU-T SG.16, JVET-D0123-v3, Oct. 16, 2016, 4 pages.

Chen J, et al. "Algorithm Description of Joint Exploration Test Model 7 (JEM 7)", Joint Video Exploration Team (JVET) of ITU-T Sg 16 WP 3 and ISO/IEC JTC 1/SC 29/WG 11; Document: JVET-G1001-v1, Jul. 13-21, 2017, 48 pages.

Bross, "Versatile Video Coding (Draft 1)", Joint Video Experts Team (JVET) of ITU-T SG 16 WP 3 and ISO/IEC JTC 1/SC 29/WG 11, Document: JVET-J1001-v2, 10th Meeting: San Diego, California, United States, Apr. 10, 2018, 40 pages.

Karczewicz, M., et al., "Report of AHG1 On Coding Efficiency Improvements", ITU—Telecommunications Standardization Sector, Video Coding Experts Group (VCEG), SG16/Q6, VCEG-AZ01, Jun. 2015, 2 pages.

International Telecommunication Union, "Affine Transform Prediction for Next Generation Video Coding", Huawei Technologies Co., Ltd., International Telecommunication Union, Telecommunication Standardization Sector, Study periond 2013-2016, Document: COM16-C1016 R1-E, Sep. 2015, 11 pages.

Chen, Jianle, et. al., "EE4: Enhanced Motion Vector Difference Coding", Joint Video Exploration Team (JVET) of ITU-T SG 16 WP 3 and ISO/IEC JTC 1/SC 29/WG 11, JVET-E0076, Jan. 12-20, 2017, pp. 1-4.

Liu, Hongbin, et al., "CE4-related: Adaptive Motion Vector Resolution for Affine Inter Mode", Joint Video Experts Team (JVET) of ITU-T SG 16 WP 3 and ISO/IEC JTC 1/SC 29/WG 11, JVET-L0332-v1, Oct. 3-12, 2018, 3 pages.

Chen, Jianle, et al., "Coding Tools Investigation for Next Generation Video Coding", ITU-Telecommunication Standardization Sector, Study Group 16, Contribution 806, COM16-C806, Jan. 2015, pp. 1-7.

International Search Report and Written Opinion of the International Searching Authority for PCT/US2019/048615 mailed Nov. 20, 2019, 13 pages.

Chen et al., "Description of SDR, HDR and 360 video coding by Qualcomm and Technicolor-low and high complexity versions", Joint Video Exploration Team (JVET) of ITU-T SG 16 WP 3 and ISO/IEC JTC 1/SC 29/WG 11, Document: JVET-J0021, 10th Meeting: San Diego, California, USA, Apr. 10-20, 2018 , 43 pages.

He et al., "CE4-Related: Adaptive Precision for Affine MVD Coding", Joint Video Experts Team of ITU-T SG 16 WP 3 and ISO/IEC JTC 1/SC 29/WG 11, Document JVET-L0259, 12th Meeting, Macau, China, Oct. 6, 2018, 4 pages.

Luo, Jiancong, et al., "CE2: Adaptive Precision for Affine MVD Coding (Test 2.1.1)", Joint Video Exploration Team, JVET-M0420, Jan. 3, 2019, 3 pages.

Alshina, E., et al., "Known Tools Performance Investigation for Next Generation Video Coding", ITU—Telecommunications Standardization Sector, SG16/Q6, Video Coding Experts Group (VCEG), Jun. 2015, VCEG-AZ05, 7 pages.

International Preliminary Report on Patentability for PCT/US2019/048615 issued on Mar. 2, 2021, 9 pages.

Bross et al., "High Efficiency Video Coding (HEVC) Text Specification Draft 10 (for FDIS and Last Call)", Joint Collaborative Team on Video Coding (JCT-VC) of ITU-T SG 16 WP3 and

(56)          References Cited

OTHER PUBLICATIONS

ISO/IEC JTC 1/SC 29/WG 11, Document No. JCTVC-L1003_v34, 12th Meeting, Geneva, Switzerland, Jan. 14, 2013, 310 pages.
Liu, et al., "CE2-related: Joint Test of AMVR for Affine Inter Mode (Test 2.1.1 and Test 2.1.2)", Joint Video Experts Team (JVET) of ITU-T SG 16 WP 3 and ISO/IEC JTC 1/SC 29/WG 11, JVET-M0247, Jan. 9-18, 2019, 3 pages.
Liu, et al., "CE4-related: Adaptive Motion Vector Resolution for Affine Inter Mode", Joint Video Experts Team (JVET) of ITU-T SG 16 WP 3 and ISO/IEC JTC 1/SC 29/WG 11, JVET-L0332-v1, Power Point Presentation, Oct. 3-12, 2018, 6 pages.
Ohm, Jens-Rainer., et al., "Report of AHG on Future Video Coding Standardization Challenges", International Organization for Standardization, Coding of Moving Pictures and Audio, ISO/IEC JTC1/SC29/WG11 MPEG2014/M36782, Jun. 2015, 5 pages.
International Preliminary Report on Patentability for PCT/US2020/038476 issued Dec. 21, 2021, 7 pages.

* cited by examiner

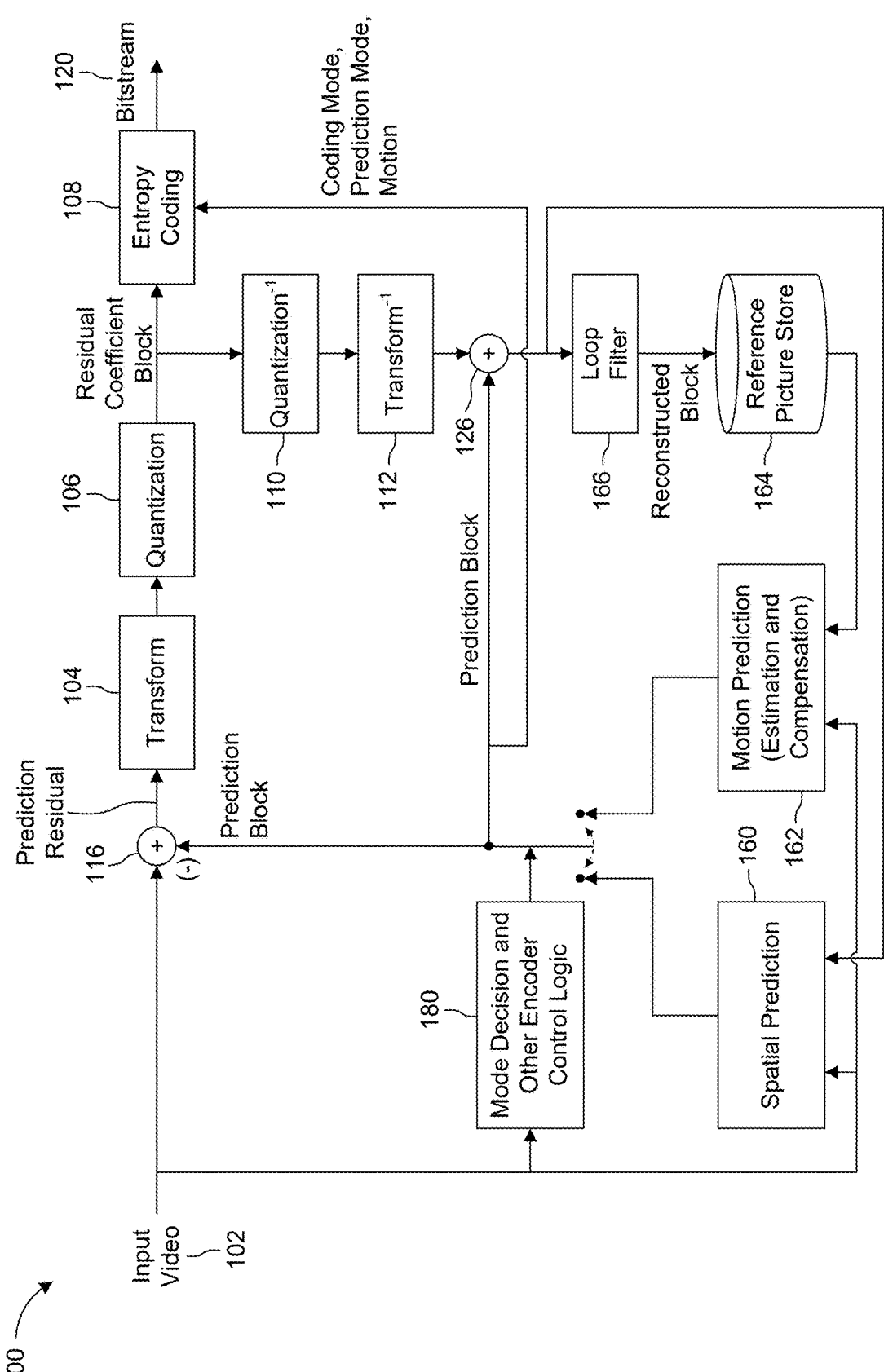
FIG. 1: General Diagram of Block-based Video Encoder for the VVC

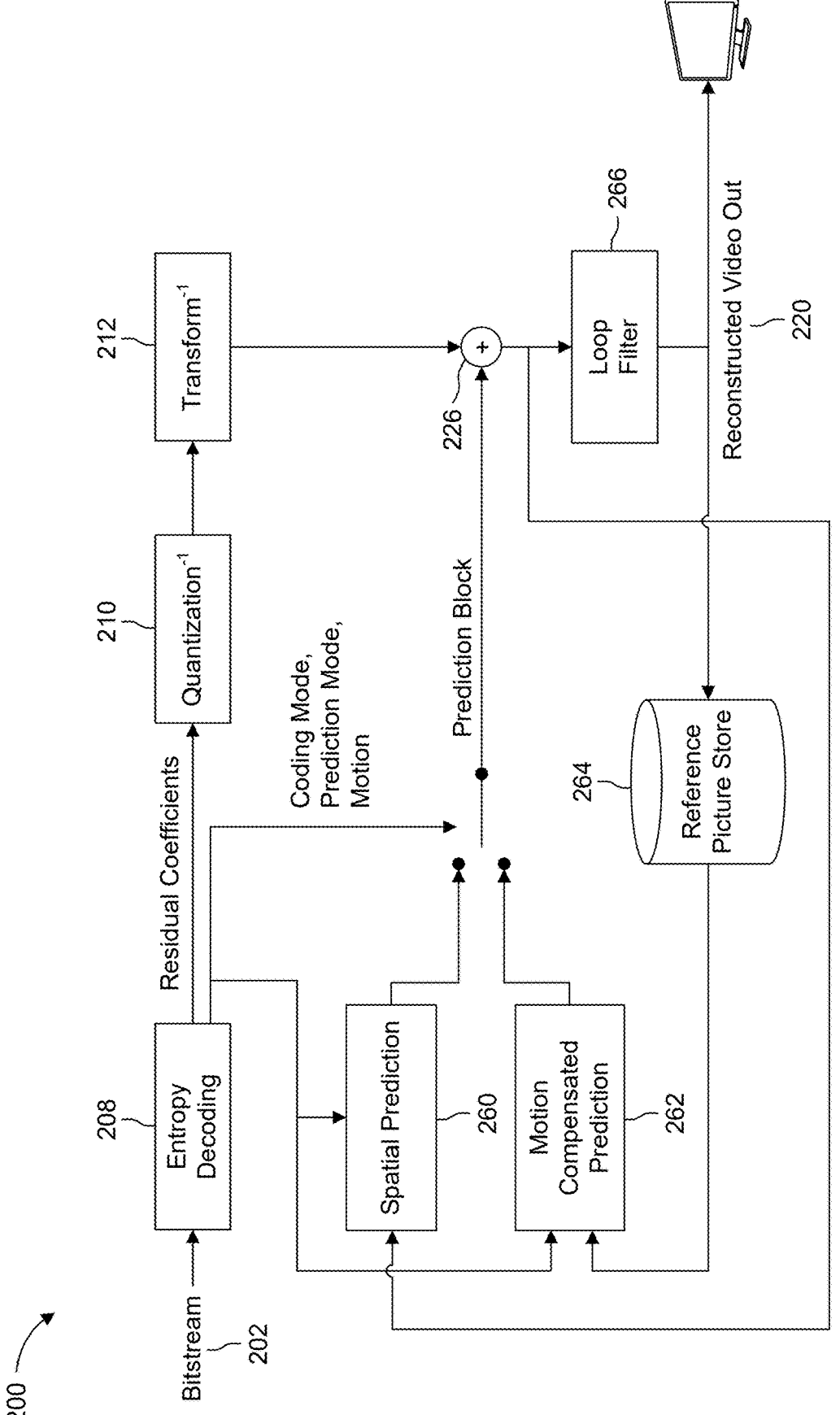
FIG. 2:  General Diagram of Block-based Video Decoder

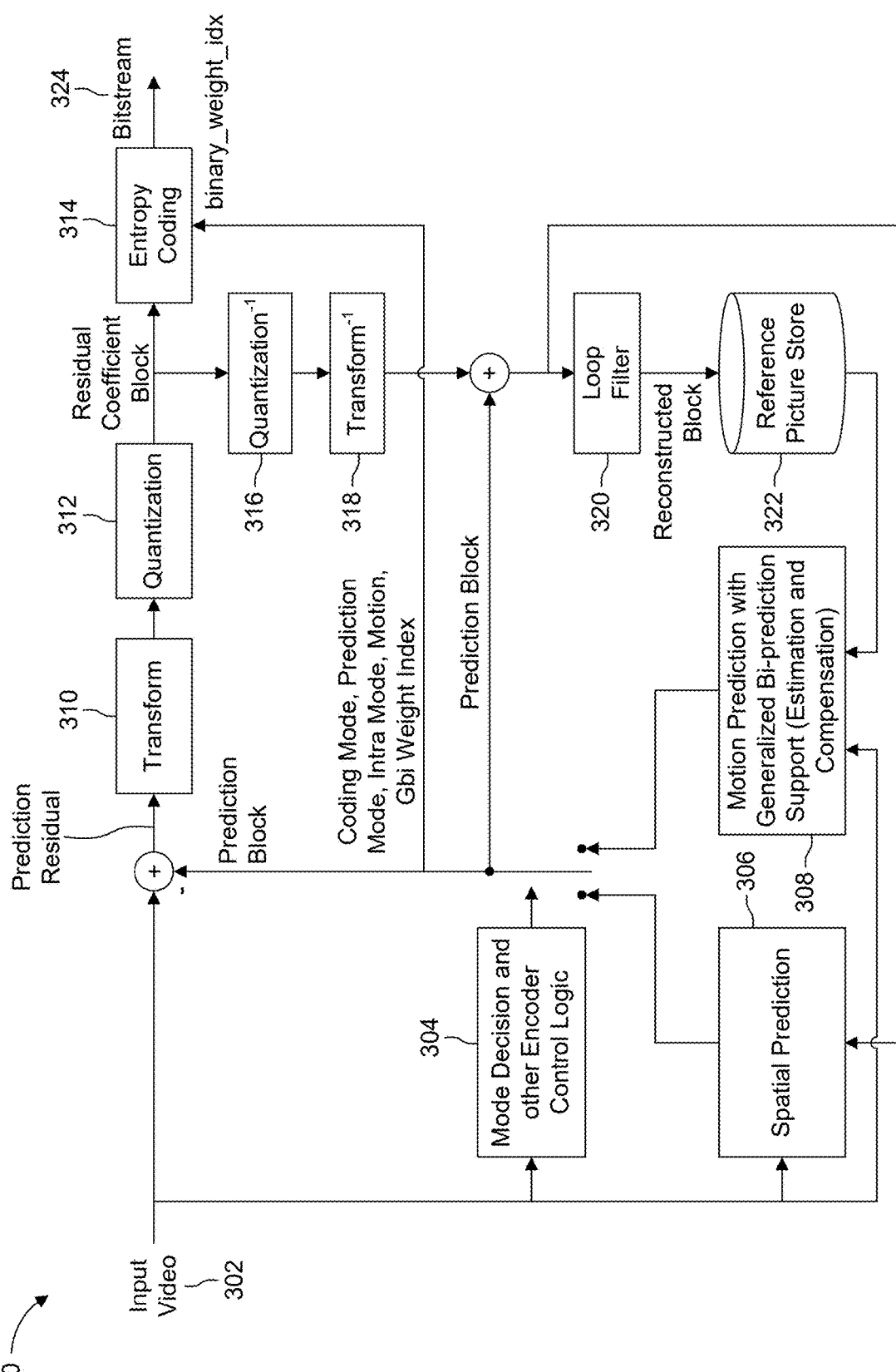
FIG. 3: General Block Diagram of a Video Encoder that Supports GBI

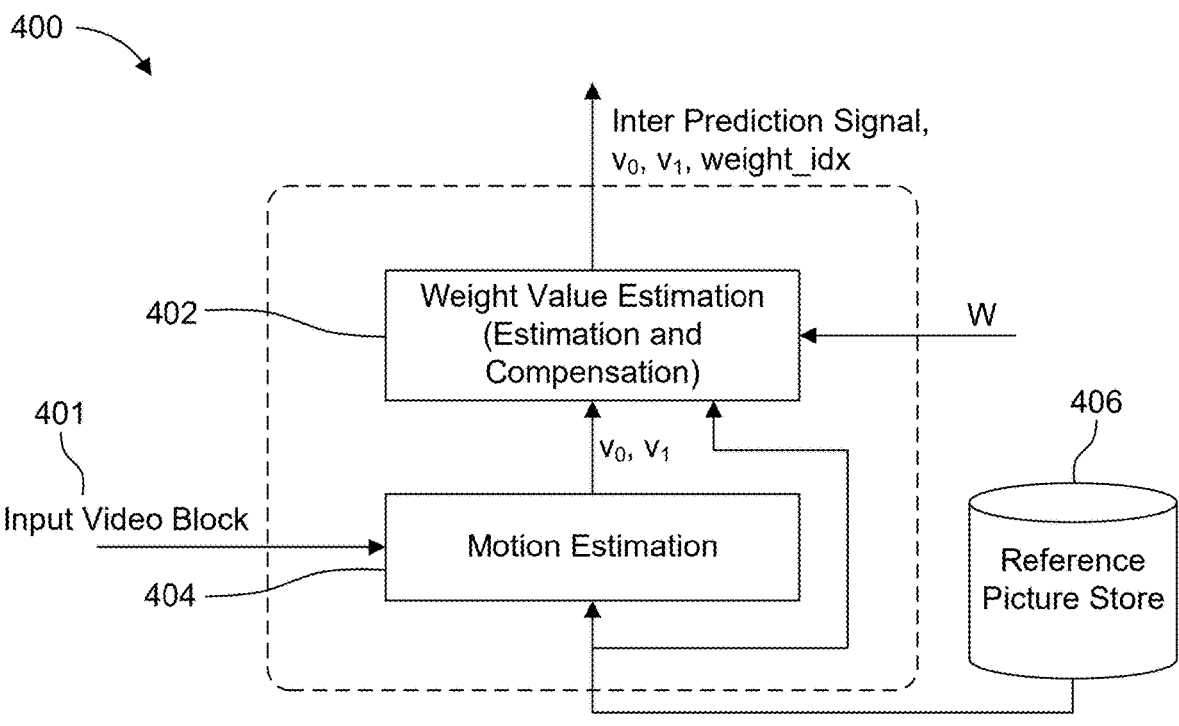
FIG. 4: General Block Diagram of the Generalized Bi-prediction Module

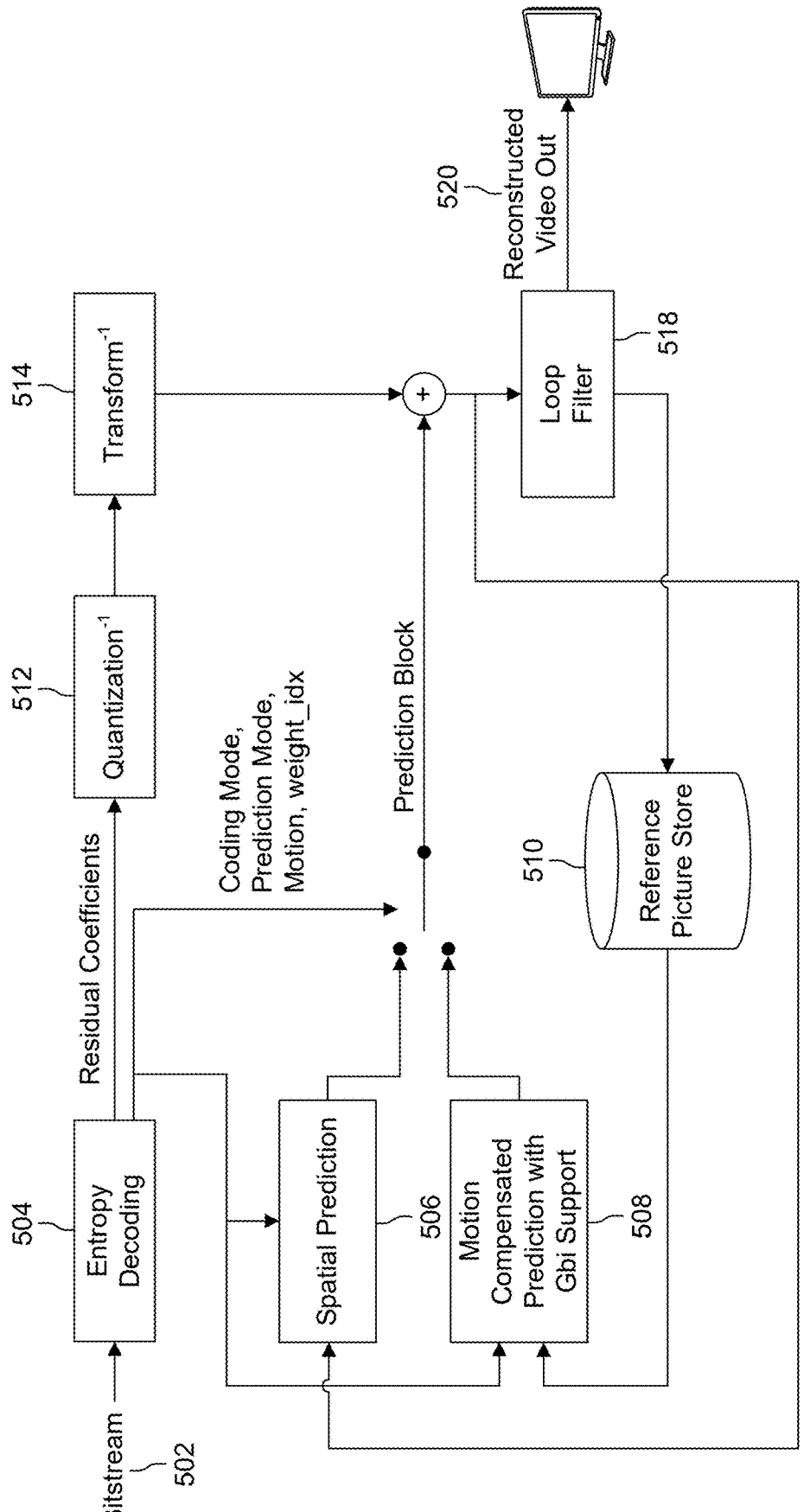
FIG. 5: General Block Diagram of a Video Decoder with GBI Support

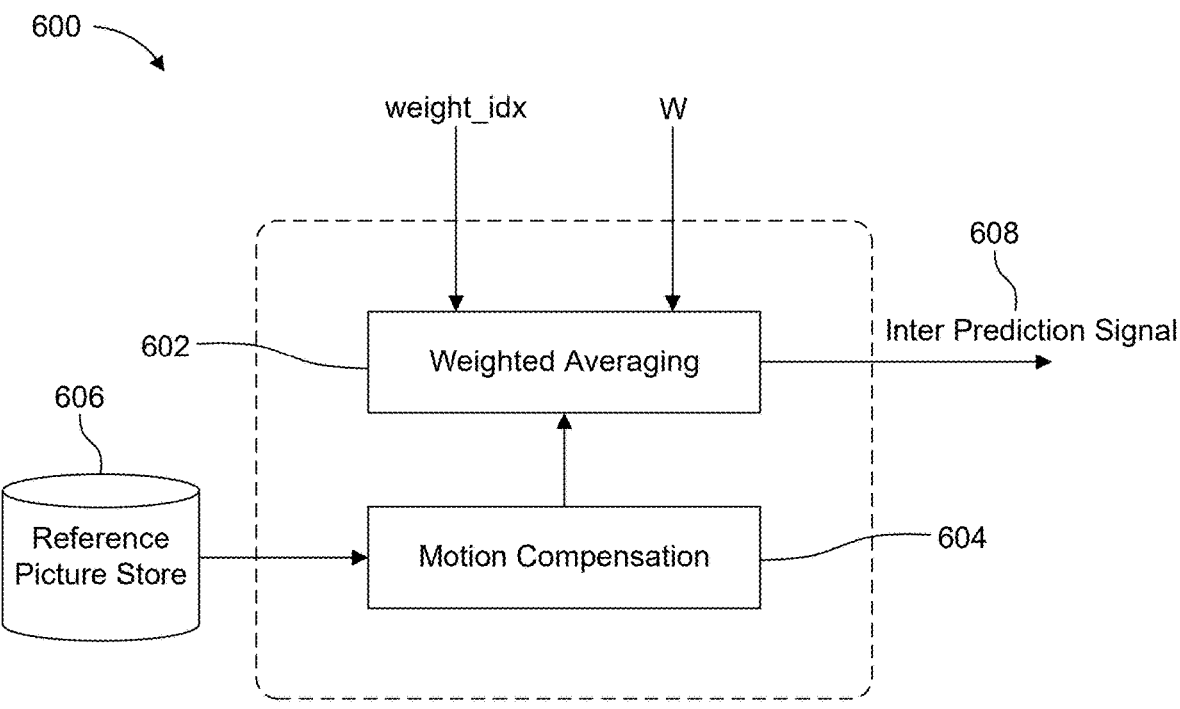
FIG. 6: General Block Diagram of the
Generalized Bi-prediction Module

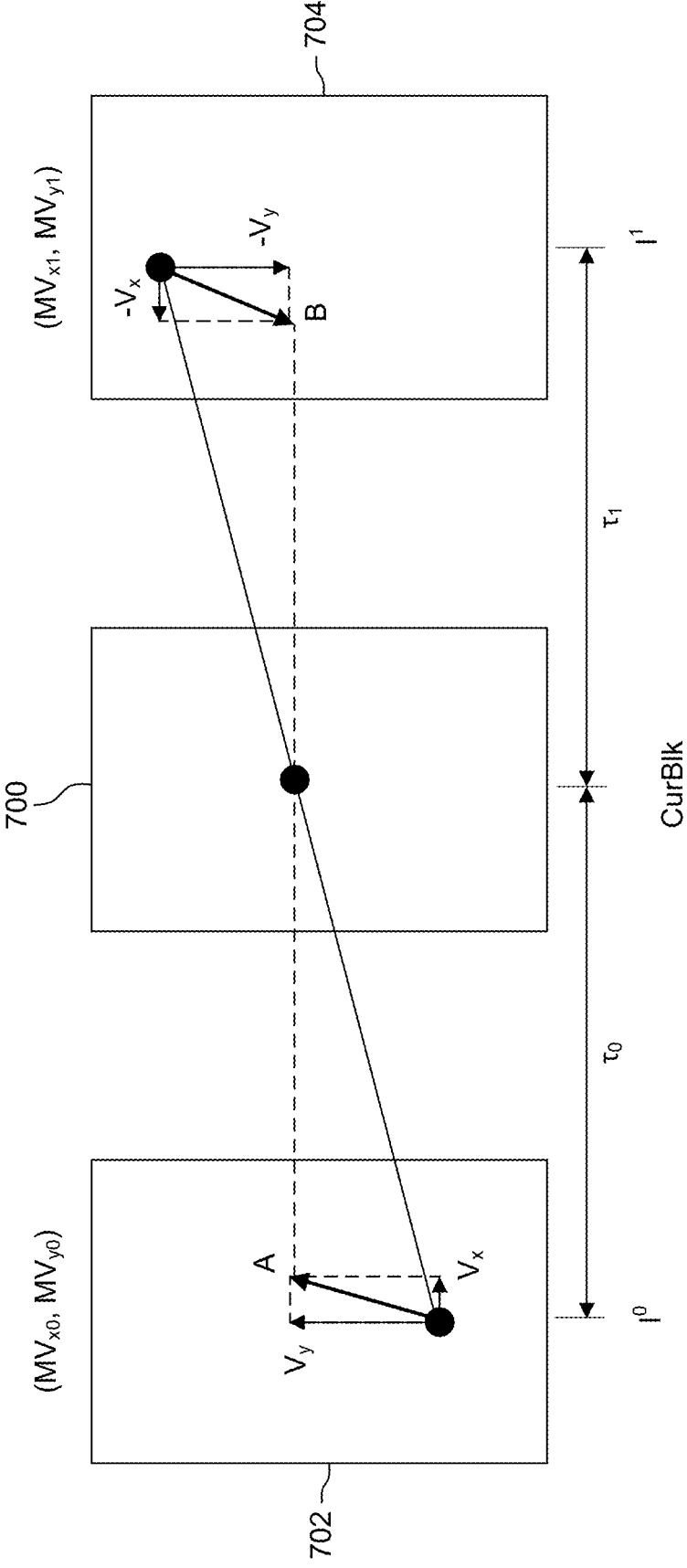
FIG. 7: Illustration of Bidirectional Optical Flow

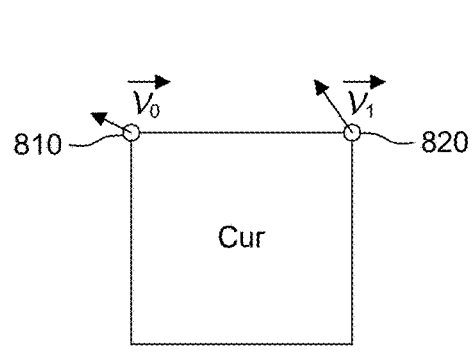
FIG. 8A: Four-parameter Affine Mode: the Affine Model
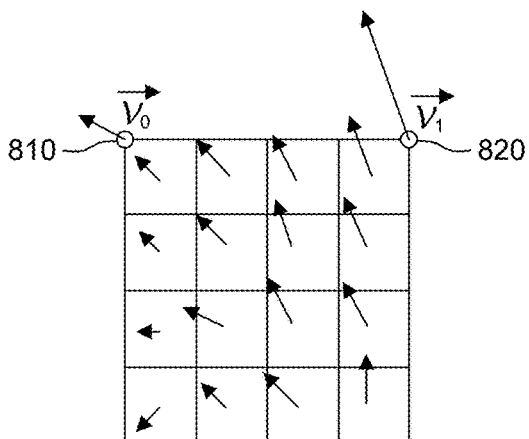
FIG. 8B: Four-parameter Affine Mode: the Sub-block-level Motion Derivation for Affine Blocks
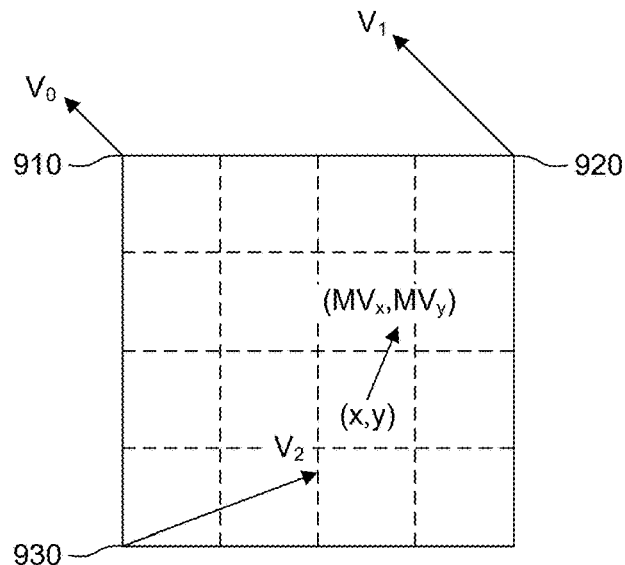
FIG. 9: Six-parameter Affine Mode: $V_0$, $V_1$, and $V_2$ are Control Points; $(MV_x, MV_y)$ is Motion Vector of the Sub-block Centered at Position $(x, y)$

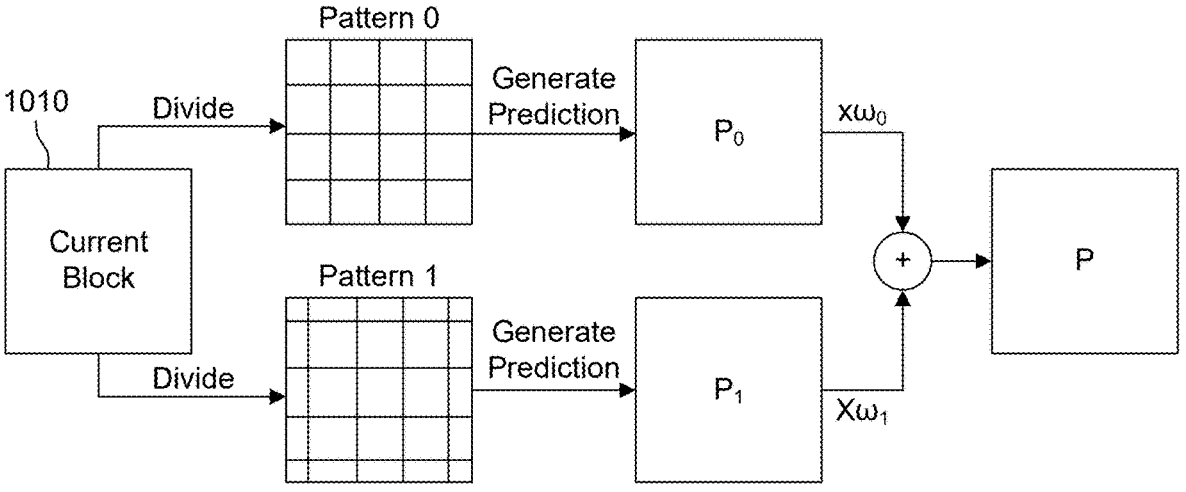
FIG. 10: Interweaved Prediction Procedure
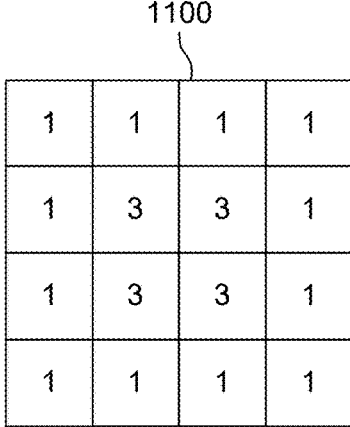
FIG. 11: Weighting Values in a Sub-block

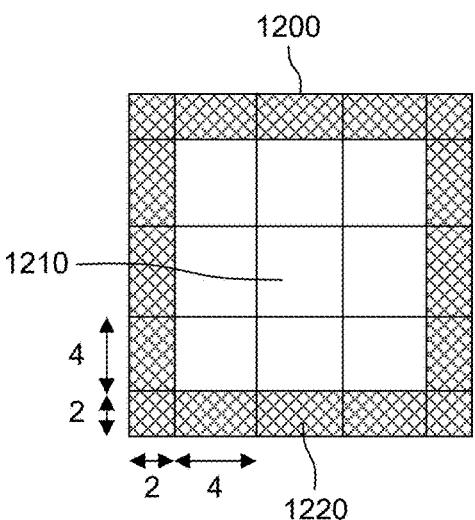
FIG. 12: Interweaved Prediction is not Applied
on the Cross Hatched Regions
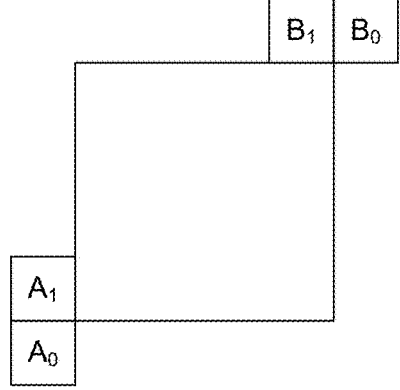
FIG. 13A: The SbTMVP Process in VVC - Spatial
Neighboring Blocks Used by ATVMP

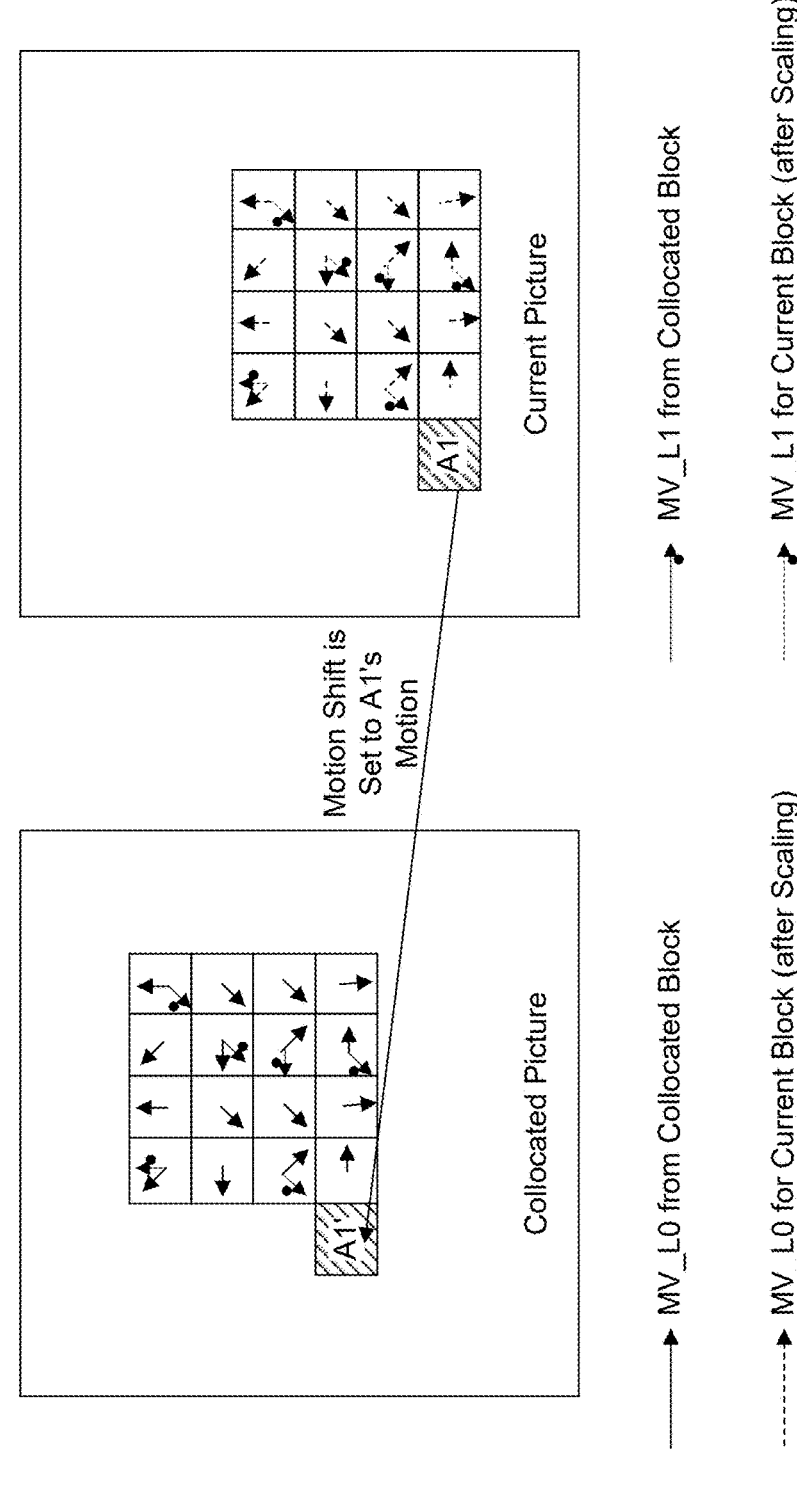
FIG. 13B: The SbTMVP Process in VVC - Deriving Sub-CU Motion Field by Applying a Motion Shift from Spatial Neighbor and Scaling the Motion Information from the Corresponding Collocated Sub-CUs

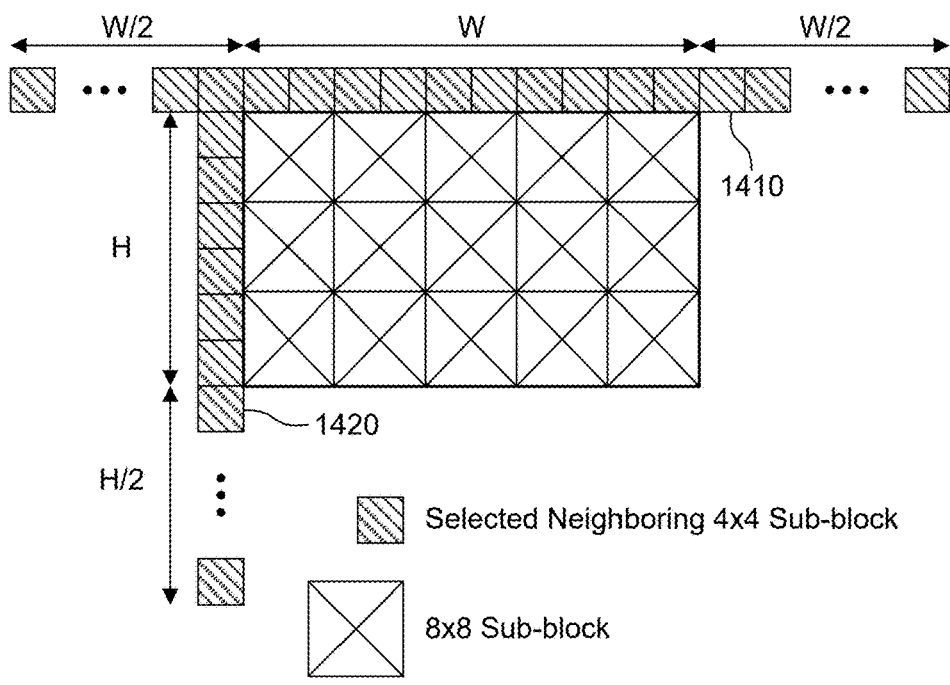
FIG. 14: Neighboring Motion Vectors that are Used in RMVF Motion Parameter Derivation
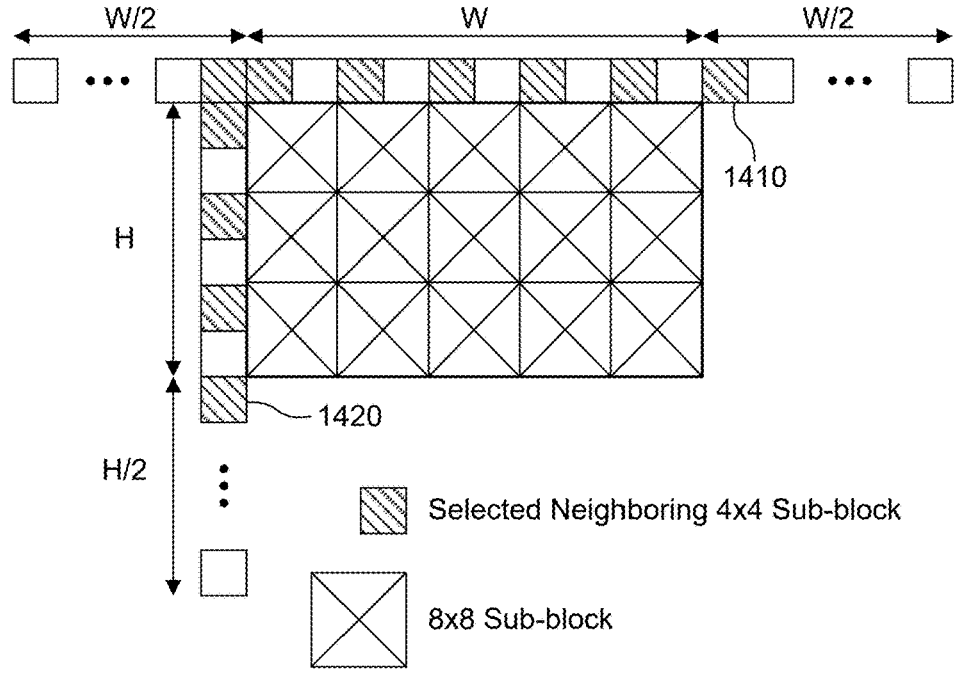
FIG. 15: Reduced Neighboring Motion Vector Candidates for RMVF Motion Parameter Derivation

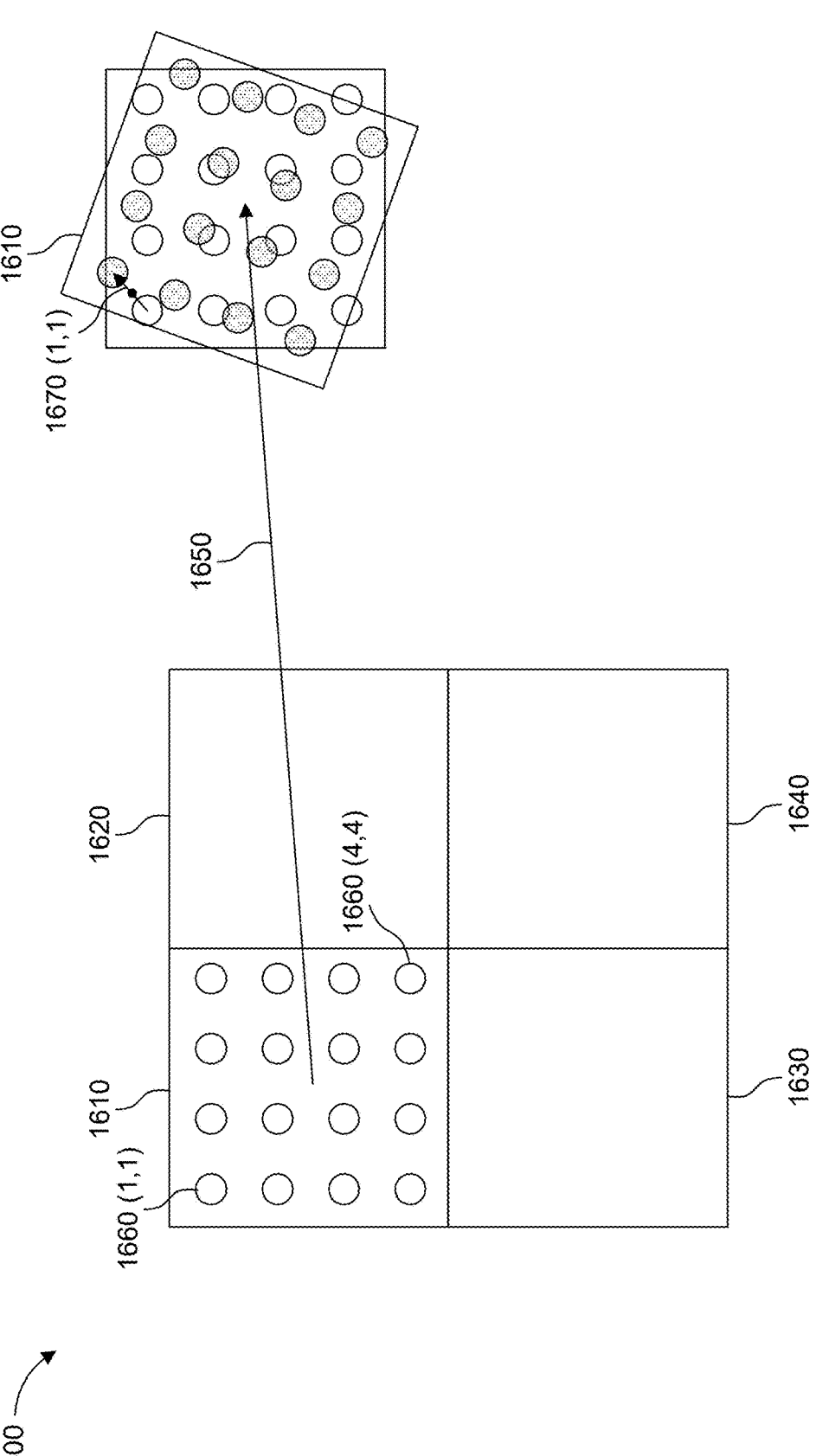
FIG. 16: Sub-block MV (Arrow) and Pixel-level MV Difference (Arrow with Circle)

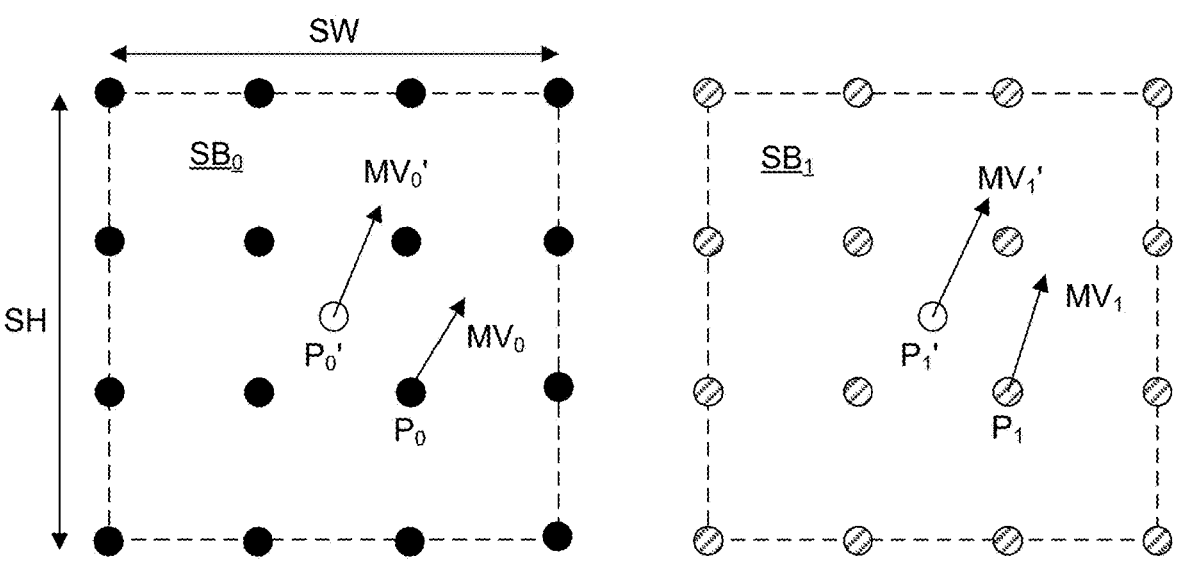
FIG. 17A: MV Derivation for Sub-block for One 8x4 CU
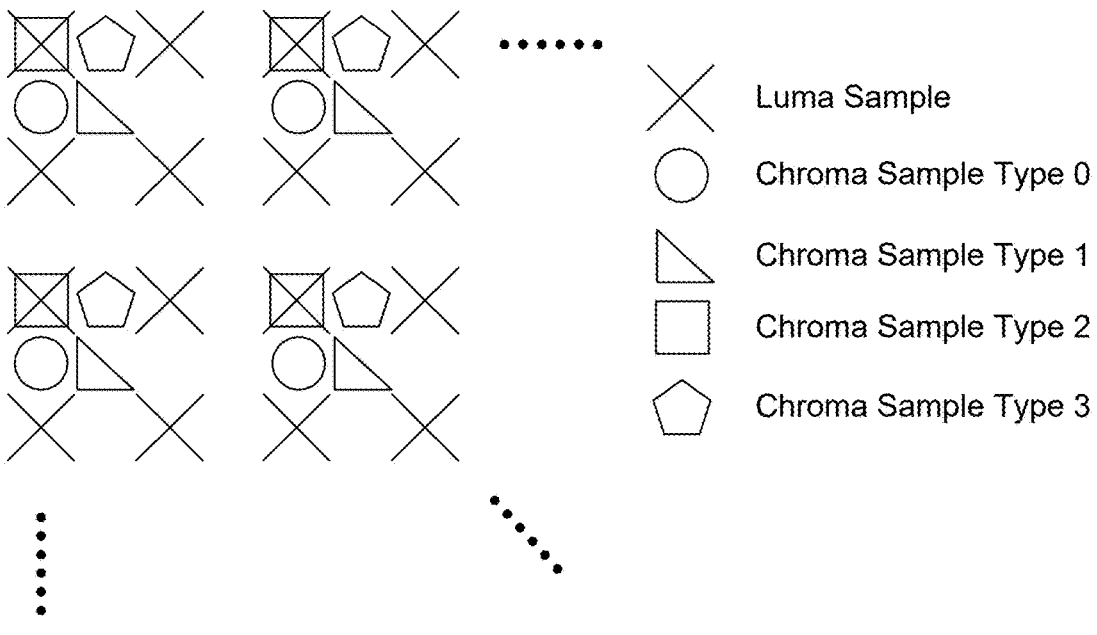
FIG. 17B: Locations of Chroma Samples in 4:2:0 Chroma Format

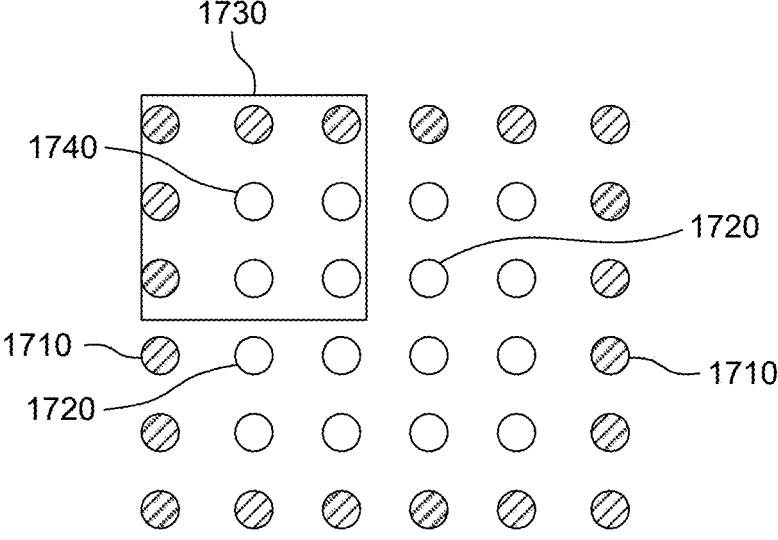
FIG. 17C: Extended Prediction Sub-block.
Shaded Circles are Padding Samples around
4x4 Sub-block. Using Sobel Filter as an
Example, Samples in the box are Used to
Calculate the Gradients of the Sample in the
Center of the Box

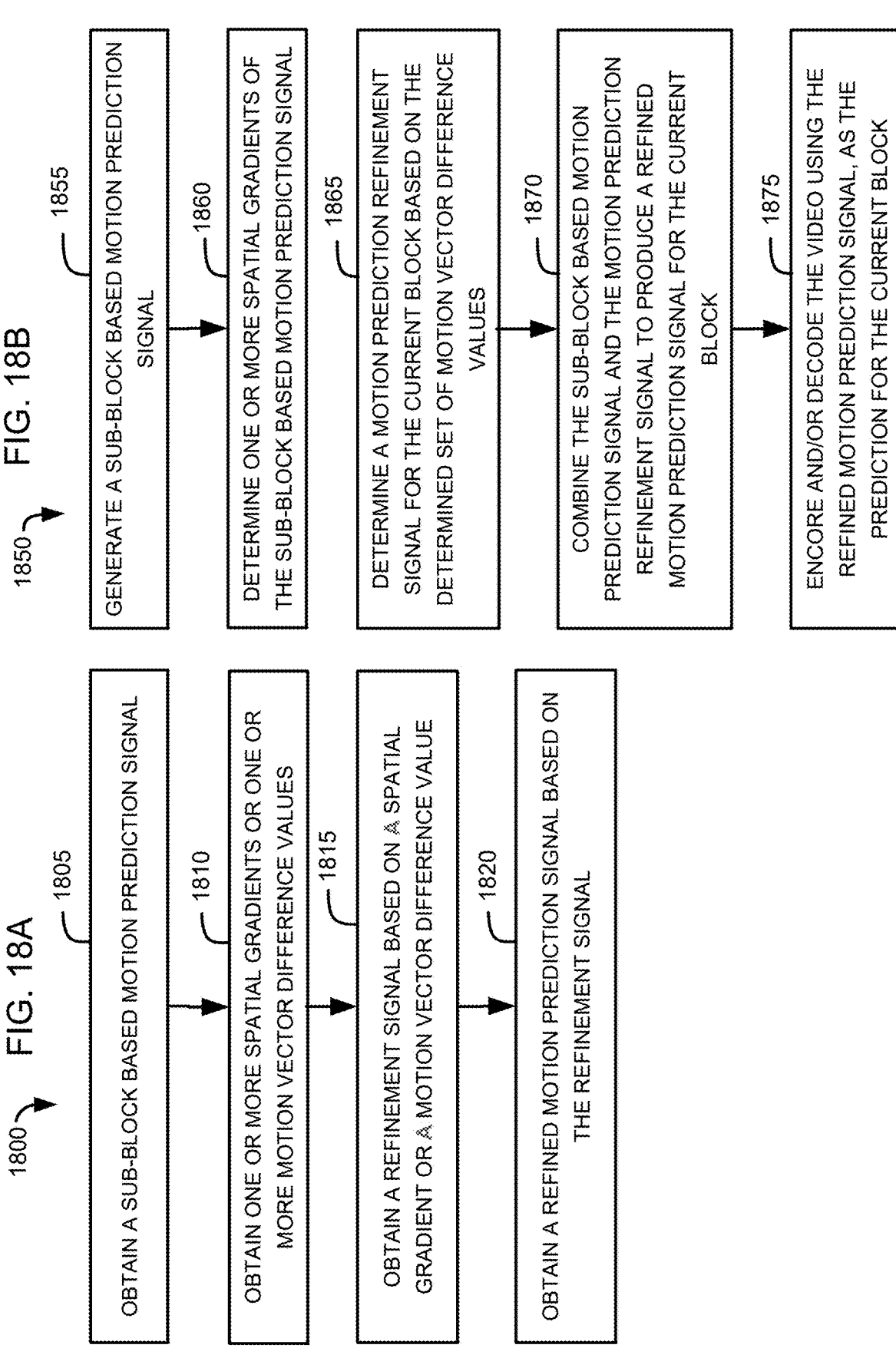

1855 — GENERATE A SUB-BLOCK BASED MOTION PREDICTION SIGNAL

1860 — DETERMINE ONE OR MORE SPATIAL GRADIENTS OF THE SUB-BLOCK BASED MOTION PREDICTION SIGNAL

1865 — DETERMINE A MOTION PREDICTION REFINEMENT SIGNAL FOR THE CURRENT BLOCK BASED ON THE DETERMINED SET OF MOTION VECTOR DIFFERENCE VALUES

1870 — COMBINE THE SUB-BLOCK BASED MOTION PREDICTION SIGNAL AND THE MOTION PREDICTION REFINEMENT SIGNAL TO PRODUCE A REFINED MOTION PREDICTION SIGNAL FOR THE CURRENT BLOCK

1875 — ENCORE AND/OR DECODE THE VIDEO USING THE REFINED MOTION PREDICTION SIGNAL, AS THE PREDICTION FOR THE CURRENT BLOCK

1805 — OBTAIN A SUB-BLOCK BASED MOTION PREDICTION SIGNAL

1810 — OBTAIN ONE OR MORE SPATIAL GRADIENTS OR ONE OR MORE MOTION VECTOR DIFFERENCE VALUES

1815 — OBTAIN A REFINEMENT SIGNAL BASED ON A SPATIAL GRADIENT OR A MOTION VECTOR DIFFERENCE VALUE

1820 — OBTAIN A REFINED MOTION PREDICTION SIGNAL BASED ON THE REFINEMENT SIGNAL

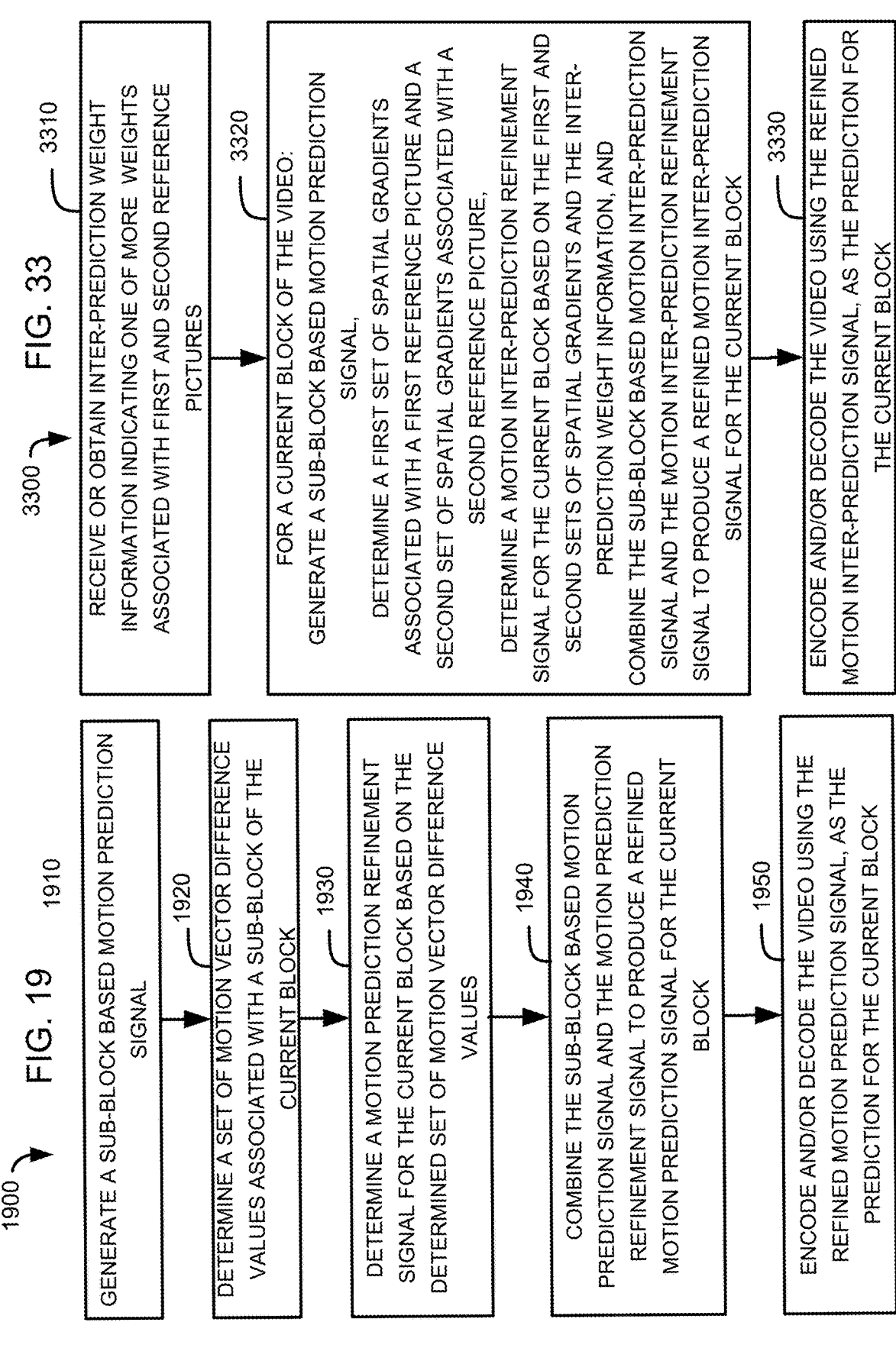

RECEIVE OR OBTAIN INTER-PREDICTION WEIGHT INFORMATION INDICATING ONE OF MORE WEIGHTS ASSOCIATED WITH FIRST AND SECOND REFERENCE PICTURES

3310

FOR A CURRENT BLOCK OF THE VIDEO:

GENERATE A SUB-BLOCK BASED MOTION PREDICTION SIGNAL,

DETERMINE A FIRST SET OF SPATIAL GRADIENTS ASSOCIATED WITH A FIRST REFERENCE PICTURE AND A SECOND SET OF SPATIAL GRADIENTS ASSOCIATED WITH A SECOND REFERENCE PICTURE,

DETERMINE A MOTION INTER-PREDICTION REFINEMENT SIGNAL FOR THE CURRENT BLOCK BASED ON THE FIRST AND SECOND SETS OF SPATIAL GRADIENTS AND THE INTER-PREDICTION WEIGHT INFORMATION, AND

COMBINE THE SUB-BLOCK BASED MOTION INTER-PREDICTION SIGNAL AND THE MOTION INTER-PREDICTION REFINEMENT SIGNAL TO PRODUCE A REFINED MOTION INTER-PREDICTION SIGNAL FOR THE CURRENT BLOCK

3320

ENCODE AND/OR DECODE THE VIDEO USING THE REFINED MOTION INTER-PREDICTION SIGNAL, AS THE PREDICTION FOR THE CURRENT BLOCK

GENERATE A SUB-BLOCK BASED MOTION PREDICTION SIGNAL

1910

DETERMINE A SET OF MOTION VECTOR DIFFERENCE VALUES ASSOCIATED WITH A SUB-BLOCK OF THE CURRENT BLOCK

1920

DETERMINE A MOTION PREDICTION REFINEMENT SIGNAL FOR THE CURRENT BLOCK BASED ON THE DETERMINED SET OF MOTION VECTOR DIFFERENCE VALUES

1930

COMBINE THE SUB-BLOCK BASED MOTION PREDICTION SIGNAL AND THE MOTION PREDICTION REFINEMENT SIGNAL TO PRODUCE A REFINED MOTION PREDICTION SIGNAL FOR THE CURRENT BLOCK

1940

ENCODE AND/OR DECODE THE VIDEO USING THE REFINED MOTION PREDICTION SIGNAL, AS THE PREDICTION FOR THE CURRENT BLOCK

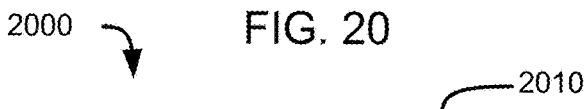

—2010

GENERATE A SUB-BLOCK-BASED MOTION PREDICTION SIGNAL USING AT LEAST A FIRST MOTION VECTOR FOR A FIRST SUB-BLOCK OF THE CURRENT BLOCK AND A FURTHER MOTION VECTOR FOR A SECOND SUB-BLOCK OF THE CURRENT BLOCK

—2020

CALCULATE A FIRST SET OF GRADIENT VALUES FOR A FIRST SAMPLE LOCATION IN THE FIRST SUB-BLOCK OF THE SUB-BLOCK-BASED MOTION PREDICTION SIGNAL AND A SECOND, DIFFERENT SET OF GRADIENT VALUES FOR A SECOND SAMPLE LOCATION IN THE FIRST SUB-BLOCK OF THE SUB-BLOCK BASED MOTION PREDICTION SIGNAL

—2030

DETERMINE A FIRST SET OF MOTION VECTOR DIFFERENCE VALUES FOR THE FIRST SAMPLE LOCATION AND A SECOND, DIFFERENT SET OF MOTION VECTOR DIFFERENCE VALUES FOR THE SECOND SAMPLE LOCATION, WHEREIN THE FIRST SET OF MOTION VECTOR DIFFERENCE VALUES FOR A FIRST SAMPLE LOCATION IS INDICATIVE OF A DIFFERENCE BETWEEN A MOTION VECTOR AT THE FIRST SAMPLE LOCATION AND THE MOTION VECTOR OF THE FIRST SUB-BLOCK AND THE SECOND SET OF MOTION VECTOR DIFFERENCE VALUES FOR A SECOND SAMPLE LOCATION IS INDICATIVE OF A DIFFERENCE BETWEEN A MOTION VECTOR AT THE SECOND SAMPLE LOCATION AND THE MOTION VECTOR OF THE FIRST SUB-BLOCK

—2040

DETERMINE A PREDICTION REFINEMENT SIGNAL USING THE FIRST AND SECOND SETS OF GRADIENT VALUES AND THE FIRST AND SECOND SETS OF MOTION VECTOR DIFFERENCE VALUES

—2050

COMBINE THE SUB-BLOCK BASED MOTION PREDICTION SIGNAL WITH THE PREDICTION REFINEMENT SIGNAL TO PRODUCE A REFINED MOTION PREDICTION SIGNAL

—2060

ENCODE AND/OR DECODE THE VIDEO USING THE REFINED MOTION PREDICTION SIGNAL, AS THE PREDICTION FOR THE CURRENT BLOCK

Figures 21, 23:
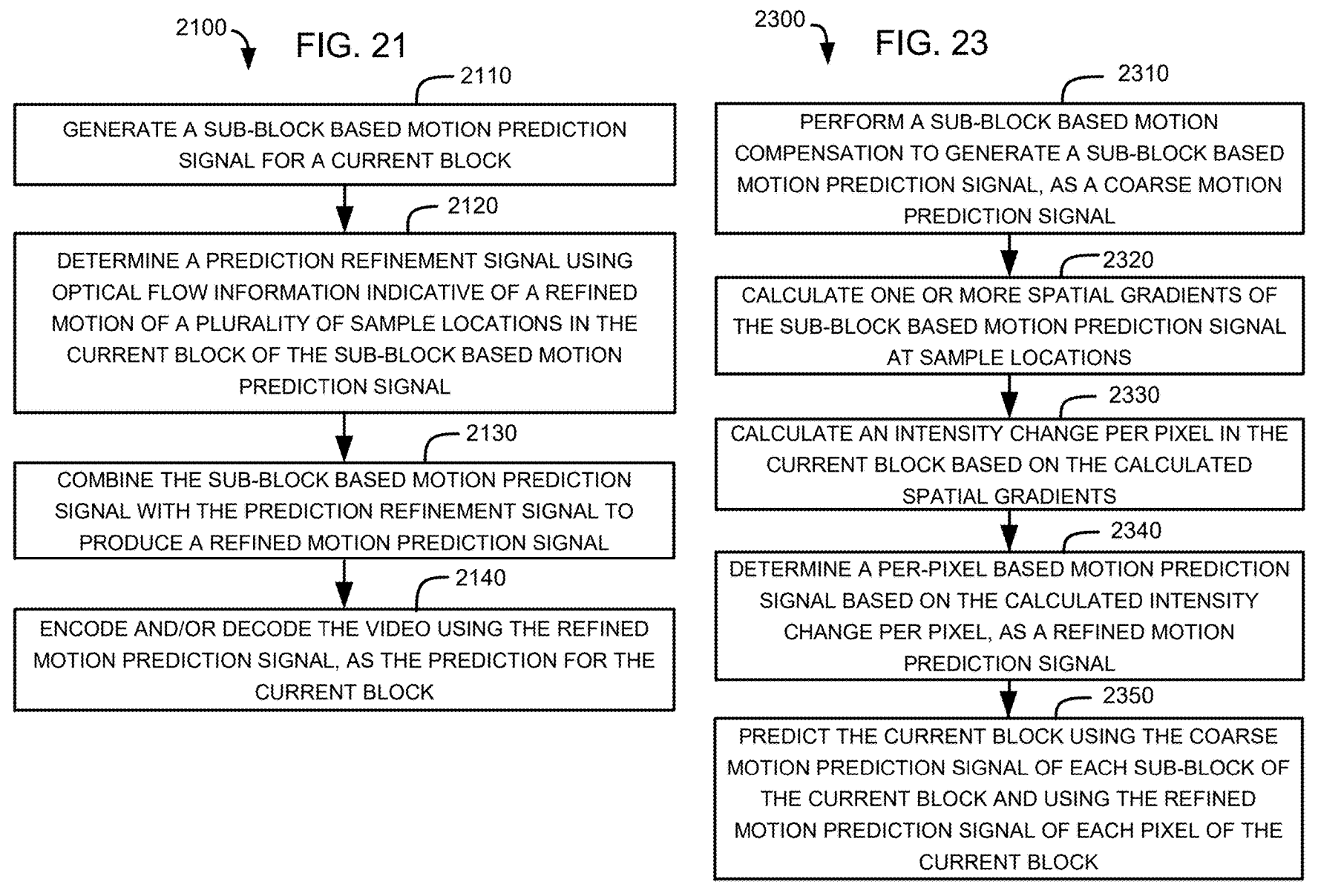

PERFORM A SUB-BLOCK BASED MOTION COMPENSATION TO GENERATE A SUB-BLOCK BASED MOTION PREDICTION SIGNAL, AS A COARSE MOTION PREDICTION SIGNAL

2310

CALCULATE ONE OR MORE SPATIAL GRADIENTS OF THE SUB-BLOCK BASED MOTION PREDICTION SIGNAL AT SAMPLE LOCATIONS

2320

CALCULATE AN INTENSITY CHANGE PER PIXEL IN THE CURRENT BLOCK BASED ON THE CALCULATED SPATIAL GRADIENTS

2330

DETERMINE A PER-PIXEL BASED MOTION PREDICTION SIGNAL BASED ON THE CALCULATED INTENSITY CHANGE PER PIXEL, AS A REFINED MOTION PREDICTION SIGNAL

2340

PREDICT THE CURRENT BLOCK USING THE COARSE MOTION PREDICTION SIGNAL OF EACH SUB-BLOCK OF THE CURRENT BLOCK AND USING THE REFINED MOTION PREDICTION SIGNAL OF EACH PIXEL OF THE CURRENT BLOCK

GENERATE A SUB-BLOCK BASED MOTION PREDICTION SIGNAL FOR A CURRENT BLOCK

2110

DETERMINE A PREDICTION REFINEMENT SIGNAL USING OPTICAL FLOW INFORMATION INDICATIVE OF A REFINED MOTION OF A PLURALITY OF SAMPLE LOCATIONS IN THE CURRENT BLOCK OF THE SUB-BLOCK BASED MOTION PREDICTION SIGNAL

2120

COMBINE THE SUB-BLOCK BASED MOTION PREDICTION SIGNAL WITH THE PREDICTION REFINEMENT SIGNAL TO PRODUCE A REFINED MOTION PREDICTION SIGNAL

2130

ENCODE AND/OR DECODE THE VIDEO USING THE REFINED MOTION PREDICTION SIGNAL, AS THE PREDICTION FOR THE CURRENT BLOCK

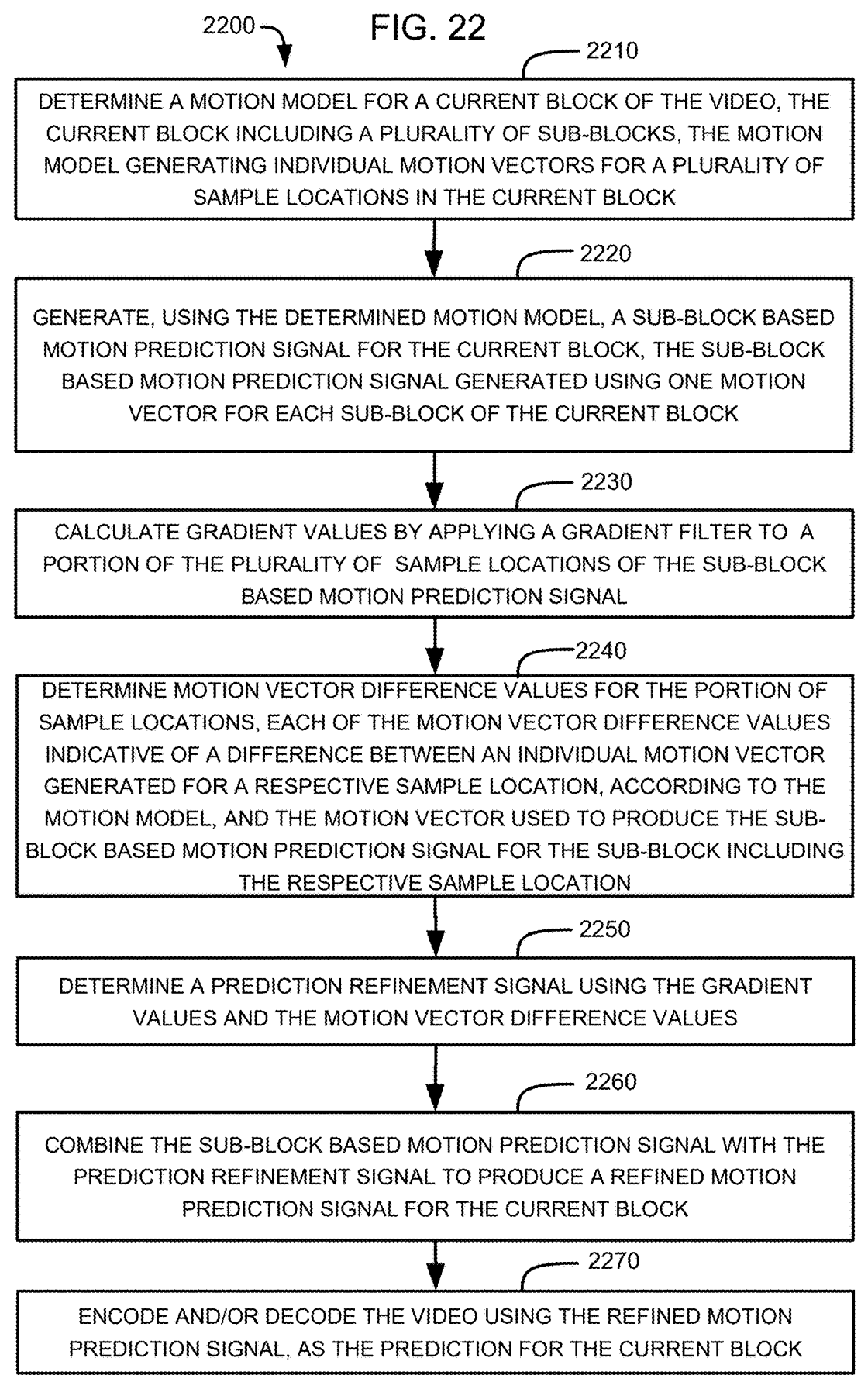

DETERMINE A MOTION MODEL FOR A CURRENT BLOCK OF THE VIDEO, THE
CURRENT BLOCK INCLUDING A PLURALITY OF SUB-BLOCKS, THE MOTION
MODEL GENERATING INDIVIDUAL MOTION VECTORS FOR A PLURALITY OF
SAMPLE LOCATIONS IN THE CURRENT BLOCK

⌐ 2220

GENERATE, USING THE DETERMINED MOTION MODEL, A SUB-BLOCK BASED
MOTION PREDICTION SIGNAL FOR THE CURRENT BLOCK, THE SUB-BLOCK
BASED MOTION PREDICTION SIGNAL GENERATED USING ONE MOTION
VECTOR FOR EACH SUB-BLOCK OF THE CURRENT BLOCK

⌐ 2230

CALCULATE GRADIENT VALUES BY APPLYING A GRADIENT FILTER TO A
PORTION OF THE PLURALITY OF SAMPLE LOCATIONS OF THE SUB-BLOCK
BASED MOTION PREDICTION SIGNAL

⌐2240

DETERMINE MOTION VECTOR DIFFERENCE VALUES FOR THE PORTION OF
SAMPLE LOCATIONS, EACH OF THE MOTION VECTOR DIFFERENCE VALUES
INDICATIVE OF A DIFFERENCE BETWEEN AN INDIVIDUAL MOTION VECTOR
GENERATED FOR A RESPECTIVE SAMPLE LOCATION, ACCORDING TO THE
MOTION MODEL, AND THE MOTION VECTOR USED TO PRODUCE THE SUB-
BLOCK BASED MOTION PREDICTION SIGNAL FOR THE SUB-BLOCK INCLUDING
THE RESPECTIVE SAMPLE LOCATION

⌐ 2250

DETERMINE A PREDICTION REFINEMENT SIGNAL USING THE GRADIENT
VALUES AND THE MOTION VECTOR DIFFERENCE VALUES

⌐ 2260

COMBINE THE SUB-BLOCK BASED MOTION PREDICTION SIGNAL WITH THE
PREDICTION REFINEMENT SIGNAL TO PRODUCE A REFINED MOTION
PREDICTION SIGNAL FOR THE CURRENT BLOCK

⌐ 2270

ENCODE AND/OR DECODE THE VIDEO USING THE REFINED MOTION
PREDICTION SIGNAL, AS THE PREDICTION FOR THE CURRENT BLOCK

2400 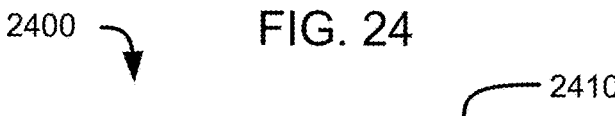          FIG. 24

2410

PERFORM A SUB-BLOCK BASED MOTION COMPENSATION TO GENERATE A SUB-BLOCK BASED MOTION PREDICTION SIGNAL, AS A COARSE MOTION PREDICTION SIGNAL

2420

FOR EACH RESPECTIVE BORDER SAMPLE OF A SUB-BLOCK OF THE CURRENT BLOCK: DETERMINE ONE OR MORE REFERENCE SAMPLES CORRESPONDING TO SAMPLES ADJACENT TO THE RESPECTIVE BORDER SAMPLE AND SURROUNDING THE SUB-BLOCK, AS SURROUNDING REFERENCE SAMPLES, AND DETERMINE, USING THE SURROUNDING REFERENCE SAMPLES AND SAMPLES OF THE SUB- BLOCK ADJACENT TO THE RESPECTIVE BORDER SAMPLE, ONE OR MORE SPATIAL GRADIENTS ASSOCIATED WITH THE RESPECTIVE BORDER SAMPLE

2430

FOR EACH RESPECTIVE NON-BORDER SAMPLE IN THE SUB-BLOCK, DETERMINE, USING SAMPLES OF THE SUB-BLOCK ADJACENT TO THE RESPECTIVE NON-BORDER SAMPLE, ONE OR MORE SPATIAL GRADIENTS ASSOCIATED WITH THE RESPECTIVE NON-BORDER SAMPLE

2440

CALCULATE AN INTENSITY CHANGE PER PIXEL IN THE CURRENT BLOCK USING THE DETERMINED SPATIAL GRADIENTS OF THE SUB-BLOCK

2450

DETERMINE A PER-PIXEL BASED MOTION PREDICTION SIGNAL BASED ON THE CALCULATED INTENSITY CHANGE PER PIXEL, AS A REFINED MOTION PREDICTION SIGNAL

2460

PREDICT THE CURRENT BLOCK USING THE COARSE MOTION PREDICTION SIGNAL ASSOCIATED WITH EACH SUB-BLOCK OF THE CURRENT BLOCK AND USING THE REFINED MOTION PREDICTION SIGNAL ASSOCIATED WITH EACH PIXEL OF THE CURRENT BLOCK

Figures 25, 26:
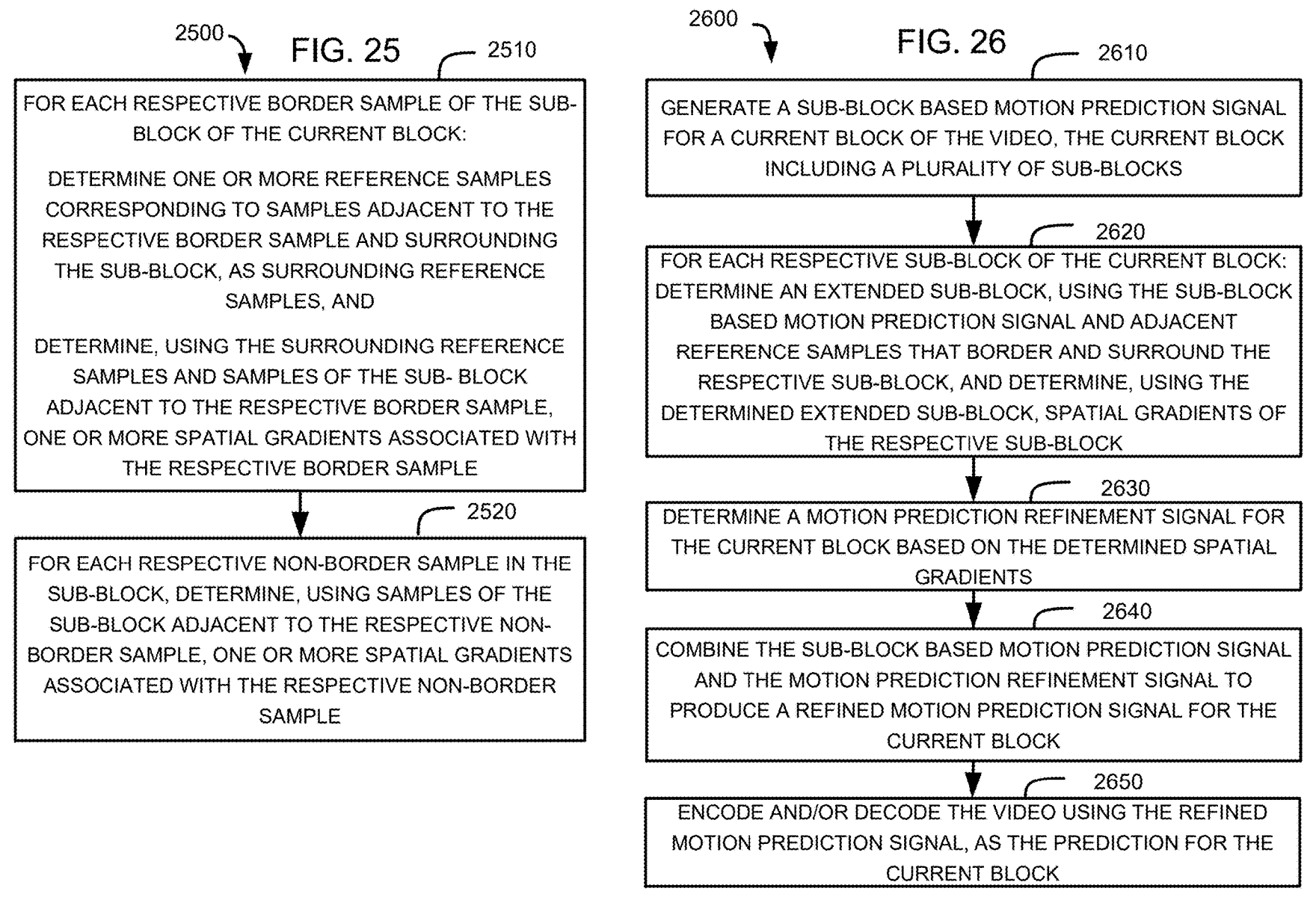

GENERATE A SUB-BLOCK BASED MOTION PREDICTION SIGNAL FOR A CURRENT BLOCK OF THE VIDEO, THE CURRENT BLOCK INCLUDING A PLURALITY OF SUB-BLOCKS

2620

FOR EACH RESPECTIVE SUB-BLOCK OF THE CURRENT BLOCK: DETERMINE AN EXTENDED SUB-BLOCK, USING THE SUB-BLOCK BASED MOTION PREDICTION SIGNAL AND ADJACENT REFERENCE SAMPLES THAT BORDER AND SURROUND THE RESPECTIVE SUB-BLOCK, AND DETERMINE, USING THE DETERMINED EXTENDED SUB-BLOCK, SPATIAL GRADIENTS OF THE RESPECTIVE SUB-BLOCK

2630

DETERMINE A MOTION PREDICTION REFINEMENT SIGNAL FOR THE CURRENT BLOCK BASED ON THE DETERMINED SPATIAL GRADIENTS

2640

COMBINE THE SUB-BLOCK BASED MOTION PREDICTION SIGNAL AND THE MOTION PREDICTION REFINEMENT SIGNAL TO PRODUCE A REFINED MOTION PREDICTION SIGNAL FOR THE CURRENT BLOCK

2650

ENCODE AND/OR DECODE THE VIDEO USING THE REFINED MOTION PREDICTION SIGNAL, AS THE PREDICTION FOR THE CURRENT BLOCK

FOR EACH RESPECTIVE BORDER SAMPLE OF THE SUB-BLOCK OF THE CURRENT BLOCK:

DETERMINE ONE OR MORE REFERENCE SAMPLES CORRESPONDING TO SAMPLES ADJACENT TO THE RESPECTIVE BORDER SAMPLE AND SURROUNDING THE SUB-BLOCK, AS SURROUNDING REFERENCE SAMPLES, AND

DETERMINE, USING THE SURROUNDING REFERENCE SAMPLES AND SAMPLES OF THE SUB-BLOCK ADJACENT TO THE RESPECTIVE BORDER SAMPLE, ONE OR MORE SPATIAL GRADIENTS ASSOCIATED WITH THE RESPECTIVE BORDER SAMPLE

2520

FOR EACH RESPECTIVE NON-BORDER SAMPLE IN THE SUB-BLOCK, DETERMINE, USING SAMPLES OF THE SUB-BLOCK ADJACENT TO THE RESPECTIVE NON-BORDER SAMPLE, ONE OR MORE SPATIAL GRADIENTS ASSOCIATED WITH THE RESPECTIVE NON-BORDER SAMPLE

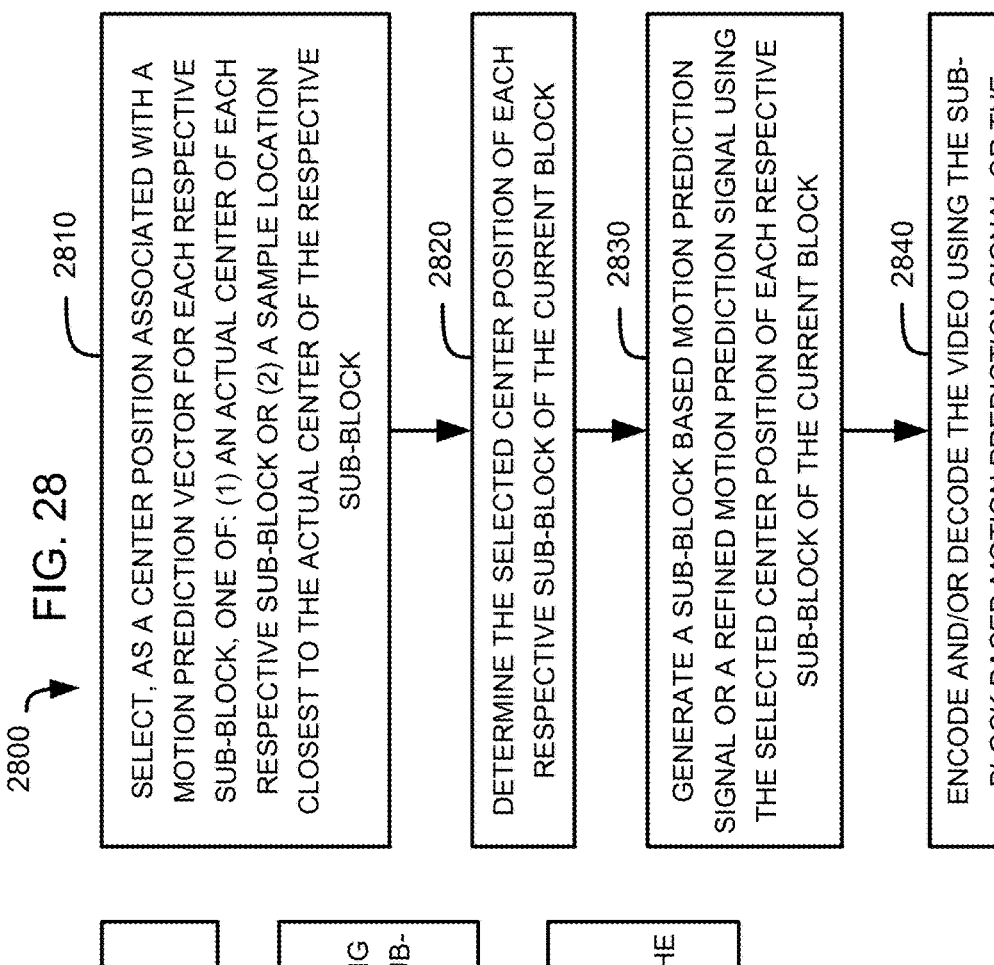

2810
SELECT, AS A CENTER POSITION ASSOCIATED WITH A MOTION PREDICTION VECTOR FOR EACH RESPECTIVE SUB-BLOCK, ONE OF: (1) AN ACTUAL CENTER OF EACH RESPECTIVE SUB-BLOCK OR (2) A SAMPLE LOCATION CLOSEST TO THE ACTUAL CENTER OF THE RESPECTIVE SUB-BLOCK

2820
DETERMINE THE SELECTED CENTER POSITION OF EACH RESPECTIVE SUB-BLOCK OF THE CURRENT BLOCK

2830
GENERATE A SUB-BLOCK BASED MOTION PREDICTION SIGNAL OR A REFINED MOTION PREDICTION SIGNAL USING THE SELECTED CENTER POSITION OF EACH RESPECTIVE SUB-BLOCK OF THE CURRENT BLOCK

2840
ENCODE AND/OR DECODE THE VIDEO USING THE SUB-BLOCK BASED MOTION PREDICTION SIGNAL OR THE GENERATED REFINED MOTION PREDICTION SIGNAL, AS THE PREDICTION FOR THE CURRENT BLOCK

2710
DETERMINE AN ACTUAL CENTER POSITION OF EACH RESPECTIVE SUB-BLOCK OF THE CURRENT BLOCK

2720
GENERATE A SUB-BLOCK BASED MOTION PREDICTION SIGNAL OR A REFINED MOTION PREDICTION SIGNAL USING THE ACTUAL CENTER POSITION OF EACH RESPECTIVE SUB-BLOCK OF THE CURRENT BLOCK

2730
ENCODE AND/OR DECODE THE VIDEO USING THE SUB-BLOCK BASED MOTION PREDICTION SIGNAL OR THE GENERATED REFINED MOTION PREDICTION SIGNAL, AS THE PREDICTION FOR THE CURRENT BLOCK

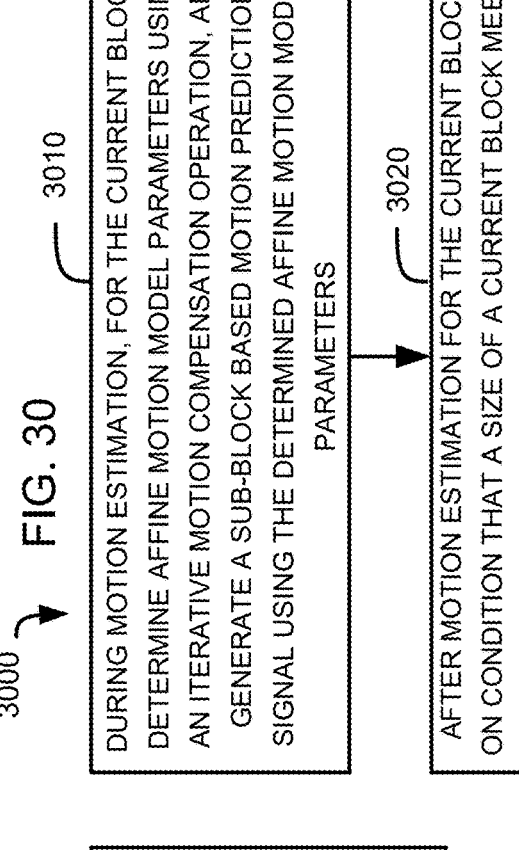

DURING MOTION ESTIMATION, FOR THE CURRENT BLOCK, DETERMINE AFFINE MOTION MODEL PARAMETERS USING AN ITERATIVE MOTION COMPENSATION OPERATION, AND GENERATE A SUB-BLOCK BASED MOTION PREDICTION SIGNAL USING THE DETERMINED AFFINE MOTION MODEL PARAMETERS

3020

AFTER MOTION ESTIMATION FOR THE CURRENT BLOCK, ON CONDITION THAT A SIZE OF A CURRENT BLOCK MEETS OR EXCEEDS A THRESHOLD SIZE, PERFORM A PREDICTION REFINEMENT WITH OPTICAL FLOW (PROF) OPERATION TO GENERATE A REFINED MOTION PREDICTION SIGNAL

3030

ENCODE THE VIDEO: (1) USING THE REFINED MOTION PREDICTION SIGNAL, AS THE PREDICTION FOR THE CURRENT BLOCK, ON CONDITION THAT THE CURRENT BLOCK MEETS OR EXCEEDS THE THRESHOLD SIZE OR (2) USING THE SUB-BLOCK BASED MOTION PREDICTION SIGNAL, AS THE PREDICTION FOR THE CURRENT BLOCK, ON CONDITION THAT THE CURRENT BLOCK DOES NOT MEET THE THRESHOLD SIZE

PERFORM MOTION ESTIMATION FOR THE CURRENT BLOCK OF THE VIDEO, INCLUDING:
DETERMINE AFFINE MOTION MODEL PARAMETERS FOR THE CURRENT BLOCK USING AN ITERATIVE MOTION COMPENSATION OPERATION, AND
GENERATE A SUB-BLOCK BASED MOTION PREDICTION SIGNAL FOR THE CURRENT BLOCK USING THE DETERMINED AFFINE MOTION MODEL PARAMETERS

2920

AFTER PERFORMING MOTION ESTIMATION FOR THE CURRENT BLOCK, PERFORM A PREDICTION REFINEMENT WITH OPTICAL FLOW (PROF) OPERATION TO GENERATE A REFINED MOTION PREDICTION SIGNAL

2930

ENCODE THE VIDEO USING THE REFINED MOTION PREDICTION SIGNAL, AS THE PREDICTION FOR THE CURRENT BLOCK

3210 — DETERMINE WHETHER A PIXEL LEVEL MOTION COMPENSATION IS TO BE PERFORMED OR RECEIVE A FLAG INDICATING WHETHER A PIXEL LEVEL MOTION COMPENSATION IS TO BE PERFORMED

3220 — GENERATING A SUB-BLOCK BASED MOTION PREDICTION SIGNAL

3230 — ON CONDITION THAT THE DETERMINATION OR THE FLAG INDICATES THAT THE PIXEL LEVEL MOTION COMPENSATION IS TO BE PERFORMED: DETERMINE ONE OR MORE SPATIAL GRADIENTS OF THE SUB-BLOCK BASED MOTION PREDICTION SIGNAL, DETERMINE A MOTION PREDICTION REFINEMENT SIGNAL FOR THE CURRENT BLOCK BASED ON THE DETERMINED SPATIAL GRADIENTS, AND COMBINE THE SUB-BLOCK BASED MOTION PREDICTION SIGNAL AND THE MOTION PREDICTION REFINEMENT SIGNAL TO PRODUCE A REFINED MOTION PREDICTION SIGNAL FOR THE CURRENT BLOCK

3240 — ENCODE AND/OR DECODE THE VIDEO USING THE SUB-BLOCK BASED MOTION PREDICTION SIGNAL OR THE REFINED MOTION PREDICTION SIGNAL IN ACCORDANCE WITH THE DETERMINATION OR AN INDICATION OF THE FLAG, AS THE PREDICTION FOR THE CURRENT BLOCK

3110 — RECEIVE OR OBTAIN INFORMATION INDICATING A SIZE OF A CURRENT BLOCK

3120 — GENERATE A SUB-BLOCK BASED MOTION PREDICTION SIGNAL FOR THE CURRENT BLOCK

3130 — ON CONDITION THAT THE SIZE OF THE CURRENT BLOCK MEETS OR EXCEEDS A THRESHOLD SIZE, PERFORM A PREDICTION REFINEMENT WITH OPTICAL FLOW (PROF) OPERATION TO GENERATE A REFINED MOTION PREDICTION SIGNAL

3140 — ENCODE AND/OR DECODE THE VIDEO: (1) USING THE REFINED MOTION PREDICTION SIGNAL, AS THE PREDICTION FOR THE CURRENT BLOCK, ON CONDITION THAT THE CURRENT BLOCK MEETS OR EXCEEDS THE THRESHOLD SIZE OR (2) USING THE SUB-BLOCK BASED MOTION PREDICTION SIGNAL, AS THE PREDICTION FOR THE CURRENT BLOCK, ON CONDITION THAT THE CURRENT BLOCK DOES NOT MEET THE THRESHOLD SIZE

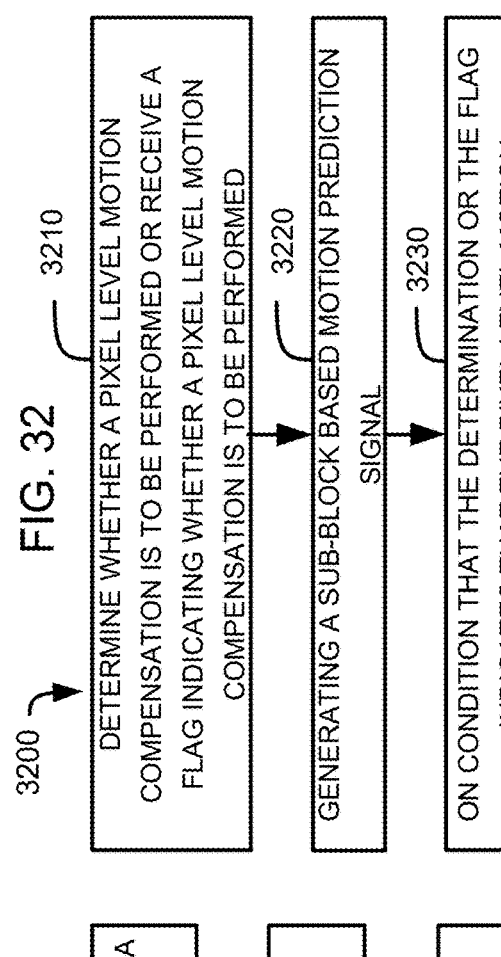

SYSTEMS, APPARATUS AND METHODS FOR INTER PREDICTION REFINEMENT WITH OPTICAL FLOW

CROSS REFERENCE

This application is a Continuation of U.S. application Ser. No. 18/199,238. filed May 18, 2023, which is a Continuation of U.S. application Ser. No. 17/426,976, filed Jul. 29, 2021 (U.S. Pat. No. 11,695,950), which is a National Phase entry under 35 U.S.C. § 371 of International Application No. PCT/US2020/016564, filed Feb. 4, 2020, which claims the benefit of U.S. Provisional Patent Application Nos. 62/833,999, filed on Apr. 15, 2019, 62/814,611, filed on Mar. 6, 2019, and 62/802,428 filed on Feb. 7, 2019, the contents of each of which are hereby incorporated by reference herein.

FIELD OF DISCLOSURE

This application relates to video coding and, in particular, systems, apparatus, and methods using inter-prediction refinement with optical flow.

RELATED ART

Video coding systems are widely used to compress digital video signals to reduce the storage and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

SUMMARY OF EMBODIMENT

In one representative embodiment, a method of decoding includes: obtaining a sub-block based motion prediction signal for a current block of the video; obtaining one or more spatial gradients of the sub-block based motion prediction signal or one or more motion vector difference values; obtaining a refinement signal for the current block based on the one or more obtained spatial gradients or the one or more obtained motion vector difference values; obtaining a refined motion prediction signal for the current block based on the sub-block based motion prediction signal and the refinement signal; and decoding the current block based on the refined motion prediction signal. Various other embodiments are also disclosed herein.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 1 is a block diagram illustrating a representative block-based video encoding system;

FIG. 2 is a block diagram illustrating a representative block-based video decoder;

FIG. 3 is a block diagram illustrating a representative block-based video encoder with generalized bi-prediction (GBi) support;

FIG. 4 is a diagram illustrating a representative GBi module for an encoder;

FIG. 5 is a diagram illustrating a representative block-based video decoder with GBi support;

FIG. 6 is a diagram illustrating a representative GBi module for a decoder;

FIG. 7 is a diagram illustrating a representative bidirectional optical flow;

FIGS. 8A and 8B are diagrams illustrating a representative four-parameter affine mode;

FIG. 9 is a diagram illustrating a representative six-parameter affine mode;

FIG. 10 is a diagram illustrating a representative interweaved prediction procedure;

FIG. 11 is a diagram illustrating representative weight values (e.g., associated with pixels) in a sub-block;

FIG. 12 is a diagram illustrating regions in which interweaved prediction is applied and other regions in which the interweaved prediction is not applied;

FIGS. 13A and 13B are diagrams illustrating a SbTMVP process;

FIG. 14 is a diagram illustrating neighboring motion blocks (e.g., 4×4 motion blocks) that may be used for motion parameter derivation;

FIG. 15 is a diagram illustrating neighboring motion blocks that may be used for motion parameter derivation;

FIG. 16 Is a diagram illustrating a sub-block MV and pixel-level MV difference Av (i,j) after a sub-block based affine motion compensated prediction;

FIG. 17A is a diagram illustrating a representative procedure for determining a MV corresponding to an actual center of a sub-block;

FIG. 17B is a diagram illustrating locations of chroma samples in a 4:2:0 chroma format;

FIG. 17C is a diagram illustrating an extended prediction sub-block;

FIG. 18A is a flowchart illustrating a first representative encoding/decoding method;

FIG. 18B is a flowchart illustrating a second representative encoding/decoding method;

FIG. 19 is a flowchart illustrating a third representative encoding/decoding method;

FIG. 20 is a flowchart illustrating a fourth representative encoding/decoding method;

FIG. 21 is a flowchart illustrating a fifth representative encoding/decoding method;

FIG. 22 is a flowchart illustrating a sixth representative encoding/decoding method;

FIG. 23 is a flowchart illustrating a seventh representative encoding/decoding method;

FIG. 24 is a flowchart illustrating an eighth representative encoding/decoding method;

FIG. 25 is a flowchart illustrating a representative gradient calculation method;

FIG. 26 is a flowchart illustrating a ninth representative encoding/decoding method;

FIG. 27 is a flowchart illustrating a tenth representative encoding/decoding method;

FIG. 28 is a flowchart illustrating an eleventh representative encoding/decoding method;

FIG. 29 is a flowchart illustrating a representative encoding method;

3

Figure 34A:
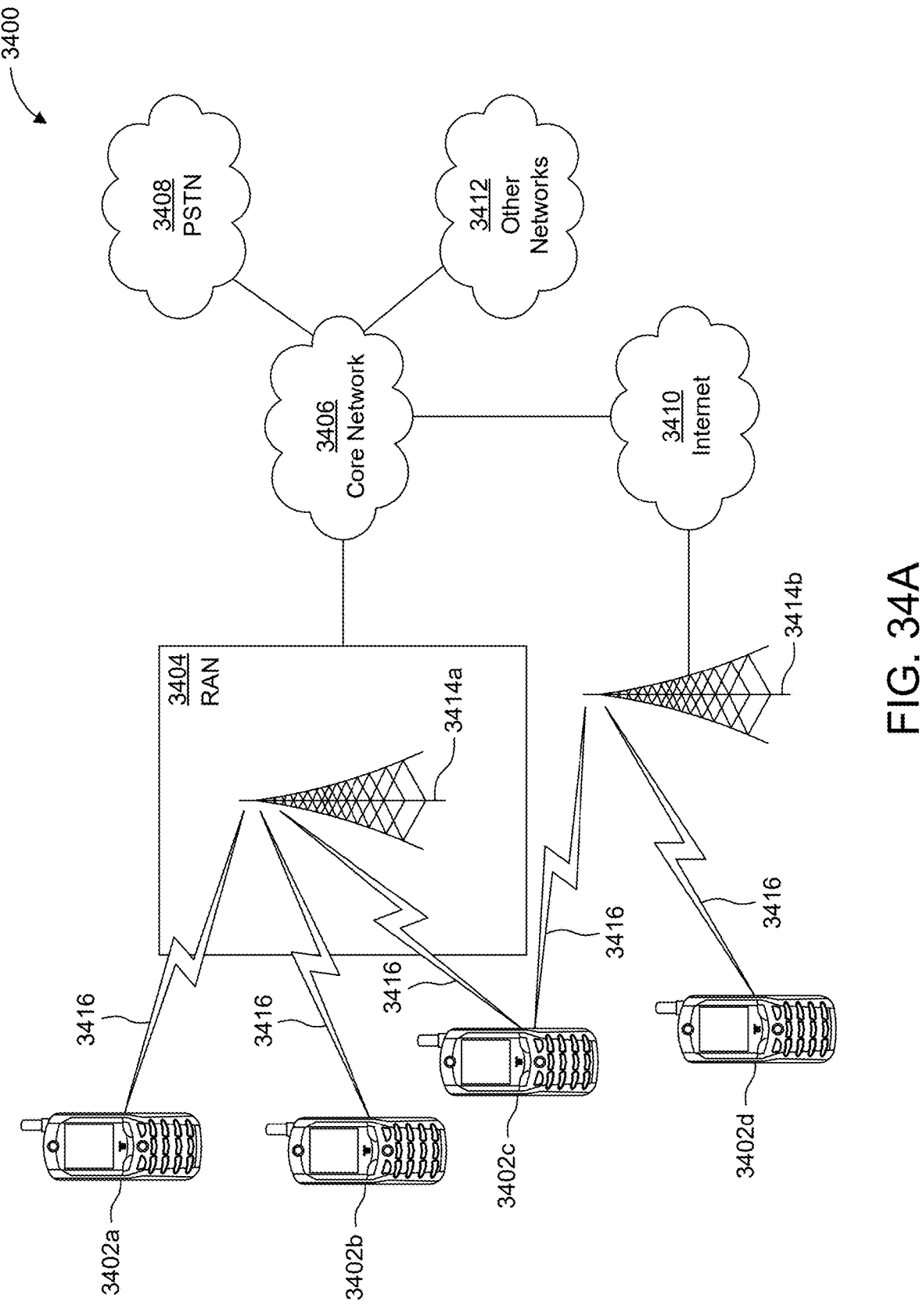
Figure 34B:
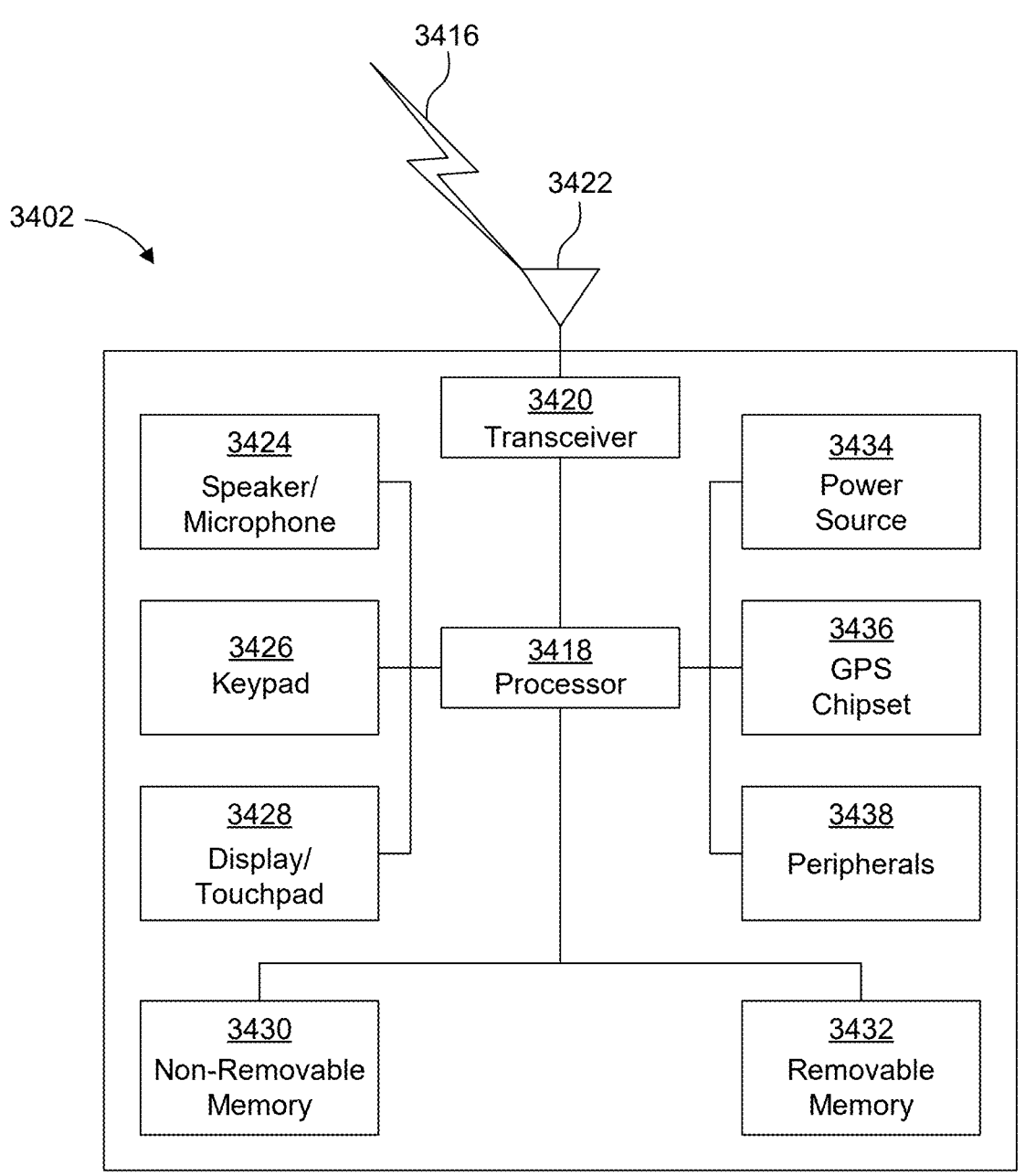
Figure 34C:
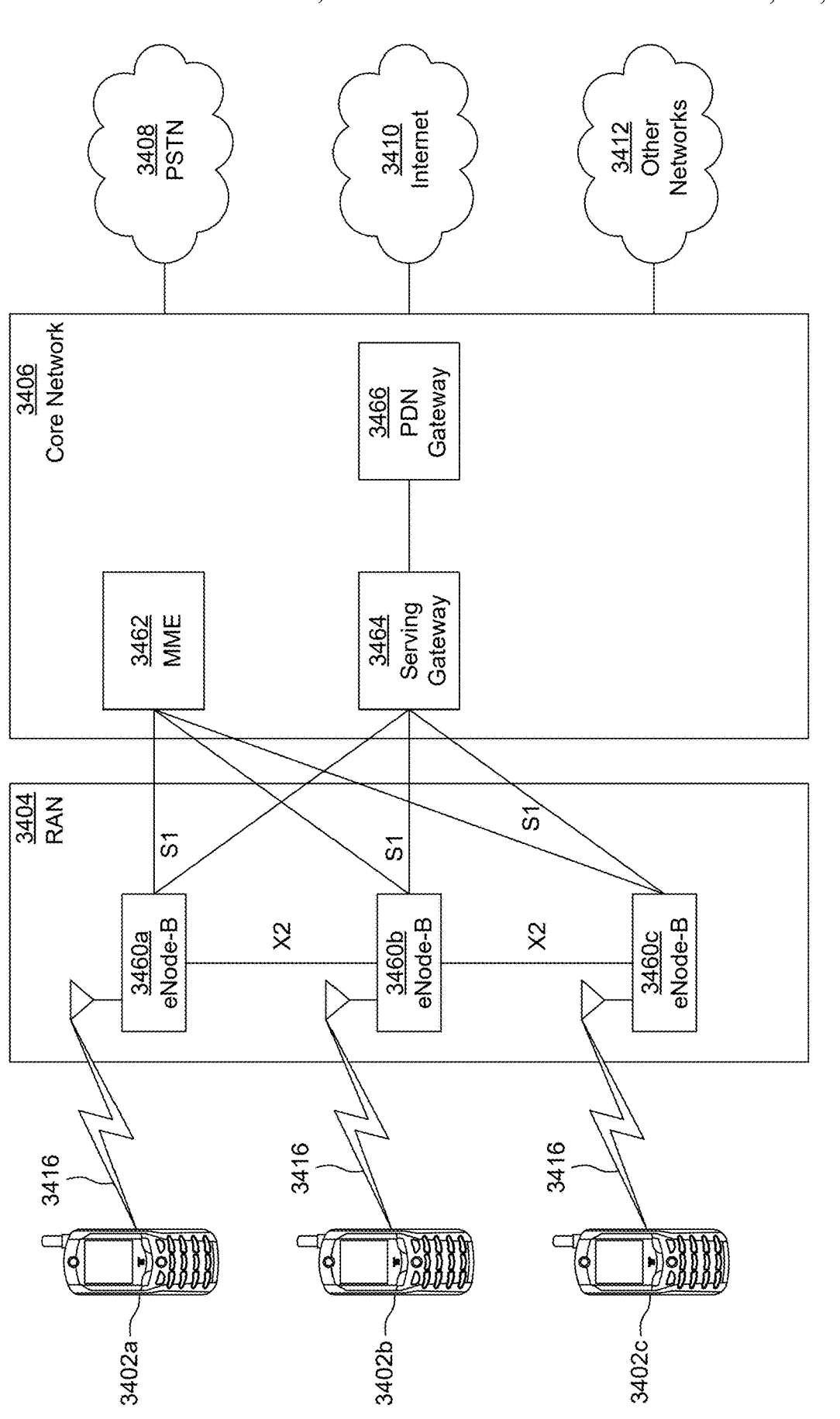
Figure 34D:
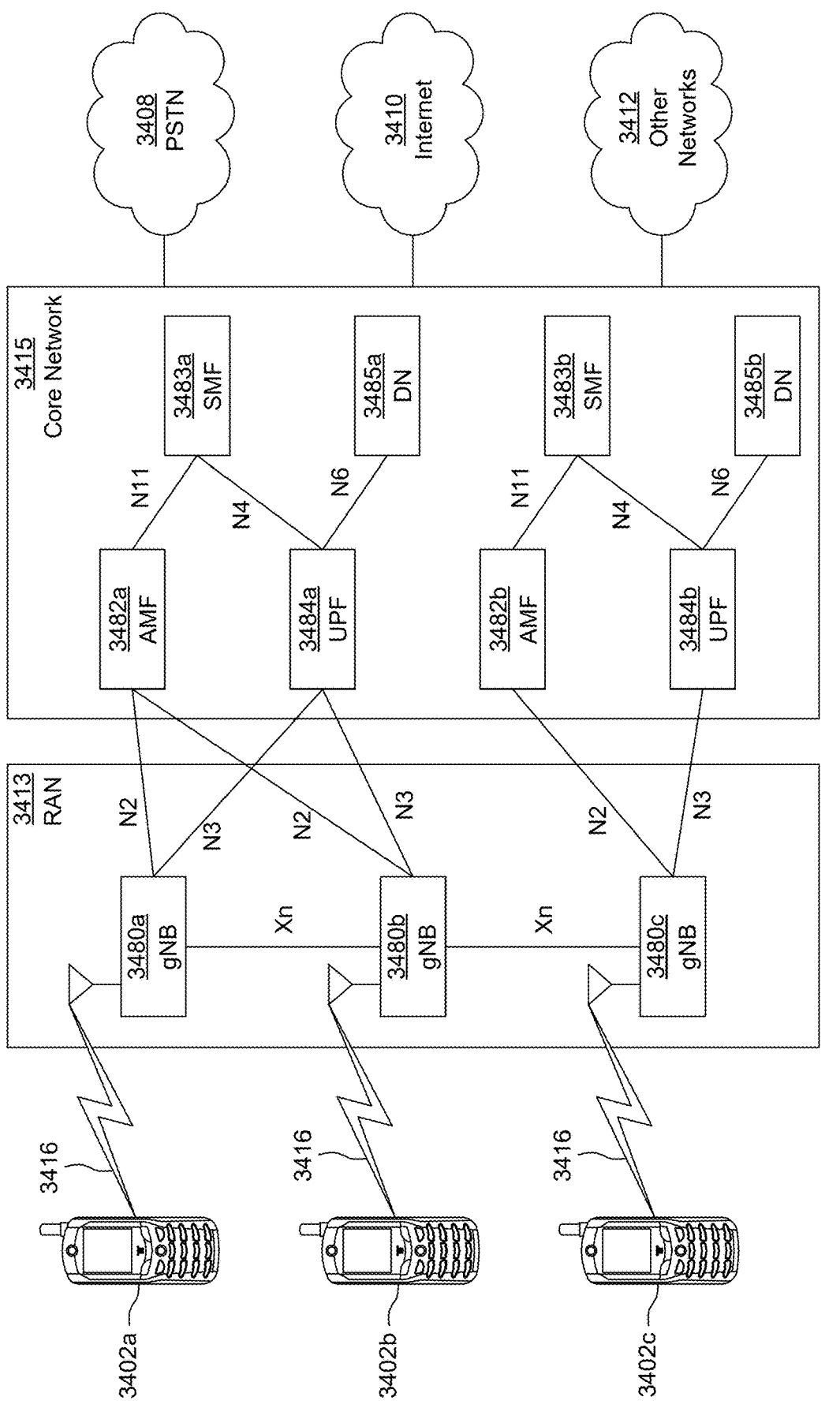

FIG. 30 is a flowchart illustrating another representative encoding method;

FIG. 31 is a flowchart illustrating a twelfth representative encoding/decoding method;

FIG. 32 is a flowchart illustrating a thirteenth representative encoding/decoding method;

FIG. 33 is a flowchart illustrating a fourteenth representative encoding/decoding method;

FIG. 34A is a system diagram illustrating an example communications system in which one or more disclosed embodiments may be implemented;

FIG. 34B is a system diagram illustrating an example wireless transmit/receive unit (WTRU) that may be used within the communications system illustrated in FIG. 34A according to an embodiment;

FIG. 34C is a system diagram illustrating an example radio access network (RAN) and an example core network (CN) that may be used within the communications system illustrated in FIG. 34A according to an embodiment; and FIG. 34D is a system diagram illustrating a further example RAN and a further example CN that may be used within the communications system illustrated in FIG. 34A according to an embodiment.

DETAILED DESCRIPTION

Block-based Hybrid Video Coding Procedures

Like HEVC, VVC is built upon the block-based hybrid video coding framework.

FIG. 1 is a block diagram illustrating a generic block-based hybrid video encoding system.

Referring to FIG. 1, the encoder 100 may be provided with an input video signal 102 that is processed block-by-block (called coding units (CUs)) and may be used to efficiently compress high resolution (1080p and beyond) video signals. In HEVC, a CU may be up to 64×64 pixels. A CU can be further partitioned into prediction units or PU, for which separate prediction procedures may be applied. For each input video block (MB and/or CU), spatial prediction 160 and/or temporal prediction 162 may be performed. Spatial prediction (or "intra prediction") may use pixels from the already coded neighboring blocks in the same video picture/slice to predict the current video block.

Spatial prediction may reduce spatial redundancy inherent in the video signal. Temporal prediction (also referred to as "inter prediction" or "motion compensated prediction") uses pixels from the already coded video pictures to predict the current video block. Temporal prediction may reduce temporal redundancy inherent in the video signal. Temporal prediction signal for a given video block may be (e.g., may usually be) signaled by one or more motion vectors (MVs) which may indicate the amount and/or the direction of motion between the current block (CU) and its reference block.

If multiple reference pictures are supported (as is the case for the recent video coding standards such as H.264/AVC or HEVC), for each video block, its reference picture index may be sent (e.g., may be additionally sent); and/or the reference index may be used to identify from which reference picture in the reference picture store 164 the temporal prediction signal comes. After spatial and/or temporal prediction, the mode decision block 180 in the encoder 100 may choose the best prediction mode, for example based on the rate-distortion optimization method/procedure. The prediction block from either the spatial prediction 160 or temporal prediction 162 may be subtracted from the current video block 116; and/or the prediction residual may be de-correlated using transform 104 and quantized 106 to achieve the target bit-rate. The quantized residual coefficients may be inverse quantized 110 and inverse transformed 112 to form the reconstructed residual, which may be added back to the prediction block at 126 to form the reconstructed video block. Further in-loop filtering 166 such as de-blocking filter and Adaptive Loop Filters may be applied to the reconstructed video block before it is put in the reference picture store 164 and may be used to code future video blocks. To form the output video bit-stream 120, coding mode (inter or intra), prediction mode information, motion information, and quantized residual coefficients may be sent (e.g., all sent) to the entropy coding unit 108 to be further compressed and/or packed to form the bit-stream.

The encoder 100 may be implemented using a processor, memory and a transmitter that provide the various elements/modules/units disclosed above. For example, one of skill in the art understands that: the transmitter may transmit a bitstream 120 to a decoder; and that (2) the processor may be configured to execute software to enable reception of the input video 102 and performance of functions associated with the various blocks of encoder 100.

FIG. 2 is a block diagram illustrating a block-based video decoder.

Referring to FIG. 2, the video decoder 200 may be provided with the video bit-stream 202 that may be unpacked and entropy decoded at entropy decoding unit 208. The coding mode and the prediction information may be sent to the spatial prediction unit 260 (for intra-coding mode) and/or the temporal prediction unit 262 (for inter-coding mode) for the appropriate one thereof to form the prediction block. The residual transform coefficients may be sent to an inverse quantization unit 210 and inverse transform unit 212 to reconstruct the residual block. The reconstructed block may further go through in-loop filtering 266 before it is stored in reference picture store 264. The reconstructed video 220 may be sent out, for example to drive a display device, in addition to being saved in the reference picture store 264 for use in predicting future video blocks.

The decoder 200 may be implemented using a processor, memory and a receiver that may provide for the various elements/modules/units disclosed above. For example, one of skill in the art understands that: (1) the receiver may be configured to receive a bitstream 202; and (2) the processor may be configured to execute software to enable reception of the bitstream 202 and output of the reconstructed video 220 and performance of functions associated with the various blocks of decoder 200.

One of skill in the art understands that many of the functions/operations/processes of a block based encoder and a block based decoder are the same.

In modern video codecs, bi-directional motion compensated prediction (MCP) may be used for high efficiency in removing temporal redundancy by exploiting temporal correlations between pictures. The bi-prediction signal may be formed by combining two uni-prediction signals using a weight value equal to 0.5, which may not be optimal to combine the uni-prediction signals, especially in some condition that illuminance changes rapidly from one reference picture to another. Certain prediction techniques/operations and/or procedures may be implemented to compensate for the illuminance variation over time by applying some global/local weights and/or offset values to sample values in reference pictures (e.g., some or each of the sample values in reference pictures).

The use of bi-directional motion compensated prediction (MCP) in video codecs enables removal of temporal redundancies by exploiting temporal correlations between pictures. A bi-prediction signal may be formed by combining two uni-prediction signals using a weight value (e.g., 0.5). In certain videos, illuminance characteristics may change rapidly from one reference picture to another. Thus, prediction techniques may compensate for variations in illuminance over time (e.g., fading transitions) by applying global or local weights and/or offset values to one or more sample values in the reference pictures.

Generalized Bi-prediction (GBi) may improve the MCP for bi-prediction mode. In bi-prediction mode, the prediction signal at sample x as given may be calculated by Equation 1 as follows:

$$P[x] = w_0 * P_0 [x + v_0] + w_1 * P_1 [x + v_1] \qquad (1)$$

In the foregoing equation, P[x] may denote the resulting prediction signal of a sample x located at a picture position x. Pi[x+vi] may be the motion-compensated prediction signal of x using the motion vector (MV) vi for i-th list (e.g. list 0, list 1, etc.). w0 and w1 may be the two weight values shared across (e.g., all) the samples in a block. Based on this equation, a variety of prediction signals may be obtained by adjusting the weight value, w0 and w1. Some configurations of w0 and w1 may imply the same prediction as uni-prediction and bi-prediction. For example, (w0, w1)=(1, 0) may be used for uni-prediction with reference list L0. (w0, w1)=(0, 1) may be used for uni-prediction with reference list L1. (w0, w1)=(0.5, 0.5) may be for the bi-prediction with two reference lists. The weight may be signaled per CU. To reduce the signaling overhead, a constraint may be applied, such as w0+w1=1, such that one weight may be signaled. As such, Equation 1 may be further simplified as set forth in Equation 2 as follows:

$$P[x] = (1 - w_1) * P_0[x + v_0] + w_1 * P_1[x + v_1] \qquad (2)$$

To further reduce the weight signaling overhead, w1 may be discretized (e.g., $-\frac{2}{8}$, $\frac{2}{8}$, $\frac{3}{8}$, $\frac{4}{8}$, $\frac{5}{8}$, $\frac{6}{8}$, $\frac{10}{8}$, etc.). Each weight value may then be indicated by an index value within a (e.g., small) limited range.

FIG. 3 is a block diagram illustrating a representative block-based video encoder with GBi support.

The encoder 300 may include a mode decision module 304, spatial prediction module 306, a motion prediction module 308, a transform module 310, a quantization module 312, an inverse quantization module 316, an inverse transform module 318, a loop filter 320, a reference picture store 322 and an entropy coding module 314. Some or all of the encoder's modules or components (e.g., the spatial prediction module 306) may be the same as, or similar to, those described in connection with FIG. 1. In addition, the spatial prediction module 306 and the motion prediction module 308 may be pixel-domain prediction modules. Thus, an input video bit-stream 302 may be processed in a similar manner as the input video bit-stream 102, though the motion prediction module 308 may further include GBi support. As such, the motion prediction module 308 may combine two separate prediction signals in a weighted-averaging manner. Further, the selected weight index may be signaled in the output video bitstream 324.

The encoder 300 may be implemented using a processor, memory and a transmitter that provide the various elements/modules/units disclosed above. For example, one of skill in the art understands that: the transmitter may transmit a bitstream 324 to a decoder; and that (2) the processor may be configured to execute software to enable reception of the input video 302 and performance of functions associated with the various blocks of encoder 300.

FIG. 4 is a diagram illustrating a representative GBi estimation module 400 that may be employed in a motion prediction module of an encoder, such as the motion prediction module 308. The GBi estimation module 400 may include a weight value estimation module 402 and a motion estimation module 404. As such, the GBi estimation module 400 may utilize a process (e.g., a two step operation/process) to generate an inter prediction signal, such as a final inter prediction signal. The motion estimation module 404 may perform motion estimation using an input video block 401 and one or more reference pictures received from a reference picture store 406 and by searching two optimal motion vectors (MVs) pointing to (e.g., two) reference blocks. The weight value estimation module 402 may receive: (1) an output of the motion estimation module 404 (for example motion vectors $v_0$ and $v_1$), one or more reference pictures from the reference picture store 406 and weight information W and may search for the optimal weight index to minimize the weighted bi-prediction error between the current video block and bi-prediction prediction. It is contemplated that weight information W may describe a list of available weight values or weight sets such that the determined weight index and the weight information W together may be used to specify the weights $w_0$ and $w_1$ to be used in GBi. The prediction signal of the generalized bi-prediction may be computed as a weighted average of the two prediction blocks. The output of the GBi estimation module 400 may include an inter-prediction signal, motion vectors $v_0$ and $v_1$, and/or weight index weight_idx, among others).

FIG. 5 is a diagram illustrating a representative block-based video decoder with GBi support that may decode a bit-stream 502 (e.g., from an encoder) that supports GBi, such as the bitstream 324 produced by encoder 300 described in connection with FIG. 3. As shown in FIG. 5, the video decoder 500 may include an entropy decoder 504, a spatial prediction module 506, a motion prediction module 508, a reference picture store 510, an inverse quantization module 512, an inverse transform module 514 and/or a loop filter module 518. Some or all of the decoder's modules may be the same as, or similar to, those described in connection with FIG. 2, though the motion prediction module 508 may further include GBi support. As such, the coding mode and prediction information may be used to derive a prediction signal using spatial prediction or MCP with GBi support. For GBi, the block motion information and weight value (e.g., in the form of an index indicating a weight value) may be received and decoded to generate the prediction block.

The decoder 500 may be implemented using a processor, memory and a receiver that may provide for the various elements/modules/units disclosed above. For example, one of skill in the art understands that: (1) the receiver may be configured to receive a bitstream 502; and (2) the processor may be configured to execute software to enable reception of the bitstream 502 and output of the reconstructed video 520 and performance of functions associated with the various blocks of decoder 500.

FIG. 6 is a diagram illustrating a representative GBi prediction module that may be employed in a motion prediction module of a decoder, such as the motion prediction module 508.

Referring to FIG. 6, the GBi prediction module may include a weighted averaging module 602 and a motion compensation module 604, which may receive one or more references pictures from a reference picture store 606. The weighted averaging module 602 may receive the output of the motion compensation module 604, weight information W and a weight index (e.g., weight_idx). The output of the motion compensation module 604 may include motion information, which may correspond to blocks of the picture. The GBi prediction module 600 may use the block motion information and weight value to compute a prediction signal of GBi (e.g., an inter prediction signal 608) as a weighted average of (e.g., two) motion compensated prediction blocks.

Representative Bi-Predictive Prediction Based on Optical Flow Model

FIG. 7 is a diagram illustrating a representative bidirectional optical flow.

Referring to FIG. 7, a bi-predictive prediction may be based on an optical flow model. For example a prediction associated with a current block (e.g., curblk 700) may be based on the optical flow associated with a first prediction block $I^{(0)}$ 702 (e.g., temporally previous prediction block, for example shifted in time by $\tau_0$) and a second prediction block $I^{(1)}$ 704 (e.g., temporally future block, for example shifted in time by $\tau_1$). The bi-prediction in video coding may be a combination of two temporal prediction blocks 702 and 704 obtained from the reference pictures that are already reconstructed. Due to the limitation of the block-based motion compensation (MC), there could be remaining small motion that can be observed between the samples of two prediction blocks, thus reducing the efficiency of motion compensated prediction. Bi-directional optical flow (BIO, or referred as BDOF) may be applied to reduce the impacts of such motion for every sample inside one block. BIO may provide a sample-wise motion refinement that may be performed on top of the block-based motion-compensated predictions when bi-prediction is used. For BIO, the derivation of the refined motion vector for each sample in one block may be based on a classical optical flow model. For example, where $I^{(k)}(x, y)$ is the sample value at the coordinate $(x, y)$ of the prediction block derived from the reference picture list k (k=0, 1), and $\partial I^{(k)}(x, y)/\partial x$ and $\partial I^{(k)}(x, y)/\partial y$ are the horizontal and vertical gradients of the sample, given the optical flow model, the motion refinement $(v_x, v_y)$ at $(x, y)$ may be derived by Equation 3 as follows:

$$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0 \quad (3)$$

In FIG. 7, $(MV_{x0}, MV_{y0})$ associated with the first prediction block 702 and $(MV_{x1}, MV_{y1})$ associated with the second prediction block 704 indicate the block-level motion vectors that may be used to generate the two prediction blocks $I^{(0)}$ and $I^{(1)}$. The motion refinement $(v_x, V_y)$ at the sample location $(x, y)$ may be calculated by minimizing the difference A between the values of the samples after motion refinement compensation (e.g., A and B in FIG. 7), as set forth in Equation 4 as follows:

$$\Delta(x, y) = I^{(0)}(x, y) - I^{(1)}(x, y) + v_x\left(\frac{\partial I^{(1)}(x, y)}{\partial x} + \frac{\partial I^{(0)}(x, y)}{\partial x}\right) + v_y\left(\frac{\partial I^{(1)}(x, y)}{\partial y} + \frac{\partial I^{(0)}(x, y)}{\partial y}\right) \quad (4)$$

For example, to ensure the regularity of the derived motion refinement, it is contemplated that the motion refinement is consistent for the samples inside one small unit (e.g., a 4×4 block or other small units). In Benchmark Set (BMS)-2.0, the value of $(v_x, V_y)$ is derived by minimizing $\Delta$ inside the 6×6 window $\Omega$ around each 4×4 block as set forth in Equation 5 as follows:

$$\left(v_x^*, v_y^*\right) = \underset{\left(v_x, v_y\right)}{\operatorname{argmin}} \sum\nolimits_{(i,j)\in\Omega} \Delta^2(i, j) \quad (5)$$

To solve the optimization specified in Equation 5, the BIO may use a progressive method/operation/procedure which may optimize the motion refinement in the horizontal direction and in the vertical direction (e.g., then in the vertical direction). This may result in Equations/Inequalities 6 and 7 as follows:

$$v_x(S_1 + r) > m?\,clip3(-th_{BIO}, th_{BIO}, -(S_3 \gg \lfloor\log_2(S_1 + r)\rfloor)):0 \quad (6)$$

$$v_y(S_5 + r) > m?\,clip3(-th_{BIO}, th_{BIO}, -((S_6 - v_xS_2) \gg \lfloor\log_2(S_5 + r)\rfloor)):0 \quad (7)$$

where $\lfloor\cdot\rfloor$ may be a floor function which may output the greatest value that is less than or equal to the input and $th_{BIO}$ may be the motion refinement threshold, for example to prevent the error propagation due to coding noise and/or irregular local motion, which is equal to $2^{18-BD}$.

The values of $S_1$, $S_2$, $S_3$, $S_5$ and $S_6$ may be further calculated as set forth in Equations 8-12 as follows:

$$S_1 = \sum\nolimits_{(i,j)\in\Omega} \psi_x(i, j) \cdot \psi_x(i, j), \quad (8)$$

$$S_3 = \sum\nolimits_{(i,j)\in\Omega} \theta(i, j) \cdot \psi_x(i, j) \cdot 2^L \quad (9)$$

$$S_2 = \sum\nolimits_{(i,j)\in\Omega} \psi_x(i, j) \cdot \psi_z(i, j) \quad (10)$$

$$S_5 = \sum\nolimits_{(i,j)\in\Omega} \psi_y(i, j) \cdot \psi_y(i, j) \cdot 2 \quad (11)$$

$$S_6 = \sum\nolimits_{(i,j)\in\Omega} \theta(i, j) \cdot \psi_y(i, j) \cdot 2^{L+1} \quad (12)$$

where the various gradients may be set forth in Equations 13-15 as follows:

$$\psi_x(i, j) = \frac{\partial I^{(1)}}{\partial x}(i, j) + \frac{\partial I^{(0)}}{\partial x}(i, j) \quad (13)$$

$$\psi_y(i, j) = \frac{\partial I^{(1)}}{\partial y}(i, j) + \frac{\partial I^{(0)}}{\partial y}(i, j) \quad (14)$$

$$\theta(i, j) = I^{(1)}(i, j) - I^{(0)}(i, j) \quad (15)$$

For example, in BMS-2.0, the BIO gradients in Equations 13-15 in both horizontal and vertical directions can be directly obtained by calculating the difference between two neighboring samples (e.g., horizontally or vertically depending on the direction of the gradient being derived) at one sample position of each L0/L1 prediction block, as set forth in Equations 16 and 17 as follows:

$$\frac{\partial I^{(k)}}{\partial x}(i, j) = \left(I^{(k)}(i+1, j) - I^{(k)}(i-1, j)\right) \gg 4 \quad (16)$$

$$\frac{\partial I^{(k)}}{\partial y}(i, j) = \left(I^{(k)}(i, j+1) - I^{(k)}(i, j-1)\right) \gg 4 \quad (17)$$

$$k = 0, 1$$

In Equations 8-12, L may be the bit-depth increase for the internal BIO process/procedure to keep data precision, for example which may be set to 5 in BMS-2.0. To avoid division by a smaller value, the regulation parameters r and m in Equations 6 and 7 may be defined as set forth in Equations 18 and 19 as follows:

$$r = 500 \cdot 4^{BD-8} \quad (18)$$

$$m = 700 \cdot 4^{BD-8} \quad (19)$$

where BD may be the bit depth of the input video. Based on the motion refinement derived by Equations 4 and 5, the final bi-prediction signal of the current CU can be calculated by interpolating the L0/L1 prediction samples along the motion trajectory based on the optical flow Equation 3, as specified in Equations 20 and 21 as follows:

$$pred_{BIO}(x, y) = \left(I^{(0)}(x, y) + I^{(1)}(x, y) + b + o_{offset}\right) \gg shift \quad (20)$$

$$b = rnd\left(\left(v_x\left(\frac{\partial I^{(1)}(x, y)}{\partial x} - \frac{\partial I^{(0)}(x, y)}{\partial x}\right)\right)/2^{L+1}\right) + rnd\left(\left(v_y\left(\frac{\partial I^{(1)}(x, y)}{\partial y} - \frac{\partial I^{(0)}(x, y)}{\partial y}\right)\right)/2^{L+1}\right) \quad (21)$$

where shift and $o_{offset}$ may be the right shift and offset that may be applied to combine the L0 and L1 prediction signals for bi-prediction, for example which may be set equal to 15−BD and 1<<(14−BD)+2·(1<<13), respectively. rnd(.) is a rounding function which may round the input value to the closet integer value.

Representative Affine Mode

In HEVC, a translation motion (only a translational motion) model is applied for motion compensated prediction. In the real world, there are many kinds of motion (e.g., zoom in/out, rotation, perspective motions and other irregular motions). In VVC Test Model (VTM)-2.0, an affine motion compensated prediction is applied. The affine motion model is either 4-parameter or 6-parameter. The first flag for each intercoded CU is signaled to indicate whether the translation motion model or the affine motion model is applied for inter prediction. If the affine motion model is applied, a second flag is sent to indicate whether the model is a 4-parameter or 6-parameter model.

The 4-parameter affine motion model has the following parameters: two parameters for translation movement in horizontal and vertical directions, one parameter for zoom motion for both directions, and one parameter for rotation motion for both directions. A horizontal zoom parameter is equal to a vertical zoom parameter. A horizontal rotation parameter is equal to a vertical rotation parameter. The four-parameter affine motion model is coded in VTM using two motion vectors at two control point positions defined at a top-left corner 810 and a top-right corner 820 of the current CU. Other control point positions are also possible such as at other corners and/or edges of the current CU.

Although one affine motion model is described above, other affine models are equally possible and could be used in various embodiments herein.

FIGS. 8A and 8B are diagrams illustrating a representative four parameter affine model and sub-block level motion derivation for affine blocks. Referring to FIGS. 8A and 8B, the affine motion field of the block is described by two control point motion vectors at a first control point 810 (at a top left corner of the current block) and at a second control point 820 (at a top right corner of the current block), respectively. Based on the control point motion, the motion field $(v_x, v_y)$ of one affine coded block is described as set forth in Equations 22 and 23 as follows:

$$v_x = \frac{(v_{1x} - v_{0x})}{w}x - \frac{(v_{1y} - v_{0y})}{w}y + v_{0x} \quad (22)$$

$$v_y = \frac{(v_{1y} - v_{0y})}{w}x - \frac{(v_{1x} - v_{0x})}{w}y + v_{0y} \quad (23)$$

where $(v_{0x}, v_{0y})$ may be a motion vector of the top-left corner control point 810, $(v_{1x}, v_{1y})$ may be a motion vector of the top-right corner control point 820, as shown in FIG. 8A, and w may be the width of the CU. For example, in VTM-2.0, the motion field of an affine coded CU is derived at the 4×4 block level; that is, $(v_x, v_y)$ is derived for each of the 4×4 blocks within the current CU and applied to the corresponding 4×4 block.

The four parameters of 4-parameter affine model may be estimated iteratively. The MV pairs at step k may be denoted as $$\left\{\left(v_{0x}^k, v_{0y}^k\right), \left(v_{1x}^k, v_{1y}^k\right)\right\},$$

the original signal (e.g., luminance signal) as I(i,j), and the prediction signal (e.g., luminance signal) as $$I_k'(i, j).$$

The spatial gradient $g_x(i,j)$ and $g_y(i,j)$ may be derived with a Sobel filter applied on the prediction signal $I_k'(i,j)$ in horizontal and/or vertical direction, e.g., respectively. The derivative of Equation 3 can be represented as set forth in Equations 24 and 25 as follows:

$$\begin{cases} dv_x^k(x, y) = c*x - d*y + a & (24) \\ dv_y^k(x, y) = d*x + c*y + b & (25) \end{cases}$$

where (a, b) may be delta translational parameters and (c, d) may be delta zoom and rotation parameters at step k. The delta MV at control points may be derived with its coordinates as set forth in Equations 26-29 as follows. For example, (0, 0), (w, 0) may be coordinates for top-left and top-right control points 810 and 820, respectively.

$$\begin{cases} dv_{0x}^k = v_{0x}^{k+1} - v_{0x}^k = a & (26) \\ dv_{0y}^k = v_{0y}^{k+1} - v_{0y}^k = b & (27) \end{cases}$$

$$\begin{cases} dv_{1x}^k = \left( v_{1x}^{k+1} - v_{1x}^k \right) = c * w + a & (28) \\ dv_{1y}^k = \left( v_{1y}^{k+1} - v_{1y}^k \right) = d * w + b & (29) \end{cases}$$

Based on the optical flow equation, the relationship between the change of intensity (e.g., luminance) and the spatial gradient and temporal movement is formulated in Equation 30 as follows:

$$I'_k(i, j) - I(i, j) = g_x(i, j) * dv_x^k(i, j) + g_y(i, j) * dv_y^k(i, j) \qquad (30)$$

By substituting $$dv_x^k(i, j) \text{ and } dv_y^k(i, j)$$

with Equations 24 and 25, Equation 31 for parameter (a, b, c, d) is obtained as follows:

$$I'_k(i, j) - I(i, j) = (g_x(i, j) * i + g_y(i, j) * j) * c + \qquad (31)$$

$$(-g_x(i, j) * j + g_y(i, j) * i) * d + g_x(i, j) * a + g_y(i, j) * b$$

Since the samples (e.g., all samples) in the CU satisfy Equation 31, the parameter set (e.g., a, b, c, d) can be solved using, for example a least square error method. The MVs at two control points $$\{ (v_{0x}^{k+1}, v_{0y}^{k+1}), (v_{1x}^{k+1}, v_{1y}^{k+1}) \},$$

at step (k+1) may be solved with Equations 26-29, and they may be rounded to a specific precision (e.g., ¼ pixel precision (pel) or other subpixel precision, among others). Using the iteration, the MVs at two control points may be refined, for example until convergence (for example, when parameters (a, b, c, d) are all zeros or the iteration time meets a pre-defined limit).

FIG. 9 is a diagram illustrating a representative six-parameter affine mode in which, for example: $V_0$, $V_1$, and $V_2$ are motion vectors at control points 910, 920 and 930, respectively and ($MV_x$, $MV_y$) is the motion vector of a sub-block centered at position (x, y).

Referring to FIG. 9, an affine motion model (e.g., with 6-parameters) may have any of the following parameters: (1) a parameter for translation movement in the horizontal direction; (2) a parameter for translation movement in the vertical direction, (3) a parameter for the zoom motion in the horizontal direction; (4) a parameter for rotation motion in the horizontal direction, (5) a parameter for zoom motion in the vertical direction, and/or (6) a parameter for rotation motion in the vertical direction. The 6-parameter affine motion model may be coded with three MVs at three control points 910, 920 and 930. As shown in FIG. 9, three control points 910, 920 and 930 for 6-parameter affine coded CU are defined at top-left, top-right and bottom left corners of CU, respectively. The motion at the top-left control point 910, may be related to a translation motion, and the motion at the top-right control point 920, may be related to a rotation motion in the horizontal direction and/or a zoom motion in the horizontal direction, and the motion at the bottom-left control point 930 may be related to a rotation in the vertical direction and/or a zoom motion in the vertical direction. For a 6-parameter affine motion model, the rotation motion and/or zoom motion in the horizontal direction may not be same as the same motions in the vertical direction. The motion vector of each sub-block ($v_x$, $v_y$) may be derived using three MVs at the control points 910, 920 and 930 as set forth in Equations 32 and 33 as follows:

$$v_x = v_{0x} + (v_{1x} + v_{0x}) * \frac{x}{w} + (v_{2x} + v_{0x}) * \frac{y}{h} \qquad (32)$$

$$v_y = v_{0y} + (v_{1y} + v_{0y}) * \frac{x}{w} + (v_{2y} + v_{0y}) * \frac{y}{h} \qquad (33)$$

where ($v_{2x}$, $v_{2y}$) may be the motion vector $V_2$ of the bottom-left control point 930, (x, y) may be the center position of the sub-block, w may be the width of the CU and h may be the height of the CU.

The six parameters of the 6-parameter affine model may be estimated in a similar way. Equations 24 and 25 may be changed as set forth in Equations 34 and 35 as follows.

$$\begin{cases} dv_x^k(x, y) = c * x + d * y + a & (34) \\ dv_y^k(x, y) = e * x + f * y + b & (35) \end{cases}$$

where (a, b) may be delta translation parameters, (c, d) may be delta zoom and rotation parameters for horizontal direction, and (e, f) may be delta zoom and rotation parameters for vertical direction, at step k. Equations 31 may be changed as set forth in Equation 36, as follows:

$$I'_k(i, j) - I(i, j) = (g_x(i, j) * i) * c + (g_x(i, j) * j) * d + \qquad (36)$$

$$(g_y(i, j) * i) * e + (g_y(i, j) * j) * f + g_x(i, j) * a + g_y(i, j) * b$$

The parameter set (a, b, c, d, e, f) may be solved, for example using least square method/procedure/operation by considering the samples (e.g., all samples) within the CU. The MV of the top-left control point $$(v_{0x}^{k+1}, v_{0y}^{k+1})$$

may be calculated with Equations 26-29. The MV of the top-right control point $$(v_{1x}^{k+1}, v_{1y}^{k+1})$$

may be calculated with Equations 37 and 38 as set forth as follows. The MV of the bottom-left control point $$\left(v_{2x}^{k+1}, v_{2y}^{k+1}\right)$$

may be calculated with Equations 39 and 40 as set forth below.

$$\begin{cases} dv_{1x}^k\left(v_{1x}^{k+1} - v_{1x}^k\right) = c * w + a \\ dv_{1y}^k\left(v_{1y}^{k+1} - v_{1y}^k\right) = e * w + b \end{cases} \tag{37}\tag{38}$$

$$\begin{cases} dv_{2x}^k\left(v_{2x}^{k+1} - v_{2x}^k\right) = d * h + a \\ dv_{2y}^k\left(v_{2y}^{k+1} - v_{2y}^k\right) = f * h + b \end{cases} \tag{39}\tag{40}$$

Although 4 and 6 parameter affine models are shown in FIGS. 8A, 8B and 9, one of skill understands that affine model with different numbers of parameters and/or different control points are equally possible.

Although affine models are described herein in conjunction with optical flow refinement, one of skill understands that other motion models in conjunction with optical flow refinement are equally possible.

Representative Interweaved Prediction for Affine Motion Compensation

With affine motion compensation (AMC), for example in VTM, a coding-block is divided into sub-blocks as small as 4×4, each of which may be assigned with an individual motion vector (MV) derived by the affine model, for example as shown in FIGS. 8A and 8B or FIG. 9. With a 4-parameter or a 6-parameter affine model, the MV may be derived from MVs of the two or three control points.

AMC can face a dilemma associated with the size of sub-blocks. With smaller sub-blocks, AMC may achieve a better coding performance but may suffer from a higher complexity burden.

FIG. 10 is a diagram illustrating a representative inter-weaved prediction procedure that may achieve a finer granularity of MVs, for example, in exchange for a moderate increase in complexity.

In FIG. 10, a coding block 1010 may be divided into sub-blocks with two different dividing patterns (e.g., first and second patterns 0 and 1). The first dividing pattern 0 (e.g., a first sub-block pattern, for example a 4×4 sub-block pattern) may be the same as that in VTM and the second dividing pattern 1 (e.g., an overlapping and/or interweaved second sub-block pattern) may divide the coding-block 1010 into 4×4 sub-blocks with a 2×2 offset from the first dividing pattern 0, as illustrated in FIG. 10. A number of auxiliary predictions (e.g., two auxiliary predictions $P_0$ and $P_1$) may be generated by the AMC with the two dividing patterns (e.g., the first and second dividing patterns 0 and 1). The MV for each sub-block in each of the dividing patterns 0 and 1 may be derived from control point motion vectors (CPMVs) by the affine model.

The final prediction P may be calculated as a weighted-sum of the auxiliary predictions (e.g., two auxiliary predictions $P_0$ and $P_1$), formulated as set forth in Equations 41 and 42, as follows:

$$\begin{cases} P = (P_0 + P_1) >> 1, \text{ if } \omega_0 = \omega_1 \\ P = (\omega_0 P_0 + \omega_1 P_1) >> 2 \text{ Otherwise} \end{cases} \tag{41}\tag{42}$$

FIG. 11 is a diagram illustrating representative weight values (e.g., associated with pixels) in a sub-block. Referring to FIG. 11, an auxiliary prediction sample located at the center (e.g., center pixels) of the sub-block 1100 may be associated with a weight value 3 and an auxiliary prediction sample located at a boundary of the sub-block 1100 may be associated with a weight value 1.

FIG. 12 is a diagram illustrating regions in which inter-weaved prediction is applied and other regions in which the interweaved prediction is not applied. Referring to FIG. 12, a region 1200 may include a first region 1210 (shown in FIG. 12 as not cross hatched), for example having 4×4 sub-blocks in which interweaved prediction is applied and a second region 1220 (shown in FIG. 12 as cross hatched), for example in which interweaved prediction is not applied. To avoid tiny block motion compensation, the interweaved prediction may only be applied to regions where the size of sub-blocks meets a threshold size (e.g., is 4×4), for example, for both the first and second dividing patterns.

In VTM-3.0, the size of sub-blocks may be 4×4 on the chroma components and interweaved prediction may be applied to chroma components and/or the luma component. The bandwidth may not be increased by interweaved pre-diction since the region used to do motion compensation (MC) for sub-blocks (e.g., all sub-blocks) may be fetched together as a whole in the AMC. For flexibility, a flag may be signaled in a slice header to indicate whether interweaved prediction is used or is not used. For interweaved prediction, the flag may be signaled as a 1 bit flag (e.g., a first logic level that may always be signaled to be 0 or 1).

Representative Procedures for Sub-Block-Based Temporal Motion Vector Prediction (SbTMVP)

SbTMVP is supported by VTM. Similar to the temporal motion vector prediction (TMVP) in HEVC, SbTMVP can use a motion field in the collocated picture, for example to improve motion vector prediction and merge mode for the CUs in the current picture. The same collocated picture used by TMVP may be used for SbTMVP. SbTMVP may differ from TMVP in the following: (1) TMVP may predict motion at a CU level and SbTMVP may predict motion at a sub-CU level; and/or (2) TMVP may fetch the temporal motion vectors from the collocated block in the collocated picture (e.g., the collocated block may be the bottom-right or the center block relative to the current CU) and SbTMVP may apply a motion shift before fetching the temporal motion information from the collocated picture (e.g., the motion shift may be obtained from the motion vector from one of the spatial neighboring blocks of the current CU), among others.

FIGS. 13A and 13B are diagrams illustrating a SbTMVP process. FIG. 13A shows spatial neighboring blocks used by ATMVP and FIG. 13B shows a derivation of a sub-CU motion field by applying a motion shift from spatial neighbor and scaling the motion information from the corresponding collocated sub-CUs.

Referring to FIGS. 13A and 13B, SbTMVP may predict motion vectors of the sub-CUs within the current CU operations (e.g., in two operations). In the first operation, the spatial neighboring blocks A1, B1, B0 and A0 may be examined in an order of A1, B1, B0 and A0. As soon as and/or after the first spatial neighboring block that has a motion vector that uses the collocated picture as its reference picture is identified, this motion vector may be selected to be the motion shift to be applied. If no such motion is identified from the spatial neighboring blocks, then the motion shift may be set to (0, 0). In the second operation, the motion shift identified in the first operation may be applied (e.g., added to the current block's coordinates) to obtain sub-CU-level motion information (e.g., motion vectors and reference indices) from the collocated picture, as illustrated in FIG. 13B. The example in FIG. 13B illustrates the motion shift set to block A1's motion. For each sub-CU, the motion information of its corresponding block (e.g., the smallest motion grid that covers the center sample) in the collocated picture may be used to derive the motion information for the sub-CU. After the motion information of the collocated sub-CU is identified, the motion information may be converted to the motion vectors and reference indices of the current sub-CU in a similar way as the TMVP process of HEVC. For example, temporal motion scaling may be applied to align the reference pictures of the temporal motion vectors to those of the current CU.

A combined sub-block based merge list may be used in VTM-3 and may contain or include both SbTMVP and affine merge candidates, for example to be used for signaling of a sub-block based merge mode. The SbTMVP mode may be enabled/disabled by a sequence parameter set (SPS) flag. If the SbTMVP mode is enabled, the SbTMVP predictor may be added as the first entry of the list of sub-block based merge candidates, and followed by the affine merge candidates. The size of the sub-block based merge list may be signaled in SPS and the maximum allowed size of the sub-block based merge list may be an integer number, for example 5 in VTM3.

The sub-CU size used in SbTMVP may be fixed, for example at 8×8 or another sub-CU size, and as done for affine merge mode, the SbTMVP mode may be applicable (e.g., may only be applicable) to the CU with both width and height that may be larger than or equal to 8.

The encoding logic of the additional SbTMVP merge candidate may be the same as for the other merge candidates. For example, for each CU in P or B slice, an additional Rate Distortion (RD) check may be performed to decide whether to use the SbTMVP candidate.

Representative Regression-Based Motion Vector Field

To provide a fine granularity of motion vectors inside a block, a Regression based Motion Vector Field (RMVF) tool may be implemented (for example in JVET-M0302), which may attempt to model motion vectors of each block on a sub-block level based on the spatially neighboring motion vectors.

FIG. 14 is a diagram illustrating neighboring motion blocks (e.g., 4×4 motion blocks) that may be used for motion parameter derivation. One row 1410 and one column 1420 of immediate neighboring motion vectors on 4×4 sub-block basis (and their center locations) from each side of the block may be used in a regression process. For example, the neighboring motion vectors may be used in RMVF motion parameter derivation.

FIG. 15 is a diagram illustrating neighboring motion blocks that may be used for motion parameter derivation to reduce neighboring motion information (e.g., the number of neighboring motion blocks to be used in the regression process relative to FIG. 14 may be reduced). A reduced amount of neighboring motion information for RMVF parameter derivation of the neighboring 4×4 motion blocks may be used for motion parameter derivation (e.g., about half, for example about every other neighboring motion block may be used for motion parameter derivation). Certain neighboring motion blocks of the row 1410 and the column 1420 may be selected, determined, or predetermined to reduce the neighboring motion information.

Although about half the neighboring motion blocks of the row 1410 and the column 1420 are shown as selected, other percentages (with other motion block locations) may be selected, for example to reduce the number of neighboring motion blocks to be used in the regression process.

Five regions (e.g., bottom-left, left, top-left, top, top-right) as shown in the figures may be used when collecting the motion information for motion parameter derivation. The above-right and bottom-left reference motion regions may be limited to half (e.g., only half) of the corresponding width or height of the current block.

In RMVF mode, motion of the block may be defined by a 6-parameter motion model. These parameters $a_{xx}$, $a_{xy}$, $a_{yx}$, $a_{yy}$, $b_x$ and $b_y$ may be calculated by solving a linear regression model in mean square error (MSE) sense. The input to the regression model may consist of or may include the center locations (x, y) and/or motion vectors ($mv_x$ and $mv_y$) of the available neighboring 4×4 sub-blocks as defined above.

Motion vector ($MV_{X\_subPU}$, $MV_{Y\_subPU}$) for an 8×8 sub-block with center location at ($X_{subPU}$, $Y_{subPU}$) may be calculated as set forth in Equation 43 as follows:

$$\begin{bmatrix} MV_{X\_subPU} \\ MV_{Y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix} \tag{43}$$

The motion vectors may be calculated for 8×8 sub-blocks relative to the center location of the sub-blocks (e.g., each sub-block). For example, motion compensation may be applied in 8×8 sub-block accuracy in the RMVF mode. In order to have efficient modelling for the motion vector field, the RMVF tool is applied only in the cases that at least one motion vector from at least three of the candidate regions are available.

Affine motion model parameters can be used to derive the motion vector of certain pixels (e.g., each pixel) in a CU. Although the complexity of generating pixel-based affine motion compensated prediction may be high (e.g., very high) and also because a memory access bandwidth requirement for this kind of sample based MC may be high, a sub-block based affine motion compensation procedure/method may be implemented (e.g., by VVC). For example, a CU may be divided into sub-blocks (e.g., 4×4 sub-blocks, square sub-blocks and/or non-square shaped sub-block). Each of the sub-blocks may be assigned with a MV which may be derived from affine model parameters. The MV may be a MV at a center of the sub-block (or another location in the sub-block). The pixels in the sub-block (e.g., all pixels in the sub-block) may share the sub-block MV. Sub-block based affine motion compensation may be a tradeoff between coding efficiency and complexity. To achieve a finer granularity of motion compensation, interweaved prediction for affine motion compensation may be implemented and may be generated by weighted averaging two sub-block motion compensated predictions. Interweaved prediction may require and/or use two or more motion compensated predictions per sub-block, and thus may increase the memory bandwidth and complexity.

In certain representative embodiments, methods, apparatus, procedures and/or operations may be implemented to refine the sub-block based affine motion compensated prediction with optical flow (e.g., using and/or based on optical flow). For example, after the sub-block based affine motion compensation is performed, pixel intensity may be refined by adding a difference value derived by the optical flow equation, which is referred to as prediction refinement with optical flow (PROF). PROF can achieve pixel level granularity without significantly increasing the complexity and may keep the worst-case memory access bandwidth comparable to the sub-block based affine motion compensation. PROF may be applied in any scenario where the pixel level motion vector field is available (e.g., may be computed) in addition to a prediction signal (e.g., an unrefined motion prediction signal and/or sub-block based motion prediction signal). In addition to or besides the affine mode, the prediction PROF procedures may be used in other sub-block prediction modes. Application of PROF on sub-block modes, such as SbTMVP and/or RMVF may be implemented. The application of PROF on bi-prediction is described herein.

Representative PROF Procedures for Affine Mode

In certain representative embodiments, methods, apparatus, and/or procedures may be implemented to improve the granularity of sub-block based affine motion compensated prediction, for example by applying a change in pixel intensity derived from optical flow (e.g., the optical flow equation) and may use and/or require one motion compensation operation per sub-block (e.g., only one motion compensation operation per sub-block), which is the same as the existing affine motion compensation, for example in VVC.

FIG. 16. is a diagram illustrating a sub-block MV and pixel level motion vector difference $\Delta v(i,j)$ (e.g., also sometimes referred to as a refinement MV for a pixel) after a sub-block based affine motion compensated prediction.

Referring to FIG. 16, a CU 1600 may include sub-blocks 1610, 1620, 1630 and 1640. Each sub-block 1610, 1620, 1630 and 1640 may include a plurality of pixels (for example, 16 pixels in sub-block 1610). The sub-block MV 1650 (for example as a coarse or average sub-block MV) associated with each pixel 1660 (i,j) of the sub-block 1610 is illustrated. For each respective pixel (i,j) in the sub-block 1610, a refinement MV 1670 (i,j) (which may be indicative of the difference between the actual MV of the pixel 1660 (i,j) and the sub-block MV 1650 (where (i,j) defines the pixel position in the sub-block 1610) may be determined. For clarity of FIG. 16, only refinement MV 1670 (1,1) is labeled although other individual pixel-level motions are shown. In certain representative embodiments, the refinement MV 1670 (i,j) may be determined, as a pixel level motion vector difference $\Delta v(i,j)$ (sometimes referred to as the motion vector difference).

In certain representative embodiments, methods, apparatus, procedures and/or operations may be implemented that include any of the following operations:

(1) in the first operation: a sub-block based AMC may be performed as disclosed herein to generate sub-block based motion prediction I(i,j);

(2) in the second operation: spatial gradients $g_x(i,j)$ and $g_y(i,j)$ of the sub-block based motion prediction I(i,j) at each sample location may be calculated (in one example, the spatial gradients may be generated using the same process as the gradient generation used in BDOF. For example, the horizontal gradient at a sample location may be calculated as the difference between its right neighboring sample and its left neighboring sample, and/or the vertical gradient at a sample location may be calculated as the difference between its bottom neighboring sample and its top neighboring sample. In another example, the spatial gradients can be generated using a Sobel filter);

(3) in the third operation: a luminance intensity change per pixel in a CU using and/or by the optical flow equation may be calculated, for example as set forth in Equation 44 as follows:

$$\Delta I(i, j) = g_x(i, j) * \Delta v_x(i, j) + g_y(i, j) * \Delta v_y(i, j) \tag{44}$$

where a value of the motion vector difference $\Delta v(i,j)$ is the difference 1670 between a pixel-level MV computed for sample location (i,j), denoted by v(i,j), and the sub-block-level MV 1650 of the sub-block which covers pixel 1660 (i,j), as shown in FIG. 16. The pixel-level MV v(i,j) may be derived from the control point MVs by Equations 22 and 23 for a 4-parameter affine model or by Equations 32 and 33 for a 6-parameter affine model.

In certain representative embodiments, the motion vector difference value $\Delta v(i,j)$ may be derived by the affine model parameter by or using Equations 24 and 25, where x and y may be the offset from the pixel location to a center of the sub-block. Since the affine model parameters and pixel offsets are not changed from sub-block to sub-block, the motion vector difference value $\Delta v(i,j)$ may be calculated for a first sub-block, and reused in other sub-blocks in the same CU. For example, the difference between a pixel-level MV and a sub-block level MV may be calculated using Equations 45 and 46 as follows, since the translational affine parameters (a, b) may be the same for the pixel-level MV and the sub-block MV. (c, d, e, f) may be four additional affine parameters (e.g., four affine parameters other than the translational affine parameters)

$$\begin{cases} \Delta v_x(i, j) = c * (i - x_{sb}) + d * (j - y_{sb}) \\ \Delta v_y(i, j) = e * (i - x_{sb}) + f * (j - y_{sb}) \end{cases} \tag{45} \tag{46}$$

where (i, j) may be the pixel location relative to a top-left position of a sub-block, $(x_{sb}, y_{sb})$ may be the center position of the sub-block relative to the top-left position of the sub-block.

FIG. 17A is a diagram illustrating a representative procedure for determining a MV corresponding to an actual center of a sub-block.

Referring to FIG. 17A, two sub-blocks $SB_0$ and $SB_1$ are shown as 4×4 sub-blocks. if a sub-block width is SW and a sub-block height is SH, a sub-block center position may be set forth as ((SW−1)/2, (SH−1)/2). In other examples, the sub-block center position may be estimated based on the position set forth as (SW/2, SH/2). The actual center point for the first sub-block $SB_0$ is $P_0$' and for the second sub-block $SB_1$ is $P_1$' using ((SW−1)/2, (SH−1)/2). The estimated center point for the first sub-block $SB_0$ is $P_0$ and for the second sub-block $SB_1$ is $P_1$ using, for example (SW/2, SH/2) (for example in VVC). In certain representative embodiments, the MV of a sub-block may be more accurately based on the actual center position rather than the estimated center position (which is used in VVC).

FIG. 17B is a diagram illustrating locations of chroma samples in a 4:2:0 chroma format. Referring to FIG. 17B, the chroma sub-block MV may be derived by the luma sub-blocks' MVs. For example, in the 4:2:0 chroma format, one 4×4 chroma sub-block may correspond to an 8×8 luma area. Although representative embodiments are shown in conjunction with a 4:2:0 chroma format, one of skill understands that other chroma formats may be equally used, such as a 4:2:2 chroma format.

The chroma sub-block MV may be derived by averaging a top-left 4×4 luma sub-block MV and a bottom-right luma sub-block MV. The derived chroma sub-block MV may or may not be located at a center of the chroma sub-block for chroma sample location types 0, 2, and/or 3. For chroma sample location type 0, 2, and 3, chroma sub-block center location ($x_{sb}$, $Y_{sb}$) may be or may need to be adjusted by an offset. For example, for 4:2:0 chroma sample location type 0, 2 and 3, adjustments may be applied as set forth in Equations 47-49 as follows:

$$x_{sb} = x_{sb} - \frac{1}{4}; \text{ if chroma location type is 0;} \quad (47)$$

$$x_{sb} = x_{sb} - \frac{1}{4}; \ y_{sb} = y_{sb} - \frac{1}{4}; \text{ if chroma location type is 2;} \quad (48)$$

$$y_{sb} = y_{sb} - \frac{1}{4}; \text{ if chroma location type is 3.} \quad (49)$$

The sub-block based motion prediction I(i,j) may be refined by adding an intensity change (e.g., a luminance intensity change, for example as provided in Equation 44). The final (i.e., refined) prediction I'(i,j) may be generated by or using the Equation 50 as follows.

$$I'(i, j) = I(i, j) + \Delta I(i, j) \quad (50)$$

When the refinement is applied, the sub-block based affine motion compensation may achieve pixel level granularity without increasing the worst-case bandwidth and/or memory bandwidth.

To keep the precision of the prediction and/or the gradient calculation, a bit-depth in the operation related performance of the sub-block based AMC may be an intermediate bit-depth which may be higher than a coding bit-depth.

The process described above may be used to refine the chroma intensity (e.g., in addition to or in lieu of refinement of the luma intensity). In one example, the intensity difference used in Equation 50 may be multiplied by a weight factor w before being added to the prediction, as illustrated in the Equation 51 as follows:

$$I'(i, j) = I(i, j) + \omega \cdot \Delta I(i, j) \quad (51)$$

where w may be set to a value between 0 to 1 inclusive. w may be signaled in a CU level or a picture level. For example, w may be signaled by a weight index. For example, Index Table 1 may be used to signal w.

| Index Table 1 | | | | | |
|---|---|---|---|---|---|
| Index | 0 | 1 | 2 | 3 | 4 |
| Weight | ½ | ¾ | ¼ | 1 | 0 |

The encoder algorithm may choose the value of w that results in the lowest rate distortion cost.

Gradients of prediction samples, e.g., $g_x$ and/or $g_y$, may be calculated in different ways. In certain representative embodiments, the prediction samples $g_x$ and $g_y$ may be calculated by applying a 2-dimentional Sobel filter. An example of 3×3 Sobel filters for horizontal and vertical gradients are set forth below:

$$\text{Horizontal Sobel filter}: \begin{matrix} -1 & 0 & 1 \\ -2 & 0 & 2 \\ -1 & 0 & 1 \end{matrix}$$

$$\text{Vertical Sobel filter}: \begin{matrix} -1 & -2 & -1 \\ 0 & 0 & 0 \\ 1 & 2 & 1 \end{matrix}$$

In other representative embodiments, gradients may be calculated with a one-dimensional 3-tap filter. An example may include [−1 0 1], which may be simpler (e.g., much simpler) than a Sobel filter.

FIG. 17C is a diagram illustrating an extended sub-block prediction. The shaded circles 1710 are padding samples around a 4×4 sub-block (e.g., the non-shaded circles 1720). Using a Sobel filter, as an example, samples in the box 1730 may be used to calculate the gradients of the sample 1740 in the center. Although the gradients may be calculated using a Sobel filter, other filters such as a 3 tap filter are possible.

For the example gradient filters above, e.g., the 3×3 Sobel filter and the one-dimensional filter, an extended sub-block prediction may be used and/or required for the sub-block gradient calculation. One row at the top and bottom boundaries and one column at the left and right boundaries of the sub-block may be padded, e.g., to calculate the gradient for those samples at the sub-block boundaries.

There may be different methods/procedures and/or operations to obtain the extended sub-block prediction. In one representative embodiment, given N×M as the sub-block size, a (N+2)×(M+2) extended sub-block prediction may be obtained by performing a (N+2)×(M+2) block motion compensation using the sub-block MV. With this embodiment, the memory bandwidth may be increased. To avoid the memory bandwidth increase, in certain representative embodiments, the (N+K−1)×(M+K−1) integer reference samples before interpolation may be fetched for the interpolation of N×M sub-block given a K-tap interpolation filter in both horizontal and vertical directions, border samples of the (N+K−1)×(M+K−1) block may be copied from an adjacent sample of the (N+K−1)×(M+K−1) sub-block such that the extended region may be (N+K−1+2)×(M+K−1+2). The extended region may be used for the interpolation of the (N+2)×(M+2) sub-block. These representative embodiments may still use and/or require additional interpolation operations to generate the (N+2)×(M+2) prediction if the sub-block MV points to a fractional position.

For example, to reduce the computation complexity, in other representative embodiments, the sub-block prediction may be obtained by a N×M block motion compensation with the sub-block MV. The border of the (N+2)×(M+2) prediction may be obtained without interpolation by any of the following: (1) integer motion compensation with MV being the integer part of the sub-block MV; (2) integer motion compensation with MV being the nearest integer MV of the sub-block MV; and/or (3) copying from the nearest adjacent samples in the N×M sub-block prediction.

The precision and/or the range of the pixel-level refinement MV, e.g., $\Delta v_x$ and $\Delta v_y$ may impact the accuracy of the PROF. In certain representative embodiments, a combination of a multi-bit fractional component and another multi-bit integer component may be implemented. For example, a 5-bit fractional component and a 11-bit integer component may be used. The combination of the 5-bit fractional component and the 11-bit integer component can represent a MV range from −1024 to 1023 in ⅓₂-pel precision with a total number of 16 bits.

The precision of the gradients, e.g., $g_x$ and $g_y$, and that of the intensity change ΔI may impact the performance of the PROF. In certain representative embodiments, the prediction sample precision may be kept to or maintained at a predetermined number or signaled number of bits (e.g., the internal sample precision defined in the current VVC draft, which is 14-bit). In certain representative embodiments, the gradients and/or the intensity change ΔI may be kept at the same precision as the prediction sample.

The range of the intensity change ΔI may impact the performance of the PROF. The intensity change ΔI may be clipped to a smaller range to avoid a false value generated by an inaccurate affine model. In one example, the intensity change ΔI may be clipped to predition_bitdepth—2.

The combination of number of bits of the fraction component of $\Delta v_x$ and $\Delta v_y$, the number of bits of the fractional component of gradient and the number of bits of the intensity change ΔI together may impact the complexity in certain hardware or software implementations. In one representative embodiment, 5 bits may be used to represent the fractional component of $\Delta v_x$ and $\Delta v_y$, 2 bits may be used to represent the fractional component of the gradient, and 12 bits may be used to represent ΔI, however, they can be any number of bits.

In order to reduce the computation complexity, the PROF may be skipped in certain situations. For example, if the magnitude of all pixel-based delta (e.g., refinement) MV (Δv(i,j)) within a 4×4 sub-block is smaller than a threshold, the PROF may be skipped for a whole affine CU. If the gradient of all samples within the 4×4 sub-block is smaller than a threshold, the PROF may be skipped. The PROF may be applied to chroma components such as Cb and/or Cr components. The delta MV of Cb and/or Cr components of the sub-block may reuse the delta MV of the sub-block (e.g., may reuse the delta MV computed for a different sub-block in the same CU).

Although the gradient procedure (e.g., extending a sub-block for gradient calculation using copied reference samples) disclosed herein is illustrated as used with a PROF operation, the gradient procedure may be used with other operations such as BDOF operations and/or Affine motion estimation operations, among others.

Representative PROF Procedures for Other Sub-Block Modes

PROF may be applied in any scenario where the pixel level motion vector field is available (e.g., may be computed) in addition to a prediction signal (e.g. an unrefined prediction signal). For example, besides the affine mode, the prediction refinement with optical flow may be used in other sub-block prediction modes, for example, SbTMVP mode (e.g., ATMVP mode in VVC), or the regression based motion vector field (RMVF)

In certain representative embodiments, a method may be implemented to apply PROF to SbTMVP. For example, such a method may include any of:

(1) in the first operation, sub-block level MVs and sub-block predictions may be generated based on the existing SbTMVP process described herein;

(2) in the second operation, the affine model parameters may be estimated by the sub-block MV field using a linear regression method/procedure;

(3) in the third operation, the pixel-level MVs may be derived by the affine model parameters obtained in the second operation, and the associated pixel-level motion refinement vectors relative to the sub-block MVs (Δv (i,j)) may be calculated; and/or (4) in the fourth operation, the prediction refinement with optical flow process may be applied to generate the final prediction, among others In certain representative embodiments, a method may be implemented to apply PROF to RMVF. For example, such a method may include any of:

(1) in the first operation, the sub-block level MV field, the sub-block predictions and/or the affine model parameters $a_{xx}$, $a_{xy}$, $a_{yx}$, $a_{yy}$, $b_x$ and $b_x$ may be generated based on the RMVF process described herein;

(2) in the second operation, the pixel-level MV offsets from the sub-block level MVs (Δv(i,j)) may be derived by the affine model parameters $a_{xx}$, $a_{xy}$, $a_{yx}$, $a_{yy}$, $b_x$ and $b_x$, by Equation 52, as follows:

$$\begin{bmatrix} \Delta v_x(i,j) \\ \Delta v_y(i,j) \end{bmatrix} = \begin{bmatrix} a_{xx} & a_{xy} \\ a_{yx} & a_{yy} \end{bmatrix} \begin{bmatrix} i \\ j \end{bmatrix} + \begin{bmatrix} b_x \\ b_y \end{bmatrix} \tag{52}$$

where (i,j) is the pixel offset from the center of the sub-block. Since the affine parameters and/or the pixel offsets from the sub-block center are not changed from sub-block to sub-block, the pixel MV offsets may be calculated (e.g., only needs or is to be calculated) for the first sub-block and may be reused for other sub-blocks in the CU; and/or (3) in the third operation, the PROF process may be applied to generate the final prediction, for example by applying Equations 44 and 50.

Representative PROF Procedures for Bi-Prediction

In addition to or in lieu of using PROF in uni-prediction as described herein, the PROF technique may be used in bi-prediction. When used in bi-prediction, the PROF may be used to generate L0 prediction and/or L1 prediction, for example before they are combined with weights. To reduce the computation complexity, PROF may be applied (e.g., may only be applied) to one prediction such as L0 or L1. In certain representative embodiments, PROF may be applied (e.g. may only be applied) to a list (e.g., associated with or to which reference picture the current picture is close (for example within a threshold of) and/or closest).

Representative Procedures for PROF Enablement

PROF enablement may be signaled at or in a sequence parameter set (SPS) header, a picture parameter set (PPS) header and/or a tile group header. In certain embodiments, a flag may be signaled to indicate if PROF is or is not enabled for an affine mode. If the flag is set to a first logic level (e.g., "True"), PROF may be used for both uni-prediction and bi-prediction. In certain embodiments, a second flag may be used if the first flag is set to "True" to indicate if PROF is enabled or is not enabled for bi-prediction affine mode. If the first flag is set to a second logic level (e.g., "False"), the second flag may be inferred as set to "False". Whether to apply PROF for the chroma component may be signaled with a flag at or in the SPS header, the PPS header and/or the tile group header if the first flag is set to "True", such that control of PROF on luma and chroma components may be separated.

Representative Procedures for Conditionally Enabled PROF

For example, to reduce complexity, PROF may be applied when (e.g., only when) certain conditions are satisfied. For example, for small CU size (e.g., below a threshold level), the affine motion may be relatively small such that the benefit of applying PROF may be limited. In certain representative embodiments, when or on condition that the CU size is small (e.g., for a CU size that is no greater than 16×16 such as 8×8, 8×16, 16×8), PROF may be disabled in the affine motion compensation to reduce the complexity for both the encoder and/or the decoder. In certain representative embodiments, when the CU size is small (below the same or a different threshold level), PROF may be skipped in the affine motion estimation (e.g., only in the affine motion estimation), for example to reduce the encoder complexity, and PROF may be performed at the decoder regardless of CU size. For example, in the encoder side, after motion estimation that searches for the affine model parameters (e.g. the control-point MVs), a motion compensation (MC) procedure may be invoked and PROF may be performed. For each iteration during the motion estimation, the MC procedure may also be invoked. In the MC in motion estimation, PROF may be skipped to save complexity and there will not be a prediction mismatch between the encoder and the decoder because the final MC in the encoder is to run PROF. That is, PROF refinement may not be applied by the encoder as it searches for the affine model parameters (e.g., the affine MVs) to use for prediction of a CU, and once or after the encoder completes the search, the encoder may then apply PROF to refine the prediction for the CU using the affine model parameters determined from the search.

In some representative embodiments, a difference between the CPMVs may be used as criterion to determine whether to enable PROF. When a difference between the CPMVs is small (e.g., below a threshold level) such that the affine motion is small, the benefit of applying PROF may be limited, and PROF may be disabled for affine motion compensation and/or affine motion estimation. For example, for 4-parameter affine mode, if the following conditions are satisfied (e.g., all of the following conditions are satisfied), PROF may be disabled:

$$\left| v_{1x} - v_{0x} \right| < \frac{W}{T}$$

$$\left| v_{1y} - v_{0y} \right| < \frac{W}{T}$$

For a 6-parameter affine mode, in addition to or in lieu of the above condition, if the following conditions are satisfied (e.g., all of the following conditions are also satisfied), PROF may be disabled:

$$\left| v_{2x} - v_{0x} \right| < \frac{h}{T}$$

$$\left| v_{2y} - v_{0y} \right| < \frac{h}{T}$$

where T is a pre-defined threshold, e.g., 4. This CPMV or affine parameter based PROF skipping procedure may be applied (e.g., also only be applied) at the encoder and the decoder may or does not skip PROF.

Representative Procedures for PROF Combined With or Instead of Deblocking Filter Since PROF may be pixel-wise refinement that may compensate the block-based MC, motion difference between block boundary may be reduced (e.g., may be greatly reduced). An encoder and/or a decoder may skip the application of a deblocking filter, and/or may apply weaker filters on sub-block boundaries when PROF is applied. For a CU that is split into multiple transform units (TU), blocking artifact may appear on the transform block boundary.

In certain representative embodiments, an encoder and/or a decoder may skip the application of a deblocking filter or may apply one or more weaker filters on sub-block boundaries, unless the sub-block boundary coincides with a TU boundary.

When or on condition that PROF is applied to luma (e.g., only applied to luma), an encoder and/or a decoder may skip the application of deblocking filter and/or may apply one or more weaker filters on sub-block boundaries for luma (e.g., luma only). For example, the boundary strength parameter Bs may be used to apply a weaker deblocking filter.

For example, an encoder and/or a decoder may skip the application of a deblocking filter on sub-block boundaries when PROF is applied, unless the sub-block boundary coincides with a TU boundary. In that case, a deblocking filter may be applied to reduce or remove blocking artifacts which may result along the TU boundary.

As another example, an encoder and/or a decoder may apply a weak deblocking filter on sub-block boundaries when PROF is applied, unless the sub-block boundary coincides with a TU boundary. It is contemplated that a 'weak' deblocking filter may be a weaker deblocking filter than may normally be applied to the sub-block boundaries when PROF is not being applied. When the sub-block boundary coincides with a TU boundary, a stronger deblocking filter may be applied to reduce or remove the blocking artifacts which are expected to be more visible along the sub-block boundaries that coincide with TU boundaries.

In certain representative embodiments, when or on condition that PROF is applied (e.g., only applied) to luma, an encoder and/or a decoder may align the application of deblocking filter for chroma to luma, for example despite the lack of application of PROF on chroma, for design unification purpose. For example, if PROF is applied only to luma, the normal application of the deblocking filter for luma may be changed based on whether PROF was applied (and possibly based on whether there was a TU boundary at the sub-block boundary). In certain representative embodiments, rather than having separate/different logic for applying the deblocking filter to the corresponding chroma pixels, a deblocking filter may be applied to sub-block boundaries for chroma to match (and/or mirror) the procedure for luma deblocking.

FIG. 18A is a flowchart illustrating a first representative encoding and/or decoding method.

Referring to FIG. 18A, the representative method 1800 to encode and/or to decode may include, at block 1805, an encoder 100 or 300 and/or a decoder 200 or 500, obtaining a sub-block based motion prediction signal for a current block, for example of a video. At block 1810, the encoder 100 or 300 and/or the decoder 200 or 500 may obtain one or more spatial gradients of the sub-block based motion prediction signal for the current block or one or more motion vector difference values associated with a sub-block of the current block. At block 1815, the encoder 100 or 300 and/or the decoder 200 or 500 may obtain a refinement signal for the current block based on the one or more obtained spatial gradients or the one or more obtained motion vector difference values associated with the sub-block of the current block. At block 1820, the encoder 100 or 300 and/or the decoder 200 or 500 may obtain a refined motion prediction signal for the current block based on the sub-block based motion prediction signal and the refinement signal. In certain embodiments, the encoder 100 or 300 may encode the current block based on the refined motion prediction signal or the decoder 200 or 500 may decode the current block based on the refined motion prediction signal. The refined motion prediction signal may be a refined motion inter-prediction signal generated (e.g., by a GBi encoder 300 and/or a GBi decoder 500) and may use one or more PROF operations.

In certain representative embodiments, for example related to other methods described herein including methods 1850 and 1900, the obtaining of a sub-block based motion prediction signal for a current block of the video may include generating the sub-block based motion prediction signal.

In certain representative embodiments, for example related to other methods described herein including methods 1850 and 1900 among others, the obtaining of the one or more spatial gradients of the sub-block based motion prediction signal for the current block or the one or more motion vector difference values associated with a sub-block of the current block may include determining the one or more spatial gradients (e.g., associated with a gradient filter) of the sub-block based motion prediction signal.

In certain representative embodiments, for example related to other methods described herein including methods 1850 and 1900 among others, the obtaining of the one or more spatial gradients of the sub-block based motion prediction signal for the current block or the one or more motion vector difference values associated with a sub-block of the current block may include determining the one or more motion vector difference values associated with the sub-block of the current block.

In certain representative embodiments, for example related to other methods described herein including methods 1850 and 1900 among others, the obtaining of the refinement signal for the current block based on the one or more determined spatial gradients or the one or more determined motion vector difference values may include determining a motion prediction refinement signal, as the refinement signal, for the current block based on the determined spatial gradients.

In certain representative embodiments, for example related to other methods described herein including methods 1850 and 1900 among others, the obtaining of the refinement signal for the current block based on the one or more determined spatial gradients or the one or more determined motion vector difference values may include determining a motion prediction refinement signal, as the refinement signal, for the current block based on the determined motion vector difference values.

The terms "determine" or "determining" as they relate to something, such as information, generally can include one or more of: estimating, calculating, predicting, obtaining and/ or retrieving of the information. For example, determining can refer to retrieving something from memory or a bit-stream, among others.

In certain representative embodiments, for example related to other methods described herein including methods 1850 and 1900 among others, the obtaining of the refined motion prediction signal for the current block based on the sub-block based motion prediction signal and the refinement signal may include combining (e.g., add or subtract, among others) the sub-block based motion prediction signal and the motion prediction refinement signal to produce the refined motion prediction signal for the current block.

In certain representative embodiments, for example related to other methods described herein including methods 1850 and 1900 among others, the encoding and/or decoding of the current block based on the refined motion prediction signal may include encoding the video using the refined motion prediction signal, as the prediction for the current block and/or decoding the video using the refined motion prediction signal, as the prediction for the current block.

FIG. 18B is a flowchart illustrating a second representative encoding and/or decoding method.

Referring to FIG. 18B, the representative method 1850 to encode and/or to decode a video may include, at block 1855, an encoder 100 or 300 and/or a decoder 200 or 500, generating a sub-block based motion prediction signal. At block 1860, the encoder 100 or 300 and/or the decoder 200 or 500 may determine one or more spatial gradients (e.g., associated with a gradient filter) of the sub-block based motion prediction signal. At block 1865, the encoder 100 or 300 and/or the decoder 200 or 500 may determine a motion prediction refinement signal for the current block based on the determined spatial gradients. At block 1870, the encoder 100 or 300 and/or the decoder 200 or 500 may combine (e.g., add or subtract, among others) the sub-block based motion prediction signal and the motion prediction refinement signal to produce a refined motion prediction signal for the current block. At block 1875, the encoder 100 or 300 may encode the video using the refined motion prediction signal, as the prediction for the current block and/or the decoder 200 or 500 may decode the video using the refined motion prediction signal, as the prediction for the current block. In certain embodiments, the operations at blocks 1810, 1820, 1830 and 1840 may be performed for a current block which is the block which generally refers to the block currently being encoded or decoded. The refined motion prediction signal may be a refined motion inter-prediction signal generated (e.g., by a GBi encoder 300 and/or a GBi decoder 500) and may use one or more PROF operations.

For example, the determination of one or more spatial gradients of the sub-block based motion prediction signal, by the encoder 100 or 300 and/or the decoder 200 or 500, may include a determination of a first set of spatial gradients associated with a first reference picture and a second set of spatial gradients associated with a second reference picture. The determination of the motion prediction refinement signal for the current block, by the encoder 100 or 300 and/or the decoder 200 or 500, may be based on the determined spatial gradients and may include a determination of a motion inter-prediction refinement signal (e.g., a bi-prediction signal) for the current block based on the first and second sets of spatial gradients and may also be based on weight information W (e.g., indicating or including one or more weight values that are associated with one or more reference pictures).

In certain representative embodiments including at least the representative methods 1800, 1850, 1900, 2000, 2100, 2200 and 2600, the encoder 100 or 300 may generate, use and/or send the weight information W to the decoder 200 or 500 and/or the decoder 200 or 500 may receive or obtain the weight information W. For example, the motion inter-prediction refinement signal for the current block may be based on: (1) a first gradient value derived from the first set of spatial gradients and weighted in accordance with a first weight factor indicated by the weight information W and/or (2) a second gradient value derived from the second set of spatial gradients and weighted in accordance with a second weight factor indicated by the weight information W.

In certain representative embodiments including at least representative methods 1800, 1850, 1900, 2000, 2100, 2200 and 2600, these methods may further comprise the encoder 100 or 300 and/or the decoder 200 or 500 determining affine motion model parameters for the current block of the video such that the sub-block based motion prediction signal may be generated using the determined affine motion model parameters.

In certain representative embodiments including the representative methods 1800, 1850, 1900, 2000, 2100, 2200 and 2600, these methods may include a determination, by the encoder 100 or 300 and/or the decoder 200 or 500, of the one or more spatial gradients of the sub-block based motion prediction signal which may include a calculation of at least one gradient value for one respective sample location, a portion of the respective sample locations or each respective sample location in at least one sub-block of the sub-block based motion prediction signal. For example, the calculation of the at least one gradient value for one respective sample location, a portion of the respective sample locations or each respective sample location in at least one sub-block of the sub-block-based motion prediction signal may include, for one respective sample location, a portion of the respective sample locations or each respective sample location, applying a gradient filter to the respective sample location in the at least one sub-block of the sub-block based motion prediction signal.

In certain representative embodiments including the representative methods 1800, 1850, 1900, 2000, 2100, 2200 and 2600, these methods may further comprise the encoder 100 or 300 and/or the decoder 200 or 500 determining a set of motion vector difference values associated with the sample locations of a first sub-block of the current block of the sub-block based motion prediction signal. In some examples, the difference values may be determined for a sub-block (e.g., a first sub-block) and may be reused for some or all of the other sub-blocks in the current block. In certain examples, the sub-block based motion prediction signal may be generated and the set of motion vector difference values may be determined using an affine motion model, or a different motion model (e.g., another sub-block based motion model such as a SbTMVP model). As an example, the set of motion vector difference values may be determined for a first sub-block of the current block and may be used to determine the motion prediction refinement signal for one or more further sub-blocks of the current block.

In certain representative embodiments including the representative methods 1800, 1850, 1900, 2000, 2100, 2200 and 2600, the one or more spatial gradients of the sub-block based motion prediction signal and the set of motion vector difference values may be used to determine the motion prediction refinement signal for the current block.

In certain representative embodiments including the representative methods 1800, 1850, 1900, 2000, 2100, 2200 and 2600, the sub-block based motion prediction signal is generated and the set of motion vector difference values is determined using an affine motion model for the current block.

In certain representative embodiments including the representative methods 1800, 1850, 1900, 2000, 2100, 2200 and 2600, the determination of one or more spatial gradients of the sub-block based motion prediction signal may include: for one or more respective sub-blocks of the current block: a determination of an extended sub-block, using the sub-block based motion prediction signal and adjacent reference samples that border and surround the respective sub-block; and a determination, using the determined extended sub-block, of spatial gradients of the respective sub-block to determine the motion prediction refinement signal.

FIG. 19 is a flowchart illustrating a third representative encoding and/or decoding method.

Referring to FIG. 19, the representative method 1900 to encode and/or to decode a video may include, at block 1910, an encoder 100 or 300 and/or a decoder 200 or 500, generating a sub-block based motion prediction signal. At block 1920, the encoder 100 or 300 and/or the decoder 200 or 500 may determine a set of motion vector difference values associated with a sub-block of the current block (e.g., the set of motion vector difference values may be associated with, for example all of the sub-blocks of the current block). At block 1930, the encoder 100 or 300 and/or the decoder 200 or 500 may determine a motion prediction refinement signal for the current block based on the determined set of motion vector difference values. At block 1940, the encoder 100 or 300 and/or the decoder 200 or 500 may combine (e.g., add or subtract, among others) the sub-block based motion prediction signal and the motion prediction refinement signal to produce or generate a refined motion prediction signal for the current block. At block 1950, the encoder 100 or 300 may encode the video using the refined motion prediction signal, as the prediction for the current block and/or the decoder 200 or 500 may decode the video using the refined motion prediction signal, as the prediction for the current block. In certain embodiments, the operations at blocks 1910, 1920, 1930 and 1940 may be performed for a current block which generally refers to the block that is currently being encoded or decoded. In certain representative embodiments, the refined motion prediction signal may be a refined motion inter-prediction signal generated (e.g., by a GBi encoder 300 or a GBi decoder 500) and may use one or more PROF operations.

In certain representative embodiments including at least the representative methods 1800, 1850, 1900, 2000, 2100, 2200 and 2600, these methods may include a determination, by the encoder 100 or 300 and/or the decoder 200 or 500, of motion model parameters (e.g., one or more affine motion model parameters) for the current block of the video such that the sub-block based motion prediction signal may be generated using the determined motion model parameters (e.g., affine motion model parameters).

In certain representative embodiments including at least the representative methods 1800, 1850, 1900, 2000, 2100, 2200 and 2600, these methods may include a determination, by the encoder 100 or 300 and/or the decoder 200 or 500, of one or more spatial gradients of the sub-block based motion prediction signal. For example, the determination of the one or more spatial gradients of the sub-block based motion prediction signal may include a calculation of at least one gradient value for one respective sample location, a portion of the respective sample locations or each respective sample location in at least one sub-block of the sub-block based motion prediction signal. For example, the calculation of the at least one gradient value for one respective sample location, a portion of the respective sample locations or each respective sample location in at least one sub-block of the sub-block-based motion prediction signal may include, for one respective sample location, a portion of the respective sample locations or each respective sample location, applying a gradient filter to the respective sample location in the at least one sub-block of the sub-block based motion prediction signal.

In certain representative embodiments including at least the representative methods 1800, 1850, 1900, 2000, 2100, 2200 and 2600, these methods may include a determination, by the encoder 100 or 300 and/or the decoder 200 or 500, of the motion prediction refinement signal for the current block using gradient values associated with the spatial gradients for one respective sample location, a portion of the respective sample locations or each respective sample location of the current block and the determined set of motion vector difference values associated with the sample locations of a sub-block (e.g., any sub-block) of the current block of the sub-block motion prediction signal.

In certain representative embodiments including at least the representative methods 1800, 1850, 1900, 2000, 2100, 2200 and 2600, the determination of the motion prediction refinement signal for the current block may use gradient values associated with the spatial gradients for one or more respective sample locations or each sample location of one or more sub-blocks of the current block and the determined set of motion vector difference values.

FIG. 20 is a flowchart illustrating a fourth representative encoding and/or decoding method.

Referring to FIG. 20, the representative method 2000 to encode and/or to decode a video may include, at block 2010, an encoder 100 or 300 and/or a decoder 200 or 500, generating a sub-block based motion prediction signal using at least a first motion vector for a first sub-block of the current block and a further motion vector for a second sub-block of the current block. At block 2020, the encoder 100 or 300 and/or the decoder 200 or 500 may calculate a first set of gradient values for a first sample location in the first sub-block of the sub-block-based motion prediction signal and a second, different set of gradient values for a second sample location in the first sub-block of the sub-block based motion prediction signal. At block 2030, the encoder 100 or 300 and/or the decoder 200 or 500 may determine a first set of motion vector difference values for the first sample location and a second, different set of motion vector difference values for the second sample location. For example, the first set of motion vector difference values for a first sample location may be indicative of a difference between a motion vector at the first sample location and the motion vector of the first sub-block and the second set of motion vector difference values for a second sample location may be indicative of a difference between a motion vector at the second sample location and the motion vector of the first sub-block. At block 2040, the encoder 100 or 300 and/or the decoder 200 or 500 may determine a prediction refinement signal using the first and second sets of gradient values and the first and second sets of motion vector difference values. At block 2050, the encoder 100 or 300 and/or the decoder 200 or 500 may combine (e.g., add or subtract, among others) the sub-block based motion prediction signal with the prediction refinement signal to produce a refined motion prediction signal. At block 2060, the encoder 100 or 300 may encode the video using the refined motion prediction signal, as the prediction for the current block and/or the decoder 200 or 500 may decode the video using the refined motion prediction signal, as the prediction for the current block. In certain embodiments, the operations at blocks 2010, 2020, 2030, 2040 and 2050 may be performed for a current block that includes a plurality of sub-blocks.

FIG. 21 is a flowchart illustrating a fifth representative encoding and/or decoding method.

Referring to FIG. 21, the representative method 2100 to encode and/or to decode a video may include, at block 2110, an encoder 100 or 300 and/or a decoder 200 or 500 generating a sub-block based motion prediction signal for a current block. At block 2120, the encoder 100 or 300 and/or the decoder 200 or 500 may determine a prediction refinement signal using optical flow information indicative of a refined motion of a plurality of sample locations in the current block of the sub-block based motion prediction signal. At block 2130, the encoder 100 or 300 and/or the decoder 200 or 500 may combine (e.g., add or subtract, among others) the sub-block based motion prediction signal with the prediction refinement signal to produce a refined motion prediction signal. At block 2140, the encoder 100 or 300 may encode the video using the refined motion prediction signal, as the prediction for the current block and/or the decoder 200 or 500 may decode the video using the refined motion prediction signal, as the prediction for the current block. For example, the current block may include a plurality of sub-blocks and the sub-block based motion prediction signal may be generated using at least a first motion vector for a first sub-block of the current block and a further motion vector for a second sub-block of the current block.

In certain representative embodiments including at least the representative methods 1800, 1850, 1900, 2000, 2100, 2200 and 2600, these methods may include a determination, by the encoder 100 or 300 and/or the decoder 200 or 500, of the prediction refinement signal which may use optical flow information. This determination may include calculating, by the encoder 100 or 300 and/or the decoder 200 or 500, a first set of gradient values for a first sample location in the first sub-block of the sub-block-based motion prediction signal and a second, different set of gradient values for a second sample location in the first sub-block of the sub-block based motion prediction signal. A first set of motion vector difference values for the first sample location and a second, different set of motion vector difference values for the second sample location may be determined. For example, the first set of motion vector difference values for a first sample location may be indicative of a difference between a motion vector at the first sample location and the motion vector of the first sub-block and the second set of motion vector difference values for a second sample location may be indicative of a difference between a motion vector at the second sample location and the motion vector of the first sub-block. The encoder 100 or 300 and/or the decoder 200 or 500 may determine the prediction refinement signal using the first and second sets of gradient values and the first and second sets of motion vector difference values.

In certain representative embodiments including at least the representative methods 1800, 1850, 1900, 2000, 2100, 2200 and 2600, these methods may include a determination, by the encoder 100 or 300 and/or the decoder 200 or 500, of the prediction refinement signal which may use optical flow information. This determination may include calculating a third set of gradient values for the first sample location in the second sub-block of the sub-block based motion prediction signal and a fourth set of gradient values for the second sample location in the second sub-block of the sub-block based motion prediction signal. The encoder 100 or 300 and/or the decoder 200 or 500 may determine the prediction refinement signal for the second sub-block using the third and fourth sets of gradient values and the first and second sets of motion vector difference values.

FIG. 22 is a flowchart illustrating a sixth representative encoding and/or decoding method.

Referring to FIG. 22, the representative method 2200 to encode and/or to decode a video may include, at block 2210, an encoder 100 or 300 and/or a decoder 200 or 500 determining a motion model for a current block of the video. The current block may include a plurality of sub-blocks. For example, the motion model may generate individual (e.g. per-sample) motion vectors for a plurality of sample locations in the current block. At block 2220, the encoder 100 or 300 and/or the decoder 200 or 500 may generate, using the determined motion model, a sub-block based motion prediction signal for the current block. The sub-block based motion prediction signal generated may use one motion vector for each sub-block of the current block. At block 2230, the encoder 100 or 300 and/or the decoder 200 or 500 may calculate gradient values by applying a gradient filter to a portion of the plurality of sample locations of the sub-block based motion prediction signal. At block 2240, the encoder 100 or 300 and/or the decoder 200 or 500 may determine motion vector difference values for the portion of the sample locations, each of the motion vector difference values may be indicative of a difference between a motion vector (e.g., an individual motion vector) generated for a respective sample location, according to the motion model, and the motion vector used to produce the sub-block based motion prediction signal for the sub-block including the respective sample location. At block 2250, the encoder 100 or 300 and/or the decoder 200 or 500 may determine a prediction refinement signal using the gradient values and the motion vector difference values. At block 2260, the encoder 100 or 300 and/or the decoder 200 or 500 may combine (e.g., add or subtract, among others) the sub-block based motion prediction signal with the prediction refinement signal to produce a refined motion prediction signal for the current block. At block 2270, the encoder 100 or 300 may encode the video using the refined motion prediction signal, as the prediction for the current block and/or the decoder 200 or 500 may decode the video using the refined motion prediction signal, as the prediction for the current block.

FIG. 23 is a flowchart illustrating a seventh representative encoding and/or decoding method.

Referring to FIG. 23, the representative method 2300 to encode and/or to decode a video may include, at block 2310, an encoder 100 or 300 and/or a decoder 200 or 500, performing a sub-block based motion compensation to generate a sub-block based motion prediction signal, as a coarse motion prediction signal. At block 2320, the encoder 100 or 300 and/or the decoder 200 or 500 may calculate one or more spatial gradients of the sub-block based motion prediction signal at sample locations. At block 2330, the encoder 100 or 300 and/or the decoder 200 or 500 may calculate an intensity change per pixel in the current block based on the calculated spatial gradients. At block 2340, the encoder 100 or 300 and/or the decoder 200 or 500 may determine a per-pixel based motion prediction signal based on the calculated intensity change per pixel, as a refined motion prediction signal. At block 2350, the encoder 100 or 300 and/or the decoder 200 or 500 may predict the current block using the coarse motion prediction signal of each sub-block of the current block and using the refined motion prediction signal of each pixel of the current block. In certain embodiments, the operations at blocks 2310, 2320, 2330, 2340 and 2350 may be performed for at least one block (e.g., the current block) in the video. For example, the calculating of the intensity change per pixel in the current block may include determining a luminance intensity change for each pixel in the current block in accordance with an optical flow equation. The predicting of the current block may include predicting a motion vector for each respective pixel in the current block by combining a coarse motion prediction vector for a sub-block that includes the respective pixel with a refined motion prediction vector that is relative to the coarse motion prediction vector and associated with the respective pixel.

In certain representative embodiments including at least the representative methods 1800, 1850, 1900, 2000, 2100, 2200, 2300 and 2600, the one or more spatial gradients of the sub-block based motion prediction signal may include any of: a horizontal gradient and/or a vertical gradient, and for example, the horizontal gradient may be calculated as a luma difference or a chroma difference between a right neighboring sample of a sample of a sub-block and a left neighboring sample of the sample of the sub-block and/or the vertical gradient may be calculated as the luma difference or the chroma difference between a bottom neighboring sample of the sample of the sub-block and a top neighboring sample of the sample of the sub-block.

In certain representative embodiments including at least the representative methods 1800, 1850, 1900, 2000, 2100, 2200, 2300 and 2600, the one or more spatial gradients of the sub-block prediction may be generated using a Sobel filter.

In certain representative embodiments including at least the representative methods 1800, 1850, 1900, 2000, 2100, 2200, 2300 and 2600, the coarse motion prediction signal may use one of: a 4-parameter affine model or a 6-parameter affine model. For example, the sub-block based motion compensation may be one of: (1) an affine sub-block based motion compensation; or (2) another compensation (e.g., a sub-block based temporal motion vector prediction (SbTMVP) mode motion compensation; and/or a regression based motion vector field (RMVF) mode based compensation). On condition that the SbTMVP mode based motion compensation is performed, the method may include: estimating, by a linear regression operation, affine model parameters using a sub-block motion vector field; and deriving pixel-level motion vectors using the estimated affine model parameters. On condition that the RMVF mode based motion compensation is performed, the method may include: estimating affine model parameters; and deriving pixel-level motion vector offsets from sub-block level motion vectors using the estimated affine model parameters. For example, the pixel motion vector offsets may be relative to a center (e.g., actual center or a closest sample location to the actual center) of the sub-block. For example, the coarse motion prediction vector for the sub-block may be based on an actual center position of the sub-block.

In certain representative embodiments, including at least the representative methods 1800, 1850, 1900, 2000, 2100, 2200, 2300 and 2600, these methods may include the encoder 100 or 300 or decoder 200 or 500 selecting one of: (1) an actual center of each sub-block or (2) one of the pixel (e.g., sample) locations closest to the center of the sub-block, as a center position associated with the coarse motion prediction vector (e.g., sub-block based motion prediction vector) for each sub-block. For example, the predicting of the current block using the coarse motion prediction signal (e.g., sub-block based motion prediction signal) of the current block and using the refined motion prediction signal of each pixel (e.g., sample) of the current block may be based on the selected center position of each sub-block. For example, the encoder 100 or 300 and/or the decoder 200 or 500 may determine a center position associated with chroma pixels of the sub-block; and may determine an offset to the center position of the chroma pixels of the sub-block based on a chroma location sample type associated with the chroma pixels. The coarse motion prediction signal (e.g., the sub-block based motion prediction signal) for the sub-block may be based on the actual position of the sub-block corresponding to the determined center position of the chroma pixels adjusted by the offset.

In certain representative embodiments, including at least the representative methods 1800, 1850, 1900, 2000, 2100, 2200, 2300 and 2600, these methods may include the encoder 100 or 300 generating or the decoder 200 or 500 receiving information indicating whether Prediction Refinement with Optical Flow (PROF) is enabled in one of: (1) a sequence parameter set (SPS) header, (2) a picture parameter set (PPS) header or (3) a tile group header. For example, on condition that PROF is enabled, a refined motion prediction operation may be performed such that the coarse motion prediction signal (e.g., sub-block based motion prediction signal) and refined motion prediction signal may be used to predict the current block. As another example, on condition that PROF is not enabled, the refined motion prediction operation is not performed such that only the coarse motion prediction signal (e.g., sub-block based motion prediction signal) may be used to predict the current block.

In certain representative embodiments, including at least the representative methods 1800, 1850, 1900, 2000, 2100, 2200, 2300 and 2600, these methods may include the encoder 100 or 300 and/or the decoder 200 or 500 determining whether to perform a refined motion prediction operation on the current block or in an affine motion estimation based on attributes of the current block and/or attributes of the affine motion estimation.

In certain representative embodiments, including at least the representative methods 1800, 1850, 1900, 2000, 2100, 2200, 2300 and 2600, these methods may include the encoder 100 or 300 and/or the decoder 200 or 500 determining whether to perform a refined motion prediction operation on the current block or in an affine motion estimation based on attributes of the current block and/or attributes of the affine motion estimation. For example, the determination of whether to perform the refined motion prediction operation on the current block based on the attributes of the current block may include determining whether to perform the refined motion prediction operation on the current block based on whether: any of: (1) a size of the current block exceeds a particular size; and/or (2) a control point motion vector (CPMV) difference exceed a threshold value.

In certain representative embodiments, including at least the representative methods 1800, 1850, 1900, 2000, 2100, 2200, 2300 and 2600, these methods may include the encoder 100 or 300 and/or the decoder 200 or 500 applying a first deblocking filter to one or more boundaries of a sub-block of the current block that coincide with a transform unit boundary and a second, different deblocking filter to other boundaries of the sub-block of the current block that do not coincide with any transform unit boundaries. For example, the first deblocking filter may be a stronger deblocking filter than the second deblocking filter.

FIG. 24 is a flowchart illustrating an eighth representative encoding and/or decoding method.

Referring to FIG. 24, the representative method 2400 to encode and/or to decode a video may include, at block 2410, an encoder 100 or 300 and/or a decoder 200 or 500, performing a sub-block based motion compensation to generate a sub-block based motion prediction signal, as a coarse motion prediction signal. At block 2420, the encoder 100 or 300 and/or the decoder 200 or 500, for each respective border sample of a sub-block of the current block, may determine one or more reference samples corresponding to samples adjacent to the respective border sample and surrounding the sub-block, as surrounding reference samples, and may determine, using the surrounding reference samples and samples of the sub-block adjacent to the respective border sample, one or more spatial gradients associated with the respective border sample. At block 2430, the encoder 100 or 300 and/or the decoder 200 or 500, for each respective non-border sample in the sub-block, may determine, using samples of the sub-block adjacent to the respective non-border sample, one or more spatial gradients associated with the respective non-border sample. At block 2440, the encoder 100 or 300 and/or the decoder 200 or 500 may calculate an intensity change per pixel in the current block using the determined spatial gradients of the sub-block. At block 2450, the encoder 100 or 300 and/or the decoder 200 or 500 may determine a per-pixel based motion prediction signal based on the calculated intensity change per pixel, as a refined motion prediction signal. At block 2460, the encoder 100 or 300 and/or the decoder 200 or 500 may predict the current block using the coarse motion prediction signal associated with each sub-block of the current block and using the refined motion prediction signal associated with each pixel of the current block. In certain embodiments, the operations at blocks 2410, 2420, 2430, 2440, 2450 and 2460 may be performed for at least one block (e.g., the current block) in the video.

In certain representative embodiments, including at least the representative methods 1800, 1850, 1900, 2000, 2100, 2200, 2300, 2400 and 2600, the determination of the one or more spatial gradients of the border samples and the non-border samples may include calculating the one or more spatial gradients using any of: (1) a vertical Sobel filter; (2) a horizonal Sobel filter; or (3) a 3-tap filter.

In certain representative embodiments, including at least the representative methods 1800, 1850, 1900, 2000, 2100, 2200, 2300, 2400 and 2600, these methods may include the encoder 100 or 300 and/or the decoder 200 or 500 copying surrounding reference samples from a reference store without any further manipulation and the determination of the one or more spatial gradients associated with the respective border sample may use the copied surrounding reference samples to determine the one or more spatial gradients associated with the respective border sample.

FIG. 25 is a flowchart illustrating a representative gradient calculation method.

Referring to FIG. 25, the representative method 2500 of calculating a gradient of a sub-block using reference samples corresponding to samples adjacent to a border of the sub-block (e.g., used in encoding and/or decoding a video) may include, at block 2510, an encoder 100 or 300 and/or a decoder 200 or 500, for each respective border sample of the sub-block of the current block, determining one or more reference samples corresponding to samples adjacent to the respective border sample and surrounding the sub-block, as surrounding reference samples, and determining, using the surrounding reference samples and samples of the sub-block adjacent to the respective border sample, one or more spatial gradients associated with the respective border sample. At block 2520, the encoder 100 or 300 and/or the decoder 200 or 500, for each respective non-border sample in the sub-block, may determine, using samples of the sub-block adjacent to the respective non-border sample, one or more spatial gradients associated with the respective non-border sample. In certain embodiments, the operations at blocks 2510 and 2520 may be performed for at least one block (e.g., the current block) in the video.

In certain representative embodiments, including at least the representative methods 1800, 1850, 1900, 2000, 2100, 2200, 2300, 2400, 2500 and 2600, the determined one or more spatial gradients may be used in predicting the current block by any one of: (1) a Prediction Refinement with Optical Flow (PROF) operation (2) a Bi-directional optical flow operation or (3) an Affine motion estimation operation.

FIG. 26 is a flowchart illustrating a ninth representative encoding and/or decoding method.

Referring to FIG. 26, the representative method 2600 to encode and/or to decode a video may include, at block 2610, an encoder 100 or 300 and/or a decoder 200 or 500 generating a sub-block based motion prediction signal for a current block of the video. For example, the current block may include a plurality of sub-blocks. At block 2620, the encoder 100 or 300 and/or the decoder 200 or 500, may, for one or more or each respective sub-block of the current block, determine an extended sub-block, using the sub-block based motion prediction signal and adjacent reference samples that border and surround the respective sub-block, and determine, using the determined extended sub-block, spatial gradients of the respective sub-block. At block 2630, the encoder 100 or 300 and/or the decoder 200 or 500 may determine a motion prediction refinement signal for the current block based on the determined spatial gradients. At block 2640, the encoder 100 or 300 and/or the decoder 200 or 500 may combine (e.g., add or subtract, among others) the sub-block based motion prediction signal and the motion prediction refinement signal to produce a refined motion prediction signal for the current block. At block 2650, the encoder 100 or 300 may encode the video using the refined motion prediction signal, as the prediction for the current block and/or the decoder 200 or 500 may decode the video using the refined motion prediction signal, as the prediction for the current block. In certain embodiments, the operations at block 2610, 2620, 2630, 2640 and 2650 may be performed for at least one block (e.g., the current block) in the video.

In certain representative embodiments, including at least the representative methods 1800, 1850, 1900, 2000, 2100, 2200, and 2600, these methods may include the encoder 100 or 300 and/or the decoder 200 or 500 copying the adjacent reference samples from a reference store without any further manipulation. For example, the determination of the spatial gradients of the respective sub-block may use the copied adjacent reference samples to determine gradient values associated with sample locations on a border of the respective sub-block. The adjacent reference samples of the extended block may be copied from nearest integer positions in a reference picture that includes the current block. In certain examples, the adjacent reference samples of the extended block have a nearest integer motion vector rounded from an original precision.

In certain representative embodiments, including at least the representative methods 1800, 1850, 1900, 2000, 2100, 2200, and 2600, these methods may include the encoder 100 or 300 and/or the decoder 200 or 500 determining affine motion model parameters for the current block of the video such that the sub-block based motion prediction signal may be generated using the determined affine motion model parameters.

In certain representative embodiments, including at least the representative methods 1800, 1850, 1900, 2000, 2100, 2200, 2300, 2500 and 2600, the determination of spatial gradients of the respective sub-block may include calculating at least one gradient value for each respective sample location in the respective sub-block. For example, the calculation of the at least one gradient value for each respective sample location in the respective sub-block may include, for each respective sample location, applying a gradient filter to the respective sample location in the respective sub-block. As another example, the calculation of the at least one gradient value for each respective sample location in the respective sub-block may include determining an intensity change for each respective sample location in the respective sub-block in accordance with optical flow equations.

In certain representative embodiments, including at least the representative methods 1800, 1850, 1900, 2000, 2100, 2200, and 2600, these methods may include the encoder 100 or 300 and/or the decoder 200 or 500 determining a set of motion vector difference values associated with the sample locations of the respective sub-block. For example, the sub-block based motion prediction signal may be generated and the set of motion vector difference values may be determined using an affine motion model for the current block.

In certain representative embodiments, including at least the representative methods 1800, 1850, 1900, 2000, 2100, 2200, and 2600, the set of motion vector difference values may be determined for the respective sub-block of the current block and may be used to determine the motion prediction refinement signal for other remaining sub-blocks of the current block.

In certain representative embodiments, including at least the representative methods 1800, 1850, 1900, 2000, 2100, 2200, and 2600, the determination of the spatial gradients of the respective sub-block may include calculating the spatial gradients using any of: (1) a vertical Sobel filter; (2) a horizonal Sobel filter; and/or (3) a 3-tap filter.

In certain representative embodiments, including at least the representative methods 1800, 1850, 1900, 2000, 2100, 2200, and 2600, adjacent reference samples that border and surround the respective sub-block may use integer motion compensation.

In certain representative embodiments, including at least the representative methods 1800, 1850, 1900, 2000, 2100, 2200, and 2600, the spatial gradients of the respective sub-block may include any of: a horizontal gradient or a vertical gradient. For example, the horizontal gradient may be calculated as a luma difference or a chroma difference between a right neighboring sample of a respective sample and a left neighboring sample of the respective sample; and/or the vertical gradient may be calculated as the luma difference or the chroma difference between a bottom neighboring sample of the respective sample and a top neighboring sample of the respective sample.

In certain representative embodiments, including at least the representative methods 1800, 1850, 1900, 2000, 2100, 2200, and 2600, the sub-block based motion prediction signal may be generated using any of: (1) a 4-parameter affine model; (2) a 6-parameter affine model; (3) a sub-block based Temporal Motion Vector Prediction (SbTMVP) mode motion compensation; or (3) a regression based motion compensation. For example, on condition that an SbTMVP mode motion compensation is performed, the method may include: estimating, by a linear regression operation, affine model parameters using a sub-block motion vector field; and/or deriving pixel-level motion vectors using the estimated affine model parameters. As another example, on condition that a RMVF mode based motion compensation is performed, the method may include: estimating affine model parameters; and/or deriving pixel-level motion vector offsets from sub-block level motion vectors using the estimated affine model parameters. The pixel motion vector offsets may be relative to a center of the respective sub-block.

In certain representative embodiments, including at least the representative methods 1800, 1850, 1900, 2000, 2100, 2200, and 2600, the refined motion prediction signal for the respective sub-block may be based on an actual center position of the respective sub-block or may be based on a sample location closest to the actual center of the respective sub-block.

For example, these methods may include the encoder 100 or 300 and/or the decoder 200 or 500 selecting, as a center position associated with a motion prediction vector for each respective sub-block, one of: (1) an actual center of each respective sub-block or (2) a sample location closest to the actual center of the respective sub-block. The refined motion prediction signal may be based on the selected center position of each sub-block.

In certain representative embodiments, including at least the representative methods 1800, 1850, 1900, 2000, 2100, 2200, and 2600, these methods may include the encoder 100 or 300 and/or the decoder 200 or 500 determining a center position associated with chroma pixels of the respective sub-block; and an offset to the center position of the chroma pixels of the respective sub-block based on a chroma location sample type associated with the chroma pixels. The refined motion prediction signal for the respective sub-block may be based on the actual position of the sub-block corresponding to the determined center position of the chroma pixels adjusted by the offset.

In certain representative embodiments, including at least the representative methods 1800, 1850, 1900, 2000, 2100, 2200, and 2600, the encoder 100 or 300 may generate and transmit information indicating whether Prediction Refinement with Optical Flow (PROF) is enabled in one of: (1) a sequence parameter set (SPS) header, (2) a picture parameter set (PPS) header or (3) a tile group header and/or the decoder 200 or 500 may receive the information indicating whether PROF is enabled in one of: (1) the SPS header, (2) the PPS header or (3) a tile group header.

FIG. 27 is a flowchart illustrating a tenth representative encoding and/or decoding method.

Referring to FIG. 27, the representative method 2700 to encode and/or to decode a video may include, at block 2710, an encoder 100 or 300 and/or a decoder 200 or 500 determining an actual center position of each respective sub-block of the current block. At block 2720, the encoder 100 or 300 and/or the decoder 200 or 500 may generate a sub-block based motion prediction signal or a refined motion prediction signal using the actual center position each respective sub-block of the current block. At block 2730, (1) the encoder 100 or 300 may encode the video using the sub-block based motion prediction signal or the generated refined motion prediction signal, as the prediction for the current block or (2) the decoder 200 or 500 may decode the video using the sub-block based motion prediction signal or the generated refined motion prediction signal, as the prediction for the current block. In certain embodiments, the operations at blocks 2710, 2720 and 2730 may be performed for at least one block (e.g., the current block) in the video.

For example, the determination of the actual center position of each respective sub-block of the current block may include determining a chroma center position associated with chroma pixels of a respective sub-block and an offset of the chroma center position relative to the center position of the respective sub-block based on a chroma location sample type of the chroma pixels. The sub-block based motion prediction signal or the refined motion prediction signal for the respective sub-block may be based on the actual center position of the respective sub-block, which corresponds to the determined chroma center position adjusted by the offset. Although the actual center of each respective sub-block of the current block is described as determined/used for the various operations, it is contemplated that one, a portion or all of the center positions of such sub-blocks may be determined/used.

In certain representative embodiments, including at least the representative methods 1800, 1850, 1900, 2000, 2100, 2200, 2600, 2700 and 2800, the generation of the refined motion prediction signal may use the sub-block based motion prediction signal by, for each respective sub-block of the current block, determining one or more spatial gradients of the sub-block based motion prediction signal, determining a motion prediction refinement signal for the current block based on the determined spatial gradients, and/or combining the sub-block based motion prediction signal and the motion prediction refinement signal to produce the refined motion prediction signal for the current block. For example, the determination of one or more spatial gradients of the sub-block based motion prediction signal may include: determining an extended sub-block, using the sub-block based motion prediction signal and adjacent reference samples that border and surround the respective sub-block and/or determining, using the determined extended sub-block, the one or more spatial gradients of the respective sub-block.

In certain representative embodiments, including at least the representative methods 1800, 1850, 1900, 2000, 2100, 2200, 2600, 2700 and 2800, the determination of spatial gradients of the respective sub-block may include calculating at least one gradient value for each respective sample location in the respective sub-block. For example, the calculating of the at least one gradient value for each respective sample location in the respective sub-block may include, for each respective sample location, applying a gradient filter to the respective sample location in the respective sub-block.

As another example, the calculation of the at least one gradient value for each respective sample location in the respective sub-block may include determining an intensity change for one or more respective sample locations in the respective sub-block in accordance with optical flow equations.

In certain representative embodiments, including at least the representative methods 1800, 1850, 1900, 2000, 2100, 2200, 2600, 2700 and 2800, these method may include the encoder 100 or 300 and/or the decoder 200 or 500 determining a set of motion vector difference values associated with the sample locations of the respective sub-block. The sub-block based motion prediction signal may be generated and the set of motion vector difference values may be determined using an affine motion model for the current block. In certain examples, the set of motion vector difference values may be determined for the respective sub-block of the current block and may be used (e.g., reused) to determine the motion prediction refinement signal for that sub-block and other remaining sub-blocks of the current block. For example, the determining of the spatial gradients of the respective sub-block may include calculating the spatial gradients using any of: (1) a vertical Sobel filter; (2) a horizonal Sobel filter; and/or (3) a 3-tap filter. The adjacent reference samples that border and surround the respective sub-block may use integer motion compensation.

In some embodiments, the spatial gradients of the respective sub-block may include any of: a horizontal gradient or a vertical gradient. For example, the horizontal gradient may be calculated as a luma difference or a chroma difference between a right neighboring sample of the respective sample and a left neighboring sample of the respective sample. As another example, the vertical gradient may be calculated as the luma difference or the chroma difference between a bottom neighboring sample of the respective sample and a top neighboring sample of the respective sample.

In certain representative embodiments, including at least the representative methods 1800, 1850, 1900, 2000, 2100, 2200, 2600, 2700 and 2800, the sub-block based motion prediction signal may be generated using any of: (1) a 4-parameter affine model; (2) a 6-parameter affine model; (3) a sub-block based Temporal Motion Vector Prediction (SbTMVP) mode motion compensation; and/or (3) a regression based motion compensation. For example, on condition that an SbTMVP mode motion compensation is performed, the method may include: estimating, by a linear regression operation, affine model parameters using a sub-block motion vector field; and/or deriving pixel-level motion vectors using the estimated affine model parameters. As another example, on condition that a regression motion vector field (RMVF) mode based motion compensation is performed, the method may include: estimating affine model parameters; and/or deriving pixel-level motion vector offsets from sub-block level motion vectors using the estimated affine model parameters, wherein the pixel motion vector offsets are relative to a center of the respective sub-block.

In certain representative embodiments, including at least the representative methods 1800, 1850, 1900, 2000, 2100, 2200, 2600, 2700 and 2800, the refined motion prediction signal may be generated using a plurality of motion vectors associated with control points of the current block.

In certain representative embodiments, including at least the representative methods 1800, 1850, 1900, 2000, 2100, 2200, 2600, 2700 and 2800, the encoder 100 or 300 may generate, encode, and transmit and the decoder 200 or 500 may receive and decode information indicating whether Prediction Refinement with Optical Flow (PROF) is enabled in one of: (1) a sequence parameter set (SPS) header, (2) a picture parameter set (PPS) header or (3) a tile group header.

FIG. 28 is a flowchart illustrating an eleventh representative encoding and/or decoding method.

Referring to FIG. 28, the representative method 2800 to encode and/or to decode a video may include, at block 2810, an encoder 100 or 300 and/or a decoder 200 or 500 selecting, as a center position associated with a motion prediction vector for each respective sub-block, one of: (1) an actual center of each respective sub-block or (2) a sample location closest to the actual center of the respective sub-block. At block 2820, the encoder 100 or 300 and/or the decoder 200 or 500 may determine the selected center position of each respective sub-block of the current block. At block 2830, the encoder 100 or 300 and/or the decoder 200 or 500 may generate a sub-block based motion prediction signal or a refined motion prediction signal using the selected center position of each respective sub-block of the current block. At block 2840, (1) the encoder 100 or 300 may encode the video using the sub-block based motion prediction signal or the generated refined motion prediction signal, as the prediction for the current block or (2) the decoder 200 or 500 may decode the video using the sub-block based motion prediction signal or the generated refined motion prediction signal, as the prediction for the current block. In certain embodiments, the operations at blocks 2810, 2820, 2830, and 2840 may be performed for at least one block (e.g., the current block) in the video. Although the selection of the center position is described with regard to each respective sub-block of the current block, it is contemplated that one, a portion or all of the center positions of such sub-blocks may be selected/used in the various operations.

FIG. 29 is a flowchart illustrating a representative encoding method.

Referring to FIG. 29, the representative method 2900 to encode a video may include, at block 2910, an encoder 100 or 300, performing motion estimation for the current block of the video including determining affine motion model parameters for the current block using an iterative motion compensation operation, and generating a sub-block based motion prediction signal for the current block using the determined affine motion model parameters. At block 2920, the encoder 100 or 300, after performing motion estimation for the current block, may perform a Prediction Refinement with Optical Flow (PROF) operation to generate a refined motion prediction signal. At block 2930, the encoder 100 or 300 may encode the video using the refined motion prediction signal, as the prediction for the current block. For example, the PROF operation may include: determining one of more spatial gradients of the sub-block based motion prediction signal; determining a motion prediction refinement signal for the current block based on the determined spatial gradients; and/or combining the sub-block based motion prediction signal and the motion prediction refinement signal to produce a refined motion prediction signal for the current block.

In certain representative embodiments, including at least the representative methods 1800, 1850, 1900, 2000, 2100, 2200, 2600 and 2900, the PROF operation may be performed after (e.g., only after) the iterative motion compensation operation is complete. For example, during the motion estimation for the current block, the PROF operation is not performed.

FIG. 30 is a flowchart illustrating another representative encoding method.

Referring to FIG. 30, the representative method 3000 to encode a video may include, at block 3010, an encoder 100 or 300, during motion estimation for the current block, determining affine motion model parameters using an iterative motion compensation operation, and generating a sub-block based motion prediction signal using the determined affine motion model parameters. At block 3020, the encoder 100 or 300 may, after motion estimation for the current block, on condition that a size of a current block meets or exceeds a threshold size, perform a Prediction Refinement with Optical Flow (PROF) operation to generate a refined motion prediction signal. At block 3030, the encoder 100 or 300 may encode the video: (1) using the refined motion prediction signal, as the prediction for the current block, on condition that the current block meets or exceeds the threshold size or (2) using the sub-block based motion prediction signal, as the prediction for the current block, on condition that the current block does not meet the threshold size.

FIG. 31 is a flowchart illustrating a twelfth representative encoding/decoding method.

Referring to FIG. 31, the representative method 3100 to encode and/or to decode a video may include, at block 3110, an encoder 100 or 300 determining or obtaining information indicating a size of a current block or a decoder 200 or 500 receiving information indicating a size of the current block. At block 3120, the encoder 100 or 300 or the decoder 200 or 500 may generate a sub-block based motion prediction signal. At block 3130, the encoder 100 or 300 or the decoder 200 or 500, on condition that a size of a current block meets or exceeds a threshold size, may perform a Prediction Refinement with Optical Flow (PROF) operation to generate a refined motion prediction signal. At block 3140, the encoder 100 or 300 may encode the video: (1) using the refined motion prediction signal, as the prediction for the current block, on condition that the current block meets or exceeds the threshold size or (2) using the sub-block based motion prediction signal, as the prediction for the current block, on condition that the current block does not meet the threshold size or the decoder 200 or 500 may decode the video: (1) using the refined motion prediction signal, as the prediction for the current block, on condition that the current block meets or exceeds the threshold size or (2) using the sub-block based motion prediction signal, as the prediction for the current block, on condition that the current block does not meet the threshold size.

FIG. 32 is a flowchart illustrating a thirteenth representative encoding/decoding method.

Referring to FIG. 32, the representative method 3200 to encode and/or to decode a video may include, at block 3210, an encoder 100 or 300 determining whether a pixel level motion compensation is to be performed or a decoder 200 or 500 receiving a flag indicating whether a pixel level motion compensation is to be performed. At block 3220, the encoder 100 or 300 or the decoder 200 or 500 may generate a sub-block based motion prediction signal. At block 3230, on condition that the pixel level motion compensation is to be performed, the encoder 100 or 300 or decoder 200 or 500 may: determine one or more spatial gradients of the sub-block based motion prediction signal, determine a motion prediction refinement signal for the current block based on the determined spatial gradients, and combine the sub-block based motion prediction signal and the motion prediction refinement signal to produce a refined motion prediction signal for the current block. At block 3240, in accordance with the determination whether the pixel level motion compensation is to be performed, the encoder 100 or 300 may encode the video using the sub-block based motion prediction signal or the refined motion prediction signal, as the prediction for the current block or the decoder 200 or 500, in accordance with an indication of the flag, may decode the video using the sub-block based motion prediction signal or the refined motion prediction signal, as the prediction for the current block. In certain embodiments, the operations at blocks 3220 and 3230 may be performed for a block (e.g., the current block) in the video.

FIG. 33 is a flowchart illustrating a fourteenth representative encoding/decoding method.

Referring to FIG. 33, the representative method 3300 to encode and/or decode a video may include, at block 3310, an encoder 100 or 300 determining or obtaining or a decoder 200 or 500 receiving inter-prediction weight information indicating one or more weights associated with first and second reference pictures. At block 3320, the encoder 100 or 300 or the decoder 200 or 500, for a current block of the video, may generate a sub-block based motion inter-prediction signal, may determine a first set of spatial gradients associated with a first reference picture and a second set of spatial gradients associated with a second reference picture, may determine a motion inter-prediction refinement signal for the current block based on the first and second sets of spatial gradients and the inter-prediction weight information, and may combine the sub-block based motion inter-prediction signal and the motion inter-prediction refinement signal to produce a refined motion inter-prediction signal for the current block. At block 3330, the encoder 100 or 300 may encode the video using the refined motion inter-prediction signal, as the prediction for the current block or the decoder 200 or 500 may decode the video using the refined motion inter-prediction signal, as the prediction for the current block. For example, the inter-prediction weight information is any of: (1) an indicator indicating a first weight factor to be applied for the first reference picture and/or a second weight factor to be applied for the second reference picture; or (2) a weight index. In certain embodiments, the motion inter-prediction refinement signal for the current block may be based on: (1) a first gradient value derived from the first set of spatial gradients and weighted in accordance with a first weight factor indicated by the inter-prediction weight information, and (2) a second gradient value derived from the second set of spatial gradients and weighted in accordance with a second weight factor indicated by the inter-prediction weight information.

EXAMPLE NETWORKS FOR IMPLEMENTATION OF THE EMBODIMENTS

FIG. 34A is a diagram illustrating an example communications system 3400 in which one or more disclosed embodiments may be implemented. The communications system 3400 may be a multiple access system that provides content, such as voice, data, video, messaging, broadcast, etc., to multiple wireless users. The communications system 3400 may enable multiple wireless users to access such content through the sharing of system resources, including wireless bandwidth. For example, the communications systems 3400 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 34A, the communications system 3400 may include wireless transmit/receive units (WTRUs) 3402a, 3402b, 3402c, 3402d, a RAN 3404/3413, a CN 3406/3415, a public switched telephone network (PSTN) 3408, the Internet 3410, and other networks 3412, though it will be appreciated that the disclosed embodiments contemplate any number of WTRUs, base stations, networks, and/or network elements. Each of the WTRUs 3402a, 3402b, 3402c, 3402d may be any type of device configured to operate and/or communicate in a wireless environment. By way of example, the WTRUs 3402a, 3402b, 3402c, 3402d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 3402a, 3402b, 3402c and 3402d may be interchangeably referred to as a UE.

The communications systems 3400 may also include a base station 3414a and/or a base station 3414b. Each of the base stations 3414a, 3414b may be any type of device configured to wirelessly interface with at least one of the WTRUs 3402a, 3402b, 3402c, 3402d to facilitate access to one or more communication networks, such as the CN 3406/3415, the Internet 3410, and/or the other networks 3412. By way of example, the base stations 3414a, 3414b may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 3414a, 3414b are each depicted as a single element, it will be appreciated that the base stations 3414a, 3414b may include any number of interconnected base stations and/or network elements.

The base station 3414a may be part of the RAN 3404/3413, which may also include other base stations and/or network elements (not shown), such as a base station controller (BSC), a radio network controller (RNC), relay nodes, etc. The base station 3414a and/or the base station 3414b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 3414a may be divided into three sectors. Thus, in one embodiment, the base station 3414a may include three transceivers, i.e., one for each sector of the cell. In an embodiment, the base station 3414a may employ multiple-input multiple output (MIMO) technology and may utilize multiple transceivers for each sector of the cell. For example, beamforming may be used to transmit and/or receive signals in desired spatial directions.

The base stations 3414a, 3414b may communicate with one or more of the WTRUs 3402a, 3402b, 3402c, 3402d over an air interface 3416, which may be any suitable wireless communication link (e.g., radio frequency (RF), microwave, centimeter wave, micrometer wave, infrared (IR), ultraviolet (UV), visible light, etc.). The air interface 3416 may be established using any suitable radio access technology (RAT).

More specifically, as noted above, the communications system 3400 may be a multiple access system and may employ one or more channel access schemes, such as CDMA, TDMA, FDMA, OFDMA, SC-FDMA, and the like. For example, the base station 3414a in the RAN 3404/3413 and the WTRUs 3402a, 3402b, 3402c may implement a radio technology such as Universal Mobile Telecommunications System (UMTS) Terrestrial Radio Access (UTRA), which may establish the air interface 3415/3416/3417 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 3414a and the WTRUs 3402a, 3402b, 3402c may implement a radio technology such as Evolved UMTS Terrestrial Radio Access (E-UTRA), which may establish the air interface 3416 using Long Term Evolution (LTE) and/or LTE-Advanced (LTE-A) and/or LTE-Advanced Pro (LTE-A Pro).

In an embodiment, the base station 3414a and the WTRUs 3402a, 3402b, 3402c may implement a radio technology such as NR Radio Access, which may establish the air interface 3416 using New Radio (NR).

In an embodiment, the base station 3414a and the WTRUs 3402a, 3402b, 3402c may implement multiple radio access technologies. For example, the base station 3414a and the WTRUs 3402a, 3402b, 3402c may implement LTE radio access and NR radio access together, for instance using dual connectivity (DC) principles. Thus, the air interface utilized by WTRUs 3402a, 3402b, 3402c may be characterized by multiple types of radio access technologies and/or transmissions sent to/from multiple types of base stations (e.g., an end and a gNB).

In other embodiments, the base station 3414a and the WTRUs 3402a, 3402b, 3402c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 3414b in FIG. 34A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 3414b and the WTRUs 3402c, 3402d may implement a radio technology such as IEEE 802.11 to establish a wireless local area network (WLAN). In an embodiment, the base station 3414b and the WTRUs 3402c, 3402d may implement a radio technology such as IEEE 802.15 to establish a wireless personal area network (WPAN). In yet another embodiment, the base station 3414b and the WTRUs 3402c, 3402d may utilize a cellular-based RAT (e.g., WCDMA, CDMA2000, GSM, LTE, LTE-A, LTE-A Pro, NR etc.) to establish a picocell or femtocell. As shown in FIG. 34A, the base station 3414b may have a direct connection to the Internet 3410. Thus, the base station 3414b may not be required to access the Internet 3410 via the CN 3406/3415.

The RAN 3404/3413 may be in communication with the CN 3406/3415, which may be any type of network configured to provide voice, data, applications, and/or voice over internet protocol (VoIP) services to one or more of the WTRUs 3402a, 3402b, 3402c, 3402d. The data may have varying quality of service (QOS) requirements, such as differing throughput requirements, latency requirements, error tolerance requirements, reliability requirements, data throughput requirements, mobility requirements, and the like. The CN 3406/3415 may provide call control, billing services, mobile location-based services, pre-paid calling, Internet connectivity, video distribution, etc., and/or perform high-level security functions, such as user authentication. Although not shown in FIG. 34A, it will be appreciated that the RAN 1084/3413 and/or the CN 3406/3415 may be in direct or indirect communication with other RANs that employ the same RAT as the RAN 3404/3413 or a different RAT. For example, in addition to being connected to the RAN 3404/3413, which may be utilizing a NR radio technology, the CN 3406/3415 may also be in communication with another RAN (not shown) employing a GSM, UMTS, CDMA 2000, WiMAX, E-UTRA, or WiFi radio technology.

The CN 3406/3415 may also serve as a gateway for the WTRUs 3402a, 3402b, 3402c, 3402d to access the PSTN 3408, the Internet 3410, and/or the other networks 3412. The PSTN 3408 may include circuit-switched telephone networks that provide plain old telephone service (POTS). The Internet 3410 may include a global system of interconnected computer networks and devices that use common communication protocols, such as the transmission control protocol (TCP), user datagram protocol (UDP) and/or the internet protocol (IP) in the TCP/IP internet protocol suite. The networks 3412 may include wired and/or wireless communications networks owned and/or operated by other service providers. For example, the networks 3412 may include another CN connected to one or more RANs, which may employ the same RAT as the RAN 3404/3413 or a different RAT.

Some or all of the WTRUs 3402a, 3402b, 3402c, 3402d in the communications system 3400 may include multi-mode capabilities (e.g., the WTRUs 3402a, 3402b, 3402c, 3402d may include multiple transceivers for communicating with different wireless networks over different wireless links). For example, the WTRU 3402c shown in FIG. 34A may be configured to communicate with the base station 3414a, which may employ a cellular-based radio technology, and with the base station 3414b, which may employ an IEEE 802 radio technology.

FIG. 34B is a system diagram illustrating an example WTRU 3402. As shown in FIG. 34B, the WTRU 3402 may include a processor 3418, a transceiver 3420, a transmit/receive element 3422, a speaker/microphone 3424, a keypad 3426, a display/touchpad 3428, non-removable memory 3430, removable memory 3432, a power source 3434, a global positioning system (GPS) chipset 3436, and/or other peripherals 3438, among others. It will be appreciated that the WTRU 3402 may include any sub-combination of the foregoing elements while remaining consistent with an embodiment.

The processor 3418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 3418 may perform signal coding, data processing, power control, input/output processing, and/or any other functionality that enables the WTRU 3402 to operate in a wireless environment. The processor 3418 may be coupled to the transceiver 3420, which may be coupled to the transmit/receive element 3422. While FIG. 34B depicts the processor 3418 and the transceiver 3420 as separate components, it will be appreciated that the processor 3418 and the transceiver 3420 may be integrated together in an electronic package or chip. The processor 3418 may be configured to encode or decode video (e.g., video frames).

The transmit/receive element 3422 may be configured to transmit signals to, or receive signals from, a base station (e.g., the base station 3414a) over the air interface 3416. For example, in one embodiment, the transmit/receive element 3422 may be an antenna configured to transmit and/or receive RF signals. In an embodiment, the transmit/receive element 3422 may be an emitter/detector configured to transmit and/or receive IR, UV, or visible light signals, for example. In yet another embodiment, the transmit/receive element 3422 may be configured to transmit and/or receive both RF and light signals. It will be appreciated that the transmit/receive element 3422 may be configured to transmit and/or receive any combination of wireless signals.

Although the transmit/receive element 3422 is depicted in FIG. 34B as a single element, the WTRU 3402 may include any number of transmit/receive elements 3422. More specifically, the WTRU 3402 may employ MIMO technology. Thus, in one embodiment, the WTRU 3402 may include two or more transmit/receive elements 3422 (e.g., multiple antennas) for transmitting and receiving wireless signals over the air interface 3416.

The transceiver 3420 may be configured to modulate the signals that are to be transmitted by the transmit/receive element 3422 and to demodulate the signals that are received by the transmit/receive element 3422. As noted above, the WTRU 3402 may have multi-mode capabilities. Thus, the transceiver 3420 may include multiple transceivers for enabling the WTRU 3402 to communicate via multiple RATs, such as NR and IEEE 802.11, for example.

The processor 3418 of the WTRU 3402 may be coupled to, and may receive user input data from, the speaker/microphone 3424, the keypad 3426, and/or the display/touchpad 3428 (e.g., a liquid crystal display (LCD) display unit or organic light-emitting diode (OLED) display unit). The processor 3418 may also output user data to the speaker/microphone 3424, the keypad 3426, and/or the display/touchpad 3428. In addition, the processor 3418 may access information from, and store data in, any type of suitable memory, such as the non-removable memory 3430 and/or the removable memory 3432. The non-removable memory 3430 may include random-access memory (RAM), read-only memory (ROM), a hard disk, or any other type of memory storage device. The removable memory 3432 may include a subscriber identity module (SIM) card, a memory stick, a secure digital (SD) memory card, and the like. In other embodiments, the processor 3418 may access information from, and store data in, memory that is not physically located on the WTRU 3402, such as on a server or a home computer (not shown).

The processor 3418 may receive power from the power source 3434, and may be configured to distribute and/or control the power to the other components in the WTRU 3402. The power source 3434 may be any suitable device for powering the WTRU 3402. For example, the power source 3434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 3418 may also be coupled to the GPS chipset 3436, which may be configured to provide location information (e.g., longitude and latitude) regarding the current location of the WTRU 3402. In addition to, or in lieu of, the information from the GPS chipset 3436, the WTRU 3402 may receive location information over the air interface 3416 from a base station (e.g., base stations 3414a, 3414b) and/or determine its location based on the timing of the signals being received from two or more nearby base stations. It will be appreciated that the WTRU 3402 may acquire location information by way of any suitable location-determination method while remaining consistent with an embodiment.

The processor 3418 may further be coupled to other peripherals 3438, which may include one or more software and/or hardware modules that provide additional features, functionality and/or wired or wireless connectivity. For example, the peripherals 3438 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 3438 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 3418 of the WTRU 3402 may operatively communicate with various peripherals 3438 including, for example, any of: the one or more accelerometers, the one or more gyroscopes, the USB port, other communication interfaces/ports, the display and/or other visual/audio indicators to implement representative embodiments disclosed herein.

The WTRU 3402 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 3418). In an embodiment, the WTRU 3402 may include a half-duplex radio for which transmission and reception of some or all of the signals (e.g., associated with particular subframes for either the UL (e.g., for transmission) or the downlink (e.g., for reception)).

FIG. 34C is a system diagram illustrating the RAN 104 and the CN 3406 according to an embodiment. As noted above, the RAN 3404 may employ an E-UTRA radio technology to communicate with the WTRUs 3402a, 3402b, 3402c over the air interface 3416. The RAN 3404 may also be in communication with the CN 3406.

The RAN 3404 may include eNode Bs 3460a, 3460b, 3460c, though it will be appreciated that the RAN 3404 may include any number of eNode Bs while remaining consistent with an embodiment. The eNode Bs 3460a, 3460b, 3460c may each include one or more transceivers for communicating with the WTRUs 3402a, 3402b, 3402c over the air interface 3416. In one embodiment, the eNode Bs 3460a, 3460b, 3460c may implement MIMO technology. Thus, the eNode B 3460a, for example, may use multiple antennas to transmit wireless signals to, and/or receive wireless signals from, the WTRU 3402a.

Each of the eNode Bs 3460a, 3460b, 3460c may be associated with a particular cell (not shown) and may be configured to handle radio resource management decisions, handover decisions, scheduling of users in the UL and/or DL, and the like. As shown in FIG. 34C, the eNode Bs 3460a, 3460b, 3460c may communicate with one another over an X2 interface.

The CN 3406 shown in FIG. 34C may include a mobility management entity (MME) 3462, a serving gateway (SGW) 3464, and a packet data network (PDN) gateway (or PGW) 3466. While each of the foregoing elements are depicted as part of the CN 3406, it will be appreciated that any of these elements may be owned and/or operated by an entity other than the CN operator.

The MME 3462 may be connected to each of the eNode Bs 3460a, 3460b, 3460c in the RAN 3404 via an S1 interface and may serve as a control node. For example, the MME 3462 may be responsible for authenticating users of the WTRUs 3402a, 3402b, 3402c, bearer activation/deactivation, selecting a particular serving gateway during an initial attach of the WTRUs 3402a, 3402b, 3402c, and the like. The MME 3462 may provide a control plane function for switching between the RAN 3404 and other RANs (not shown) that employ other radio technologies, such as GSM and/or WCDMA.

The SGW 3464 may be connected to each of the eNode Bs 3460a, 3460b, 3460c in the RAN 104 via the S1 interface. The SGW 3464 may generally route and forward user data packets to/from the WTRUs 3402a, 3402b, 3402c. The SGW 3464 may perform other functions, such as anchoring user planes during inter-eNode B handovers, triggering paging when DL data is available for the WTRUs 3402a, 3402b, 3402c, managing and storing contexts of the WTRUs 3402a, 3402b, 3402c, and the like.

The SGW 3464 may be connected to the PGW 3466, which may provide the WTRUs 3402a, 3402b, 3402c with access to packet-switched networks, such as the Internet 3410, to facilitate communications between the WTRUs 3402a, 3402b, 3402c and IP-enabled devices.

The CN 3406 may facilitate communications with other networks. For example, the CN 106 may provide the WTRUs 3402a, 3402b, 3402c with access to circuit-switched networks, such as the PSTN 3408, to facilitate communications between the WTRUs 3402a, 3402b, 3402c and traditional land-line communications devices. For example, the CN 3406 may include, or may communicate with, an IP gateway (e.g., an IP multimedia subsystem (IMS) server) that serves as an interface between the CN 3406 and the PSTN 3408. In addition, the CN 3406 may provide the WTRUs 3402a, 3402b, 3402c with access to the other networks 3412, which may include other wired and/or wireless networks that are owned and/or operated by other service providers.

Although the WTRU is described in FIGS. 34A-34D as a wireless terminal, it is contemplated that in certain representative embodiments that such a terminal may use (e.g., temporarily or permanently) wired communication interfaces with the communication network.

In representative embodiments, the other network 3412 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHz, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHZ to 923.5 MHz. In Japan, the available frequency bands are from 916.5 MHz to 927.5 MHZ. The total bandwidth available for 802.11ah is 6 MHz to 26 MHz depending on the country code.

FIG. 34D is a system diagram illustrating the RAN 3413 and the CN 3415 according to an embodiment. As noted above, the RAN 3413 may employ an NR radio technology to communicate with the WTRUs 3402a, 3402b, 3402c over the air interface 3416. The RAN 3413 may also be in communication with the CN 3415.

The RAN 3413 may include gNBs 3480a, 3480b, 3480c, though it will be appreciated that the RAN 3413 may include any number of gNBs while remaining consistent with an embodiment. The gNBs 3480a, 3480b, 3480c may each include one or more transceivers for communicating with the WTRUs 3402a, 3402b, 3402c over the air interface 3416. In one embodiment, the gNBs 3480a, 3480b, 3480c may implement MIMO technology. For example, gNBs 3480a, 3480b may utilize beamforming to transmit signals to and/or receive signals from the gNBs 3480a, 3480b, 3480c. Thus, the gNB 3480a, for example, may use multiple antennas to transmit wireless signals to, and/or receive wireless signals from, the WTRU 3402a. In an embodiment, the gNBs 3480a, 3480b, 3480c may implement carrier aggregation technology. For example, the gNB 3480a may transmit multiple component carriers to the WTRU 3402a (not shown). A subset of these component carriers may be on unlicensed spectrum while the remaining component carriers may be on licensed spectrum. In an embodiment, the gNBs 3480a, 3480b, 3480c may implement Coordinated Multi-Point (COMP) technology. For example, WTRU 102a may receive coordinated transmissions from gNB 3480a and gNB 3480b (and/or gNB 3480c).

The WTRUs 3402a, 3402b, 3402c may communicate with gNBs 3480a, 3480b, 3480c using transmissions associated with a scalable numerology. For example, the OFDM symbol spacing and/or OFDM subcarrier spacing may vary for different transmissions, different cells, and/or different portions of the wireless transmission spectrum. The WTRUs 3402a, 3402b, 3402c may communicate with gNBs 3480a, 3480b, 3480c using subframe or transmission time intervals (TTIs) of various or scalable lengths (e.g., containing varying number of OFDM symbols and/or lasting varying lengths of absolute time).

The gNBs 3480a, 3480b, 3480c may be configured to communicate with the WTRUs 3402a, 3402b, 3402c in a standalone configuration and/or a non-standalone configuration. In the standalone configuration, WTRUs 3402a, 3402b, 3402c may communicate with gNBs 3480a, 3480b, 3480c without also accessing other RANs (e.g., such as eNode Bs 3460a, 3460b, 3460c). In the standalone configuration, WTRUs 3402a, 3402b, 3402c may utilize one or more of gNBs 3480a, 3480b, 3480c as a mobility anchor point. In the standalone configuration, WTRUs 3402a, 3402b, 3402c may communicate with gNBs 3480a, 3480b, 3480c using signals in an unlicensed band. In a non-standalone configuration WTRUs 3402a, 3402b, 3402c may communicate with/connect to gNBs 3480*a*, 3480*b*, 3480*c* while also communicating with/connecting to another RAN such as eNode Bs 3460*a*, 3460*b*, 3460*c*. For example, WTRUs 3402*a*, 3402*b*, 3402*c* may implement DC principles to communicate with one or more gNBs 3480*a*, 3480*b*, 3480*c* and one or more eNode Bs 3460*a*, 3460*b*, 3460*c* substantially simultaneously. In the non-standalone configuration, eNode Bs 3460*a*, 3460*b*, 3460*c* may serve as a mobility anchor for WTRUs 3402*a*, 3402*b*, 3402*c* and gNBs 3480*a*, 3480*b*, 3480*c* may provide additional coverage and/or throughput for servicing WTRUs 3402*a*, 3402*b*, 3402*c*.

Each of the gNBs 3480*a*, 3480*b*, 3480*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 3484*a*, 3484*b*, routing of control plane information towards Access and Mobility Management Function (AMF) 3482*a*, 3482*b* and the like. As shown in FIG. 34D, the gNBs 3480*a*, 3480*b*, 3480*c* may communicate with one another over an Xn interface.

The CN 3415 shown in FIG. 34D may include at least one AMF 3482*a*, 3482*b*, at least one UPF 3484*a*, 3484*b*, at least one Session Management Function (SMF) 3483*a*, 3483*b*, and possibly a Data Network (DN) 3485*a*, 3485*b*. While each of the foregoing elements are depicted as part of the CN 3415, it will be appreciated that any of these elements may be owned and/or operated by an entity other than the CN operator.

The AMF 3482*a*, 3482*b* may be connected to one or more of the gNBs 3480*a*, 3480*b*, 3480*c* in the RAN 3413 via an N2 interface and may serve as a control node. For example, the AMF 3482*a*, 3482*b* may be responsible for authenticating users of the WTRUs 3402*a*, 3402*b*, 3402*c*, support for network slicing (e.g., handling of different Protocol Data Unit (PDU) sessions with different requirements), selecting a particular SMF 3483*a*, 3483*b*, management of the registration area, termination of Non-Access Stratum (NAS) signaling, mobility management, and the like. Network slicing may be used by the AMF 3482*a*, 3482*b* in order to customize CN support for WTRUs 3402*a*, 3402*b*, 3402*c* based on the types of services being utilized WTRUs 3402*a*, 3402*b*, 3402*c*. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 3462 may provide a control plane function for switching between the RAN 3413 and other RANs (not shown) that employ other radio technologies, such as LTE, LTE-A, LTE-A Pro, and/or non-3GPP access technologies such as WiFi.

The SMF 3483*a*, 3483*b* may be connected to an AMF 3482*a*, 3482*b* in the CN 3415 via an N11 interface. The SMF 3483*a*, 3483*b* may also be connected to a UPF 3484*a*, 3484*b* in the CN 3415 via an N4 interface. The SMF 3483*a*, 3483*b* may select and control the UPF 3484*a*, 3484*b* and configure the routing of traffic through the UPF 3484*a*, 3484*b*. The SMF 3483*a*, 3483*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 3484*a*, 3484*b* may be connected to one or more of the gNBs 3480*a*, 3480*b*, 3480*c* in the RAN 3413 via an N3 interface, which may provide the WTRUs 3402*a*, 3402*b*, 3402*c* with access to packet-switched networks, such as the Internet 3410, to facilitate communications between the WTRUs 3402*a*, 3402*b*, 3402*c* and IP-enabled devices. The UPF 3484, 3484*b* may perform other functions, such as routing and forwarding packets, enforcing user plane policies, supporting multi-homed PDU sessions, handling user plane QoS, buffering downlink packets, providing mobility anchoring, and the like.

The CN 3415 may facilitate communications with other networks. For example, the CN 3415 may include, or may communicate with, an IP gateway (e.g., an IP multimedia subsystem (IMS) server) that serves as an interface between the CN 3415 and the PSTN 3408. In addition, the CN 3415 may provide the WTRUs 3402*a*, 3402*b*, 3402*c* with access to the other networks 3412, which may include other wired and/or wireless networks that are owned and/or operated by other service providers. In one embodiment, the WTRUs 3402*a*, 3402*b*, 3402*c* may be connected to a local Data Network (DN) 3485*a*, 3485*b* through the UPF 3484*a*, 3484*b* via the N3 interface to the UPF 3484*a*, 3484*b* and an N6 interface between the UPF 3484*a*, 3484*b* and the DN 3485*a*, 3485*b*.

In view of FIGS. 34A-34D, and the corresponding description of FIGS. 34A-34D, one or more, or all, of the functions described herein with regard to one or more of: WTRU 3402*a-d*, Base Station 3414*a-b*, eNode B 3460*a-c*, MME 3462, SGW 3464, PGW 3466, gNB 3480*a-c*, AMF 3482*a-b*, UPF 3484*a-b*, SMF 3483*a-b*, DN 3485*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The HEVC standard offers approximately 50% bit-rate saving for equivalent perceptual quality compared to the prior generation video coding standard H.264/MPEG AVC. Although the HEVC standard provides significant coding improvements compared to its predecessor, additional coding efficiency improvements may be achieved with additional coding tools. The Joint Video Exploration Team (JVET) launched a project to develop the new generation video coding standard, named as Versatile Video Coding (VVC), for example to provide such coding efficiency improvements, and a reference software codebase, called VVC test model (VTM), was established for demonstrating a reference implementation of the VVC standard. To facilitate the assessment of new coding tools, another reference software base called benchmark set (BMS) was also generated. In the BMS codebase, a list of additional coding tools, which provide higher coding efficiency and moderate implementation complexity, are included on top of the VTM and used as the benchmark when evaluating similar coding technologies during the VVC standardization process. Besides JEM coding tools (e.g., 4×4 non-separable secondary transform (NSST), generalized bi-prediction (GBi), bidirectional optical flow (BIO), decoder-side motion vector refinement (DMVR) and current picture referencing (CPR)) integrated in the BMS-2.0, it includes the trellis coded quantization tool.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement one or more embodiments. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 3402, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the embodiments unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 34A-34D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method of decoding a video, comprising:
    generating a sub-block-based motion prediction signal for a sub-block of a block of a picture based on an affine motion model associated with said block;
    determining a set of pixel-level motion vector difference values for said sub-block using said affine motion model associated with said block;
    determining spatial gradients of said sub-block-based motion prediction signal, for each sample location of said sub-block, wherein an extended sub-block is formed to include said sub-block-based motion prediction signal and a plurality of samples surrounding said sub-block, and wherein each of said plurality of samples surrounding said sub-block is obtained based on integer motion compensation;
    determining a motion prediction refinement signal for said sub-block, based on said determined set of pixel-level motion vector difference values and said determined spatial gradients;
    combining said motion prediction signal and said motion prediction refinement signal to produce a refined motion prediction signal for said sub-block; and
    decoding the video using the refined motion prediction signal.

2. The method of claim 1, wherein said integer motion compensation is based on an integer part of a motion vector of said sub-block.

3. The method of claim 1, wherein said integer motion compensation is based on a nearest integer motion vector of a motion vector of said sub-block.

4. The method of claim 1, wherein said sub-block is extended by one sample in each direction to form said extended sub-block.

5. A computer readable storage medium having stored thereon instructions for decoding video data according to the method of claim 1.

6. A method of encoding a video, comprising:

generating a sub-block-based motion prediction signal for a sub-block of a block of a picture based on an affine motion model associated with said block;

determining a set of pixel-level motion vector difference values for said sub-block using said affine motion model associated with said block;

determining spatial gradients of said sub-block-based motion prediction signal, for each sample location of said sub-block, wherein an extended sub-block is formed to include said sub-block-based motion prediction signal and a plurality of samples surrounding said sub-block, and wherein each of said plurality of samples surrounding said sub-block is obtained based on integer motion compensation;

determining a motion prediction refinement signal for said sub-block, based on said determined set of pixel-level motion vector difference values and said determined spatial gradients;

combining said motion prediction signal and said motion prediction refinement signal to produce a refined motion prediction signal for said sub-block; and encoding the video using the refined motion prediction signal.

7. The method of claim 6, wherein said integer motion compensation is based on an integer part of a motion vector of said sub-block.

8. The method of claim 6, wherein said integer motion compensation is based on a nearest integer motion vector of a motion vector of said sub-block.

9. The method of claim 6, wherein said sub-block is extended by one sample in each direction to form said extended sub-block.

10. A computer readable storage medium having stored thereon instructions for encoding video data according to the method of claim 6.

11. An apparatus for decoding a video, comprising a processor configured to:

generate a sub-block-based motion prediction signal for a sub-block of a block of a picture based on an affine motion model associated with said block;

determine a set of pixel-level motion vector difference values for said sub-block using said affine motion model associated with said block;

determine spatial gradients of said sub-block-based motion prediction signal, for each sample location of said sub-block, wherein an extended sub-block is formed to include said sub-block-based motion prediction signal and a plurality of samples surrounding said sub-block, and wherein each of said plurality of samples surrounding said sub-block is obtained based on integer motion compensation;

determine a motion prediction refinement signal for said sub-block, based on said determined set of pixel-level motion vector difference values and said determined spatial gradients;

combine said motion prediction signal and said motion prediction refinement signal to produce a refined motion prediction signal for said sub-block; and decode the video using the refined motion prediction signal.

12. The apparatus of claim 11, wherein said integer motion compensation is based on an integer part of a motion vector of said sub-block.

13. The apparatus of claim 11, wherein said integer motion compensation is based on a nearest integer motion vector of a motion vector of said sub-block.

14. The apparatus of claim 11, wherein said sub-block is extended by one sample in each direction to form said extended sub-block.

15. An apparatus for encoding a video, comprising a processor configured to:

generate a sub-block-based motion prediction signal for a sub-block of a block of a picture based on an affine motion model associated with said block;

determine a set of pixel-level motion vector difference values for said sub-block using said affine motion model associated with said block;

determine spatial gradients of said sub-block-based motion prediction signal, for each sample location of said sub-block, wherein an extended sub-block is formed to include said sub-block-based motion prediction signal and a plurality of samples surrounding said sub-block, and wherein each of said plurality of samples surrounding said sub-block is obtained based on integer motion compensation;

determine a motion prediction refinement signal for said sub-block, based on said determined set of pixel-level motion vector difference values and said determined spatial gradients;

combine said motion prediction signal and said motion prediction refinement signal to produce a refined motion prediction signal for said sub-block; and encode the video using the refined motion prediction signal.

16. The apparatus of claim 15, wherein said integer motion compensation is based on an integer part of a motion vector of said sub-block.

17. The apparatus of claim 15, wherein said integer motion compensation is based on a nearest integer motion vector of a motion vector of said sub-block.

18. The apparatus of claim 15, wherein said sub-block is extended by one sample in each direction to form said extended sub-block.

* * * * *